United States Patent
Tamai et al.

(10) Patent No.: US 7,031,946 B1
(45) Date of Patent: Apr. 18, 2006

(54) INFORMATION RECORDING MEDIUM, NONCONTACT IC TAG, ACCESS DEVICE, ACCESS SYSTEM, LIFE CYCLE MANAGEMENT SYSTEM, INPUT/OUTPUT METHOD, AND ACCESS METHOD

(75) Inventors: Seiichiro Tamai, Osaka (JP); Shinichi Michisaka, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 516 days.

(21) Appl. No.: 09/914,336

(22) PCT Filed: Dec. 26, 2000

(86) PCT No.: PCT/JP00/09283

§ 371 (c)(1),
(2), (4) Date: Aug. 24, 2001

(87) PCT Pub. No.: WO01/47789

PCT Pub. Date: Jul. 5, 2001

(30) Foreign Application Priority Data

Dec. 28, 1999 (JP) ................................. 11-373880
Feb. 15, 2000 (JP) ............................. 2000-037134

(51) Int. Cl.
*G06F 17/60* (2006.01)

(52) U.S. Cl. ............................ 705/67; 705/51; 705/50; 713/200; 713/201

(58) Field of Classification Search .................. 705/67, 705/50, 51, 58; 713/200–202; 380/200–204, 380/228
See application file for complete search history.

(56) References Cited

U.S. PATENT DOCUMENTS 4,752,678 A * 6/1988 Rikuna ....................... 235/380
6,094,634 A    7/2000 Yahagi et al.

FOREIGN PATENT DOCUMENTS

| DE | 195 22 050 A1 | 12/1996 |
| EP | 0 713 188 A2 | 5/1996 |
| EP | 0856818 A2 * | 5/1998 |
| EP | 0 856 818 A2 | 8/1998 |
| EP | 0 856 818 A3 | 8/1998 |
| EP | 0 923 056 A2 | 6/1999 |
| JP | 63-108445 | 5/1988 |
| JP | 06-309528 | 11/1994 |
| JP | 08276458 | 10/1996 |
| JP | 10-133578 | 5/1998 |
| JP | 10-222568 | 8/1998 |

(Continued)

OTHER PUBLICATIONS

IBM Disclosure Bulletin, Feb. 1992; Extensible user Authentication in a computer operating system.*

(Continued)

*Primary Examiner*—Pierre Eddy Elisca

(57) ABSTRACT

To provide a contactless IC tag for storing secret information for each of multiple stages of a life cycle from manufacture to disposal, and an access device for reading/writing information in secrecy from/to the contactless IC tag for each stage. A memory unit has stage storage areas as many as the stages. Each stage storage area is identified by a secret stage identifier. A controlling unit receives an access identifier from the access device in secrecy, via an antenna unit, a demodulating unit, and an instruction decoding unit. Upon judging that the access identifier properly identifies one of the stage storage areas, the controlling unit receives access information from the access device, and an inputting/outputting unit accesses the stage storage area based on the access information.

19 Claims, 34 Drawing Sheets

FOREIGN PATENT DOCUMENTS

| | | | |
|---|---|---|---|
| JP | 10222568 | | 8/1998 |
| JP | 11120308 | * | 4/1999 |
| JP | 11-144012 | | 5/1999 |
| JP | 11-175402 | | 7/1999 |
| JP | 11-180545 | | 7/1999 |
| JP | 11-328326 | | 11/1999 |
| JP | 2000-339436 | | 12/2000 |
| JP | 02002132144 A | * | 5/2002 |

OTHER PUBLICATIONS

Schuler, Peter; Schnuffeltechnik ausgetrickst: Ein Storsender verwirrt RFID-Lesegerate (RFID-Blocker) No. 6/04, Mar. 8, 2004, p. 40, XP002272800.

* cited by examiner

FIG. 13

| INSTRUCTION TYPE | | OPERANDS |
|---|---|---|
| SYNCHRONOUS SIGNAL TRANSMISSION INSTRUCTION | | SYNCHRONOUS SIGNAL |
| IDENTIFICATION CODE ACQUISITION INSTRUCTION | | |
| ACCESS REQUEST INSTRUCTION | | IDENTIFICATION CODE |
| ACCESS INSTRUCTION | READ INSTRUCTION | IDENTIFICATION CODE, PHYSICAL ADDRESS, NUMBER OF BYTES TO BE READ |
| | WRITE INSTRUCTION | IDENTIFICATION CODE, PHYSICAL ADDRESS, NUMBER OF BYTES TO BE WRITTEN, CONTENTS OF WRITING |
| IDENTIFICATION CODE RESPONSE INSTRUCTION | | IDENTIFICATION CODE |
| AUTHENTICATOR RESPONSE INSTRUCTION | | IDENTIFICATION CODE, AUTHENTICATOR |

FIG. 14

| INSTRUCTION TYPE | OPERANDS |
|---|---|
| IDENTIFICATION CODE TRANSMISSION INSTRUCTION | RANDOM NUMBER R0, IDENTIFICATION CODE |
| AUTHENTICATOR TRANSMISSION INSTRUCTION | IDENTIFICATION CODE, AUTHENTICATOR |
| IDENTIFICATION CODE MATCHING INSTRUCTION | IDENTIFICATION CODE |
| ACCESS RESPONSE INSTRUCTION | IDENTIFICATION CODE, ACCESS RESPONSE INFORMATION |
| ACCESS PROHIBITION INSTRUCTION | IDENTIFICATION CODE, REASON CODE |

201
200
80 RADIO IC TAG

FIG. 18

| | MANUFACTURE STAGE AREA | | | DISTRIBUTION STAGE AREA | SALE STAGE AREA | | SERVICE STAGE AREA | COLLECTION/RECYCLE STAGE AREA | |
|---|---|---|---|---|---|---|---|---|---|
| UNPROTECTED UNIT 301 | MANUFACTURER NAME | PRODUCT NAME | PRODUCT NUMBER | TRANSPORTATION COMPANY NAME | GUARANTEE PERIOD | GUARANTEE NUMBER | WASHING METHOD | | |
| PROTECTED UNIT 302 | PRODUCTION NUMBER | MANUFACTURE DATE | FACTORY NAME | STORAGE /RETRIEVAL DATE | WHOLESALER NAME | STORE NAME | | COLLECTOR NAME | WRITE-ONCE UNIT |
| | | | | GLN | | SELLING DATE | | COLLECTION DATE | |
| | | | | | | | | DISPOSER NAME | |
| | | | | | | | REPAIRPERSON NAME | DISPOSAL DATE | |
| | | | | | | | REPAIR DATE | | |
| | | | | | | | REPAIRED COMPONENT | REUSE RECORD | REWRITABLE UNIT |

POWER SUPPLY CIRCUIT

INFORMATION RECORDING MEDIUM, NONCONTACT IC TAG, ACCESS DEVICE, ACCESS SYSTEM, LIFE CYCLE MANAGEMENT SYSTEM, INPUT/OUTPUT METHOD, AND ACCESS METHOD

TECHNICAL FIELD

The present invention relates to techniques for attaching a contactless IC tag to an item which passes through multiple stages such as a manufacture stage, and accessing the contactless IC tag to manage the item. Examples of the item include vehicles, foodstuffs, houses, cloths, miscellaneous goods, and electronic equipment such as home electrical appliances.

BACKGROUND ART

Regarding a so-called life cycle from manufacture of an item through to final obsolescence, various techniques have been proposed to obtain information about the operating condition and history of the item and manage the item by referring to such information.

For instance, Japanese Laid-Open Patent Application No. H10-222568 discloses the following system to reduce the cost of the entire life cycle. Identification information such as model and production numbers, material information, operation information, error information, and maintenance information are recorded for each product and component, at each stage such as manufacture, use, and maintenance. The recorded information is read and put to use for evaluating the product in each of the stages including manufacture, maintenance, collection, and resale.

Also, Japanese Laid-Open Patent Application No. H11-120308 discloses a historical information storing device which attaches historical information of a product to the product itself.

According to these conventional techniques, information relating to a product can be attached to the product and passed through each stage of the life cycle together with the product. This allows the information relating to the product to be shared and freely used at any stage of the life cycle such as manufacture, maintenance, collection, and resale. However, when the information attached to the product is such available to any person, secret information cannot be attached to the product. This is one of the main reasons why the technique of distributing the product and the information relating to the product together in the life cycle has not been so widely used.

To solve the above problem, the present invention aims to provide an information recording medium and contactless IC tag that can store secret information for each stage, when the information recording medium or the contactless IC tag is attached to an item which passes through multiple stages. The invention also aims to provide an access device that is capable of reading/writing information from/to the contactless IC tag in secrecy for each stage, an access system made up of the contactless IC tag and the access device, and a life cycle management system made up of the contactless IC tag and the access devices provided for the multiple stages. The invention further aims to provide an input/output method used for the contactless IC tag, and an access method used for the access device.

DISCLOSURE OF INVENTION

The present invention is an information recording medium that has a nonvolatile memory and is read and written contactlessly using radio waves, including: a storing unit having storage areas; a holding unit for holding area identifiers which each identify a different one of the storage areas; a secret receiving unit for receiving an access identifier in secrecy from an external access device; a judging unit for judging whether the received access identifier matches one of the area identifiers in the holding unit; an access information receiving unit for receiving access information from the access device, when the access identifier matches one of the area identifiers; and an accessing unit for accessing a storage area that is identified by the access identifier, based on the received access information.

According to this construction, the access device can access the storage area identified by the access identifier which is received by the information recording medium in secrecy. Accordingly, a single information recording medium can be used for a plurality of purposes.

Also, the invention is a contactless IC tag that has a nonvolatile memory and is read and written contactlessly using radio waves, the contactless IC tag being attached to an item which passes through multiple stages of a life cycle from manufacture to disposal, the contactless IC tag including: a storing unit having stage storage areas as many as the stages of the life cycle; an identifier holding unit for holding stage identifiers that each identify a different one of the stage storage areas; a secret receiving unit for receiving an access identifier in secrecy from an external access device; a judging unit for judging whether the received access identifier matches one of the stage identifiers in the identifier holding unit; an access information receiving unit for receiving access information from the access device, when the access identifier matches one of the stage identifiers; and an accessing unit for accessing a stage storage area that is identified by the access identifier, based on the received access information.

According to this construction, the access device can access the stage storage area identified by the stage identifier which is received by the contactless IC tag in secrecy. Accordingly, a single contactless IC tag can be used for multiple stages of a life cycle from manufacture to disposal.

Here, the secret receiving unit may include: an authenticator outputting unit for generating a first authenticator and outputting the first authenticator to the access device; an acquiring unit for acquiring a second authenticator that is obtained by encrypting the first authenticator by an encryption algorithm using the access identifier as an encryption key, from the access device; and an encrypting unit for encrypting the first authenticator by the encryption algorithm using the stage identifiers each as an encryption key, to generate third authenticators, wherein the judging unit judges whether the acquired second authenticator matches one of the third authenticators, and if the second authenticator matches one of the third authenticators, judges that the access identifier matches one of the stage identifiers, and the accessing unit accesses a stage storage area identified by a stage identifier which is used as an encryption key to generate the third authenticator that matches the second authenticator, as the stage storage area identified by the access identifier.

According to this construction, the contactless IC tag authenticates the access device without the stage identifier being sent, so that there is no risk of the stage identifier being revealed.

Here, the authenticator outputting unit may generate the first authenticator randomly.

According to this construction, the contactless IC tag generates the authenticator randomly, so that there is no risk of the stage identifier being revealed from past communications.

Here, the secret receiving unit may further include: a channel selecting unit for selecting one of a plurality of communication channels obtained by time-division multiplexing; and an identifier receiving unit for receiving the access identifier in secrecy, through the selected communication channel.

According to this construction, the contactless IC tag performs communication with the access device using the time-multiplexing channels, which enables the access device to communicate with more than one contactless IC tag at the same time.

Here, the channel selecting unit may select the communication channel randomly.

According to this construction, the contactless IC tag selects the communication channel at random, which reduces the possibility of the same communication channel being selected by two contactless IC tags.

Here, the storing unit may have a common storage area identified by a common identifier, wherein the identifier holding unit stores the common identifier, the judging unit judges whether the received access identifier matches the common identifier in the identifier holding unit, the access information receiving unit receives the access information from the access device when the access identifier matches the common identifier, and the accessing unit accesses the common storage area identified by the access identifier, based on the received access information.

According to this construction, the contactless IC tag has the common area identified by the common identifier, so that the same information can be commonly used by the multiple stages.

Here, the nonvolatile memory may be a fuse memory.

According to this construction, tampering of data can be prevented.

Here, the contactless IC tag may be provided near a logotype that is positioned on a surface of the item.

According to this construction, the contactless IC tag is not so noticeable from the outside. This keeps the appearance of the item from being ruined. Also, since the position of the contactless IC tag is known to be near the logotype, the contactless IC tag can be easily found in each stage of the life cycle.

Here, the contactless IC tag may further include a time information storing unit for storing, when data is stored into the storing unit, time information into the storing unit together with the data.

According to this construction, whenever item information is written into the memory, date and time information is written together with the item information. Therefore, even when there is not enough free memory when writing new item information, it is possible to automatically delete the oldest item information, or send a list of item information to the access device so that the user of the access device can choose which item information should be deleted. As a result, the new item information can be written to the memory.

Here, the storing unit may have a first memory unit which is non-rewritable and a second memory unit which is rewritable.

According to this construction, the user of the access device can write basic information which should not be deleted, such as item ID information, to the first memory unit, while writing information which can be deleted or temporary information to the second memory unit.

Here, the storing unit may have an extension storage area for storing data which cannot be stored in the stage storage areas due to insufficient free space.

According to this construction, even if there is not enough free space when writing new item information to the memory, the new item information can be written to the extension storage area which is provided beforehand.

Here, the contactless IC tag may further include a memory organizing unit for deleting, when data cannot be stored into the storing unit due to insufficient free space, data whose time information is oldest from the storing unit, to increase the free space.

According to this construction, even when there is not enough free space when writing new item information to the memory, the oldest item information is automatically deleted with reference to time information attached to item information stored in the memory. Hence the new item information can be written to the memory.

Here, the contactless IC tag may further include a master identifier holding unit for holding a master identifier; a master identifier judging unit for judging whether the received access identifier matches the master identifier in the master identifier holding unit; and a master access information receiving unit for receiving master access information from the access device, when the access identifier matches the master identifier, wherein the accessing unit accesses one of the stage storage areas based on the received master access information.

According to this construction, when it becomes necessary to reveal secret information, such as when the item to which the contactless IC tag is attached has a defect and the source of the defect need be tracked, the user of the access device can request the secret information to be revealed through the use of the master identifier.

Also, the invention is a contactless IC tag that has a nonvolatile memory and is read and written contactlessly using radio waves, the contactless IC tag being attached to an inpatient who passes through multiple stages of a hospital cycle from admission to release, the contactless IC tag including: a storing unit having stage storage areas as many as the stages of the hospital cycle; an identifier holding unit for holding stage identifiers that each identify a different one of the stage storage areas; a secret receiving unit for receiving an access identifier in secrecy from an external access device; a judging unit for judging whether the received access identifier matches one of the stage identifiers in the identifier holding unit; an access information receiving unit for receiving access information from the access device, when the access identifier matches one of the stage identifiers; and an accessing unit for accessing a stage storage area that is identified by the access identifier, based on the received access information.

According to this construction, a person who has the rights to operate an access device of each stage, such as a patient, a doctor, a nurse, or an accountant, inputs a password which only he or she knows, into the access device. Once the authenticity of the person has been verified, the access device reads/writes information from/to a corresponding stage storage area of the contactless IC tag. In this way, the patient can obtain proper knowledge of his or her condition and medical treatment. Also, the doctor or the nurse can be kept from confusing the patient with another patient or committing malpractice. Moreover, the accountant can calculate medical expenses accurately.

Also, the invention is a contactless IC tag that has a nonvolatile memory and is read and written contactlessly using radio waves, the contactless IC tag being attached to a brand-name product which passes through multiple stages of a life cycle from manufacture to disposal, the contactless IC tag including: a storing unit having stage storage areas as many as the stages of the life cycle; an identifier holding unit for holding stage identifiers that each identify a different one of the stage storage areas; a secret receiving unit for receiving an access identifier in secrecy from an external access device; a judging unit for judging whether the received access identifier matches one of the stage identifiers in the identifier holding unit; an access information receiving unit for receiving access information from the access device, when the access identifier matches one of the stage identifiers; and an accessing unit for accessing a stage storage area that is identified by the access identifier, based on the received access information.

According to this construction, the distribution of fake brand-name products can be prevented. Also, the quality of brand-name products can be ensured. Further, the management and tracking of the distribution route of the brand-name products can be made by writing route information to the contactless IC tag.

Also, the invention is an access device for sending/receiving information to/from an information recording medium that has a nonvolatile memory and is read and written contactlessly using radio waves, the information recording medium having storage areas which are each identified by a different secret identifier, the access device including: an identifier storing unit for storing an access identifier; a secret sending unit for sending the access identifier in secrecy to the information recording medium; and an access information sending unit for sending access information to the information recording medium, when the information recording medium judges that the access identifier properly identifies one of the storage areas.

According to this construction, the access device can access the information recording medium which has the storage area identified by the secretly received access identifier. Hence a single information recording medium can be used for a plurality of purposes.

Also, the invention is an access device for sending/receiving information to/from a contactless IC tag that has a nonvolatile memory and is read and written contactlessly using radio waves, the contactless IC tag being attached to an item which passes through multiple stages of a life cycle from manufacture to disposal and having stage storage areas as many as the stages of the life cycle, each stage storage area being identified by a different secret identifier, the access device including: an identifier storing unit for storing an access identifier; a secret sending unit for sending the access identifier in secrecy to the contactless IC tag; and an access information sending unit for sending access information to the contactless IC tag, when the contactless IC tag judges that the access identifier properly identifies one of the stage storage areas.

According to this construction, the access device can access the contactless IC tag which has the stage storage area identified by the secretly received stage identifier. Accordingly, a single contactless IC tag can be used for multiple stages of a life cycle from manufacture to disposal.

Here, the contactless IC tag may store stage identifiers that each identify a different one of the stage storage areas, wherein the secret sending unit includes: an authenticator receiving unit for receiving a first authenticator from the contactless IC tag; and an authenticator outputting unit for encrypting the received first authenticator by an encryption algorithm using the access identifier as an encryption key to generate a second authenticator, and sending the second authenticator to the contactless IC tag, and the access information sending unit sends the access information to the contactless IC tag, when the contactless IC tag (a) encrypts the first authenticator by the encryption algorithm using the stage identifiers each as an encryption key to generate third authenticators, (b) judges whether the second authenticator matches one of the third authenticators, and (c) if the second authenticator matches one of the third authenticators, judges that the access identifier properly identifies one of the stage storage areas.

According to this construction, the contactless IC tag authenticates the access device without sending the stage identifier, so that there is no risk of the stage identifier being revealed.

Also, the invention is an access device for sending/receiving information to/from a contactless IC tag that has a nonvolatile memory and is read and written contactlessly using radio waves, the contactless IC tag being attached to an item which passes through multiple stages of a life cycle from manufacture to disposal and having stage storage areas as many as the stages of the life cycle, each stage storage area being identified by a different secret stage identifier, the access device including: an identifier accepting unit for accepting an access identifier; a secret sending unit for sending the access identifier in secrecy to the contactless IC tag; and an access information sending unit for sending access information to the contactless IC tag, when the contactless IC tag judges that the access identifier properly identifies one of the stage storage areas.

According to this construction, even when an access device of the same function is used in each stage of the life cycle, the security between the stages can be attained.

Also, the invention is an access system including the above contactless IC tag and access device.

According to this construction, the same effects as the above contactless IC tag and access device are obtained.

Also, the invention is an access system including the above contactless IC tag and access device, wherein access devices are provided in a one-to-one correspondence with the stages, and each access device accesses only a stage storage area in the contactless IC tag that corresponds to a stage for which the access device is provided, to manage the item.

According to this construction, an access device which is provided for each stage accesses only a stage storage area of the contactless IC tag that corresponds to the stage for which the access device is provided, to manage the item. Therefore, the same effects as the above contactless IC tag and access device can be obtained.

Also, the invention is an input/output method for use in a contactless IC tag that has a nonvolatile memory and is read and written contactlessly using radio waves, the contactless IC tag being attached to an item which passes through multiple stages of a life cycle from manufacture to disposal, and including: a storing unit having stage storage areas as many as the stages of the life cycle; and an identifier holding unit for holding stage identifiers that each identify a different one of the stage storage areas, the input/output method including: a secret receiving step for receiving an access identifier in secrecy from an external access device; a judging step for judging whether the received access identifier matches one of the stage identifiers in the identifier holding unit; an access information receiving step for receiving access information from the access device, when the access identifier matches one the stage identifiers; and an accessing step for accessing a stage storage area that is identified by the access identifier, based on the received access information.

According to this method, the same effects as the above contactless IC tag can be achieved.

Also, the invention is an access method for use in an access device for sending/receiving information to/from a contactless IC tag that has a nonvolatile memory and is read and written contactlessly using radio waves, the access device including an identifier storing unit for storing an access identifier, the contactless IC tag being attached to an item which passes through multiple stages of a life cycle from manufacture to disposal and having stage storage areas as many as the stages of the life cycle, each stage storage area being identified by a different secret stage identifier, the access method including: a secret sending step for sending the access identifier in secrecy to the contactless IC tag; and an access information sending step for sending access information to the contactless IC tag, when the contactless IC tag judges that the access identifier properly identifies one of the stage storage areas.

According to this method, the same effects as the above access device can be achieved.

BRIEF DESCRIPTION OF DRAWINGS

FIG. 13 shows instructions received by an instruction generating unit 104 and operands accompanying these instructions.

FIG. 14 shows instructions extracted by an instruction decoding unit 110 and operands accompanying these instructions.

FIG. 18 is a memory map showing a construction of the memory unit 216, where the contents of the memory unit 216 are shown for each stage area.

BEST MODE FOR CARRYING OUT THE INVENTION

1. First Embodiment

The following describes a life cycle management system 10 as the first embodiment of the invention.

1.1. Life Cycle of a Product

A manufacturer processes and assembles components to produce a product (item) in a manufacturing factory, and ships the product. A distributor transports the product to a seller. The seller sells the product to a consumer. The consumer uses the product. A service provider repairs/ maintains the product used by the consumer. A collector/recycler dismantles and disposes the product after long years of use. Part of the dismantled product is put to use for recycling.

Figure 1:
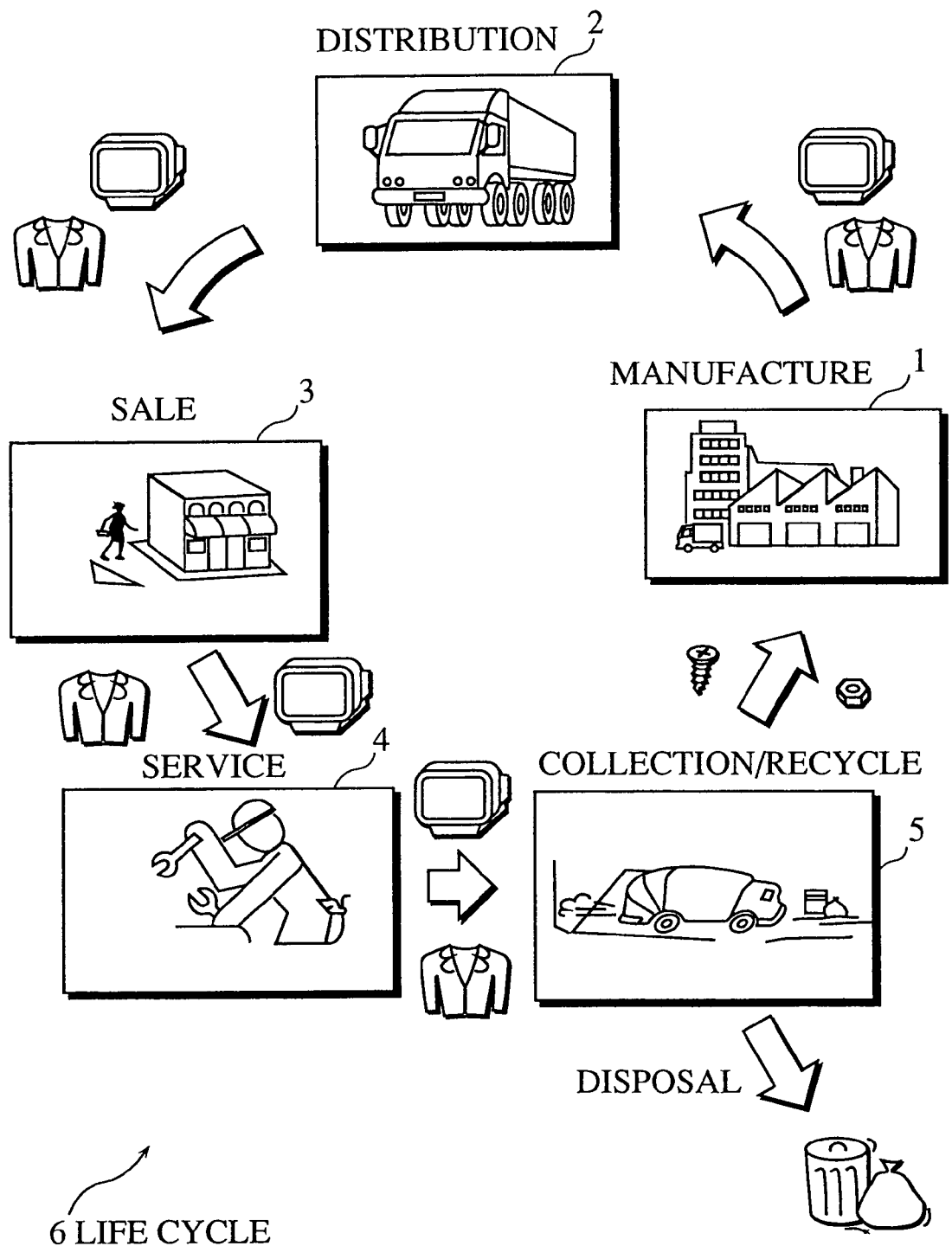
FIG. 1 shows a life cycle 6 of a product from manufacture through to disposal/collection, namely, a complete lifetime of the product that passes through a series of stages including a manufacture stage 1, a distribution stage 2, a sale stage 3, a service stage 4, and a collection/recycle stage 5.

Thus, the product passes through a manufacture stage 1, a distribution stage 2, a sale stage 3, a service stage 4, and a collection/recycle stage 5, before it ends its life, as shown in FIG. 1. This lifetime of the product from manufacture through to disposal/collection is called a life cycle 6.

Figure 2:
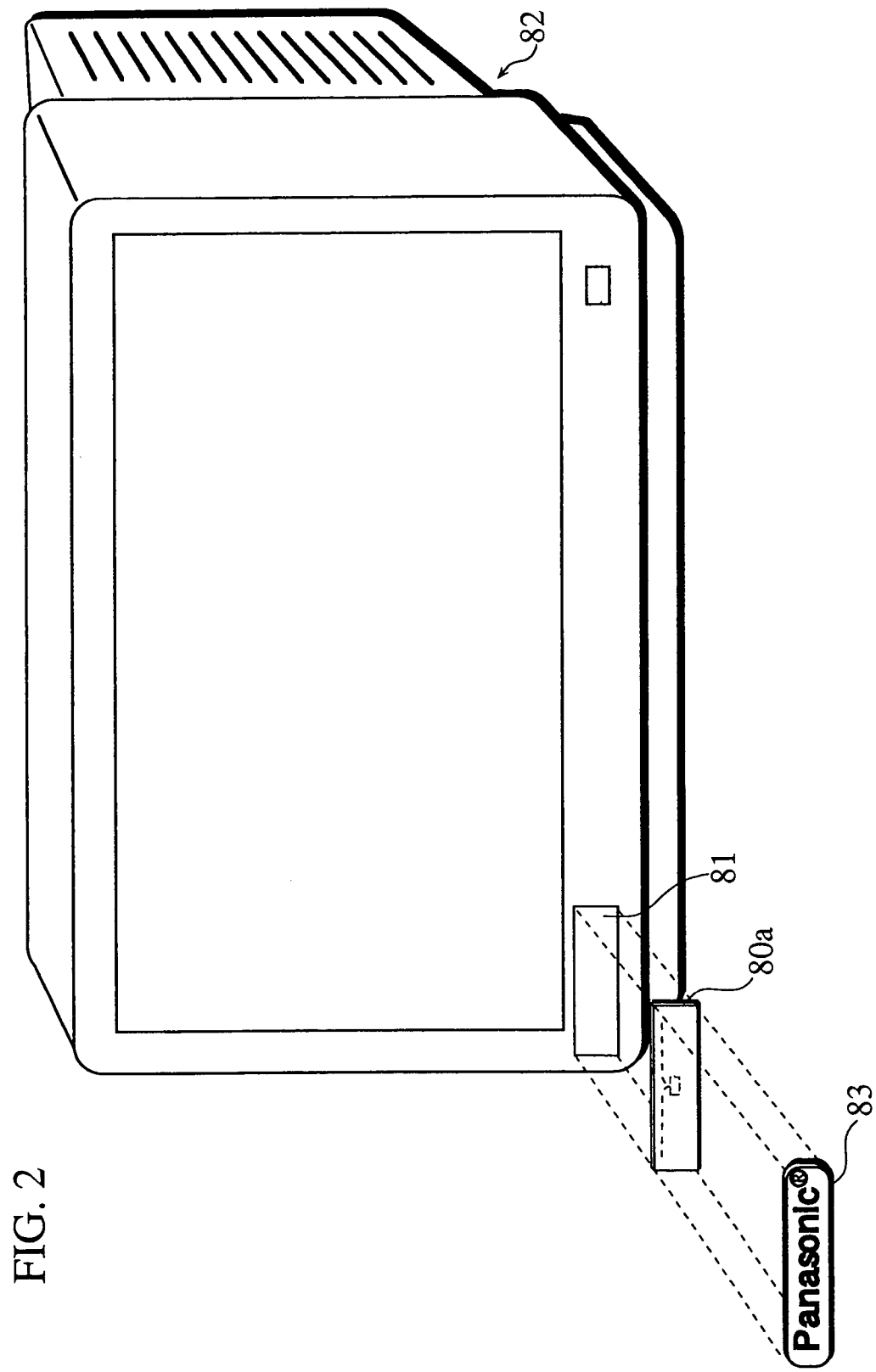
FIG. 2 shows the state where a radio IC tag is attached to a front corner of a TV set and a logo mark is attached over the radio IC tag.
Figure 3:
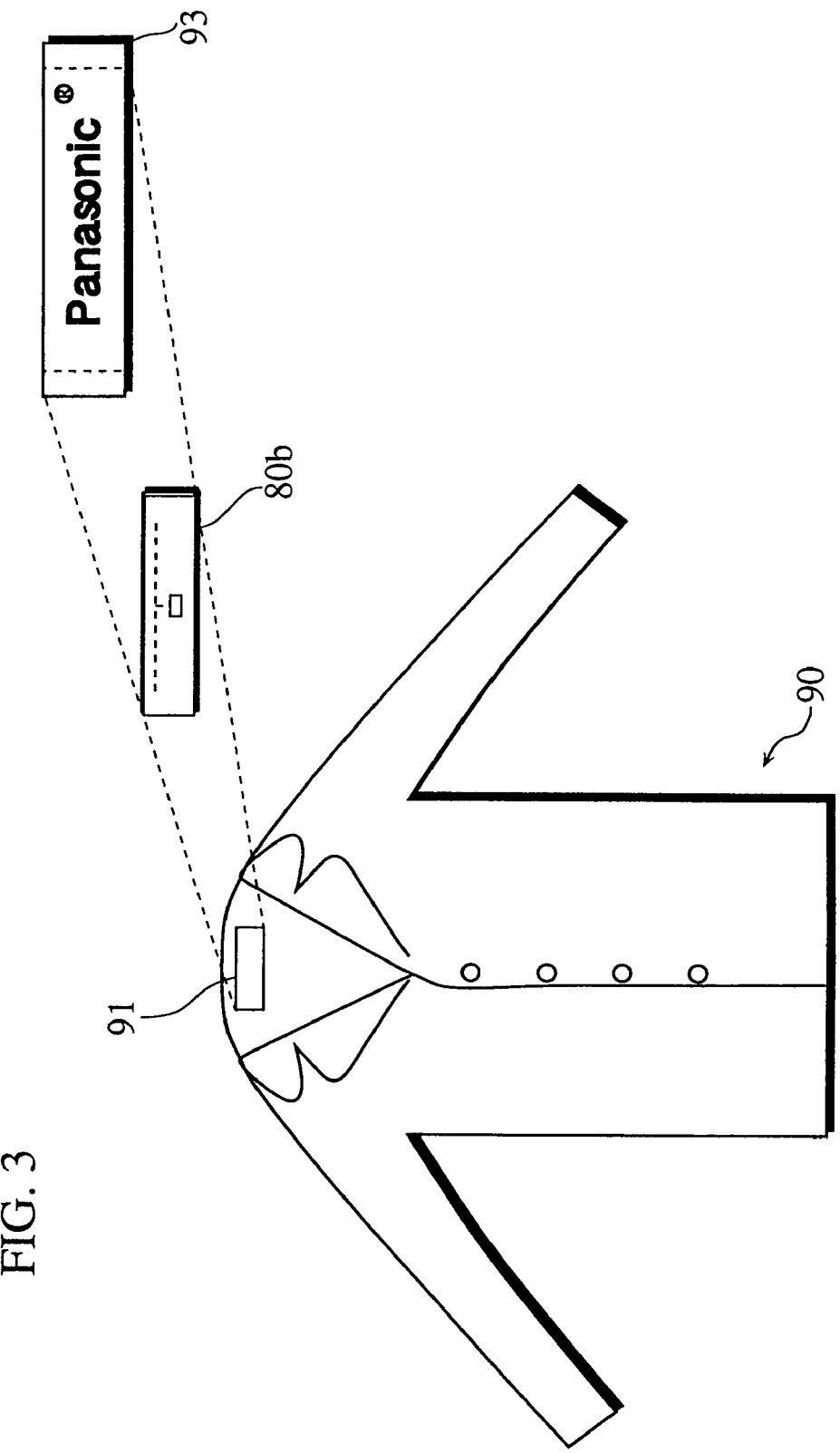
FIG. 3 shows the state where a label to which a radio IC tag is attached is sewn on the back of the neck of cloths.

The manufacturer attaches a radio IC tag (described later) to the product, in the manufacture process. For instance, A TV set manufacturer attaches a radio IC tag 80*a* to a front corner 81 of a TV set 82, and attaches a logo mark 83 on top of the radio IC tag 80*a*, as shown in FIG. 2. Also, an apparel manufacturer attaches a radio IC tag 80*b* to the reverse side of a label 93, and sews the label 93 to the back 91 of the neck of cloths 90, as shown in FIG. 3.

Here, the radio IC tag has areas for storing information relating to the product. The manufacturer writes information about the manufacturing to the radio IC tag or refers to such information from the radio IC tag in the manufacture stage 1, to manage the manufacturing of the product. The distributor writes information about the transportation to the radio IC tag or refers to such information from the radio IC tag in the distribution stage 2, to manage the transportation of the product. Likewise, the seller, the service provider, and the collector/recycler write information about their operations to the radio IC tag or refer to such information from the radio IC tag in the respective stages 3, 4, and 5, to manage the operations.

In this way, information is written to or read from the radio IC tag attached to the product, in the multiple stages.

1.2. Construction of the Life Cycle Management System 10

Figure 4:
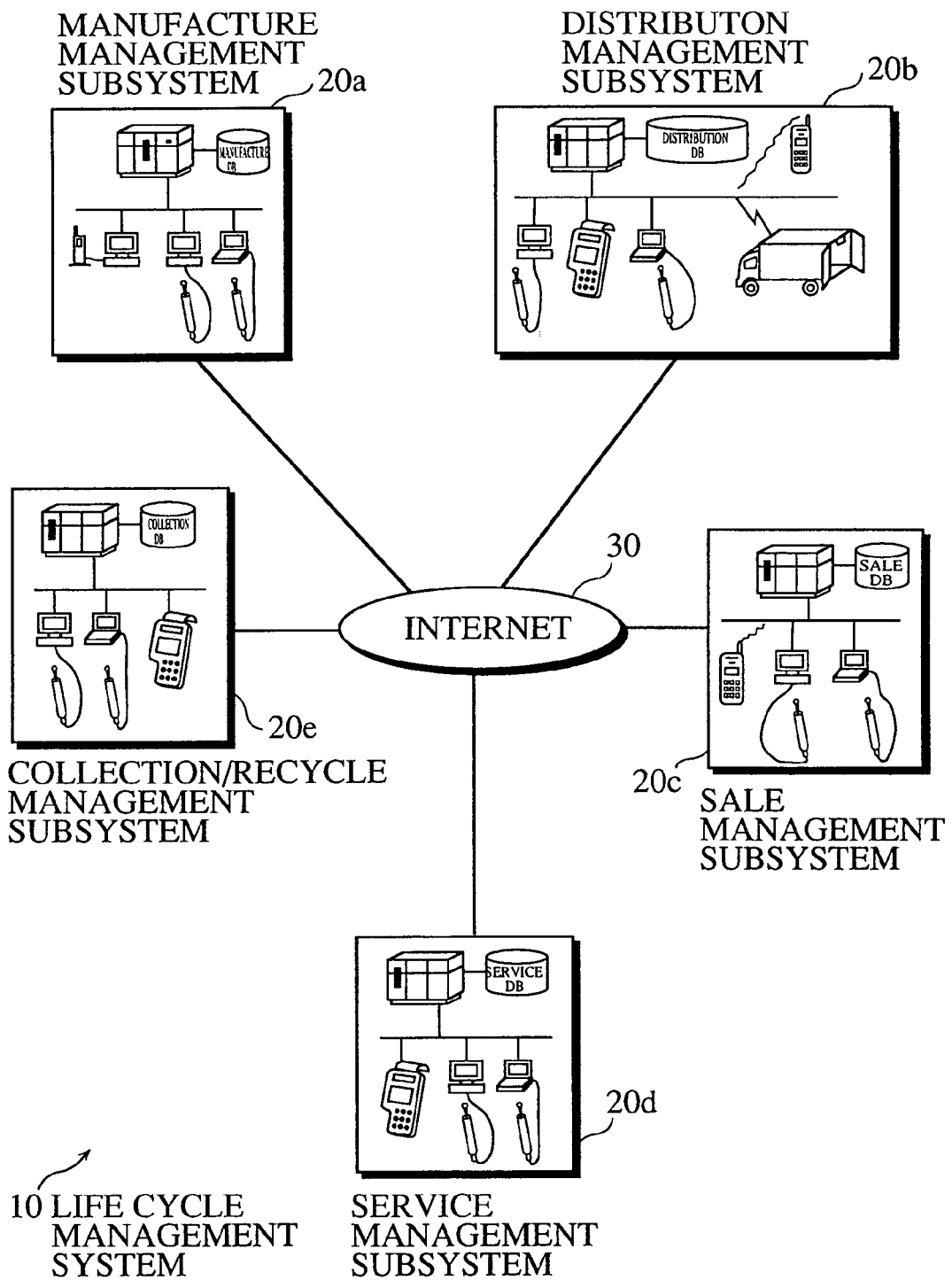
FIG. 4 is a block diagram showing a construction of a life cycle management system 10.

As shown in FIG. 4, the life cycle management system 10 includes a manufacture management subsystem 20*a*, a distribution management subsystem 20*b*, a sale management subsystem 20*c*, a service management subsystem 20*d*, a collection/recycle management subsystem 20*e*, and the Internet 30. The subsystems are connected to each other via the Internet 30.

The manufacture management subsystem 20*a*, the distribution management subsystem 20*b*, the sale management subsystem 20*c*, the service management subsystem 20*d*, and the collection/recycle management subsystem 20*e* are each an information management system for managing the product by the manufacturer, the distributor, the seller, the service provider, and the collector/recycler, respectively.

1.3. Construction of a Subsystem 20

The manufacture management subsystem 20*a*, the distribution management subsystem 20*b*, the sale management subsystem 20*c*, the service management subsystem 20*d*, and the collection/recycle management subsystem 20*e* have a common construction. Accordingly, these subsystems are explained collectively as a subsystem 20 below.

(1) Construction of the Subsystem 20

Figure 5:
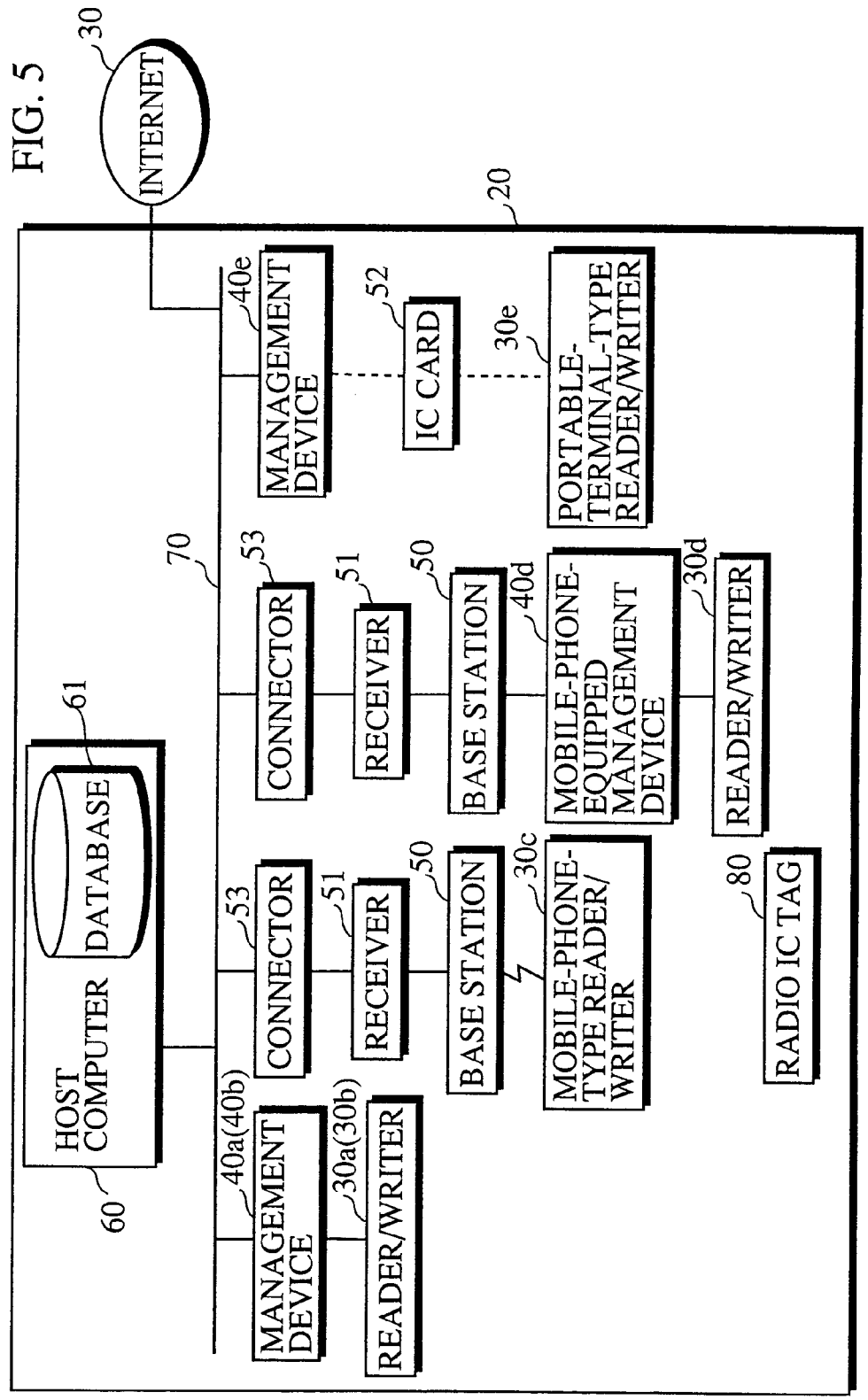
FIG. 5 is a block diagram showing a construction of a subsystem 20.

As shown in FIG. 5, the subsystem 20 includes first to fourth groups, a radio IC tag 80 attached to a product, a host computer 60 having a database 61, and a LAN device 70. The first group is made up of a reader/writer 30*a* (30*b*) and a management device 40*a* (40*b*). The second group is made up of a mobile-phone-type reader/writer 30*c*, a base station 50, a receiver 51, and a connector 53. The third group is made up of a reader/writer 30*d*, a mobile-phone-equipped management device 40*d*, the base station 50, the receiver 51, and the connector 53. The fourth group is made up of a portable-terminal-type reader/writer 30*e*, an IC card 52, and a management device 40*e*.

In the first group, the reader/writer 30*a* (30*b*) is connected to the management device 40*a* (40*b*), which is connected to the LAN device 70.

In the second group, the mobile-phone-type reader/writer 30*c* communicates with the receiver 51 via the base station 50 and a public network. The receiver 51 is connected to the connector 53, which is connected to the LAN device 70.

In the third group, the reader/writer 30*d* is connected to the mobile-phone-equipped management device 40*d*, which communicates with the receiver 51 via the base station 50 and the public network. The receiver 51 is connected to the connector 53, which is connected to the LAN device 70.

In the fourth group, the IC card 52 is loaded to the portable-terminal-type reader/writer 30*e* or the management device 40*e*. The portable-terminal-type reader/writer 30*e* writes data to the IC card 52, or refers to data from the IC card 52. Also, the management device 40*e* writes data to the IC card 52, or refers to data from the IC card 52. The management device 40*e* is connected to the LAN device 70.

The host computer 60 is connected to the LAN device 70.
The LAN device 70 is connected to the Internet 30.

(2) Reader/Writer 30*a* and Management device 40*a* in the First Group

Figure 6:
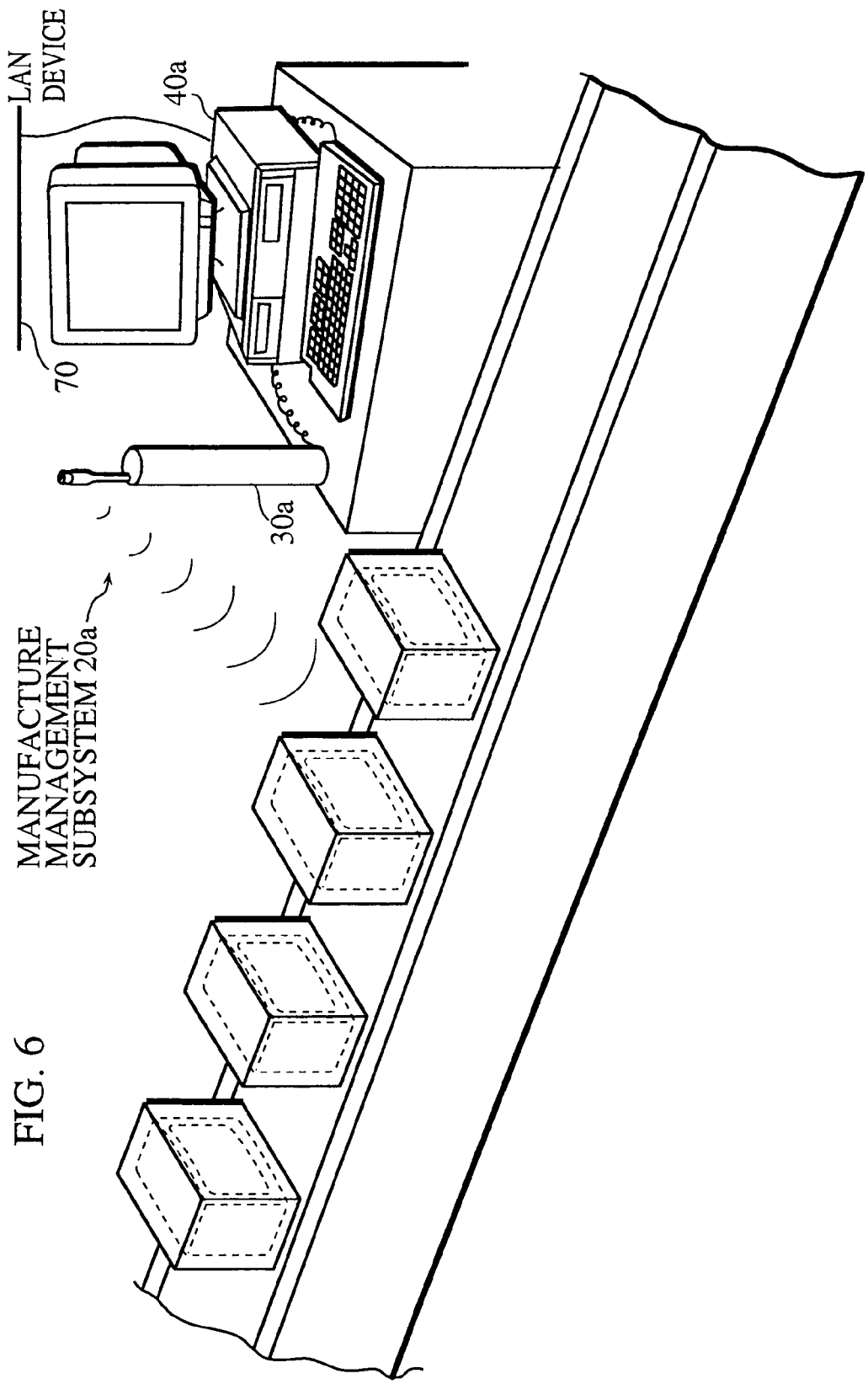
FIG. 6 shows the state where a reader/writer 30a and management device 40a in a first group which belongs to a manufacture management subsystem 20a are equipped in a manufacturing factory.

FIG. 6 shows the state where the reader/writer 30*a* and management device 40*a* in the first group which belongs to the manufacture management subsystem 20*a* are equipped in a manufacturing factory. As shown in the drawing, TV sets to which radio IC tags are attached are packed in cardboard boxes which are being carried on a conveyor belt, in the manufacturing factory. The management device 40*a* is provided with a display unit, a body unit, and a keyboard unit, just like a personal computer. The reader/writer 30*a* is provided with a body unit having a cylindrical shape, and an antenna unit at the top end of the body unit. The reader/writer 30*a* is placed in the vicinity of the conveyor belt, so that radio waves emitted from the antenna unit will not be jammed between the antenna unit and the cardboard boxes passing near the reader/writer 30*a*.

Figure 7:
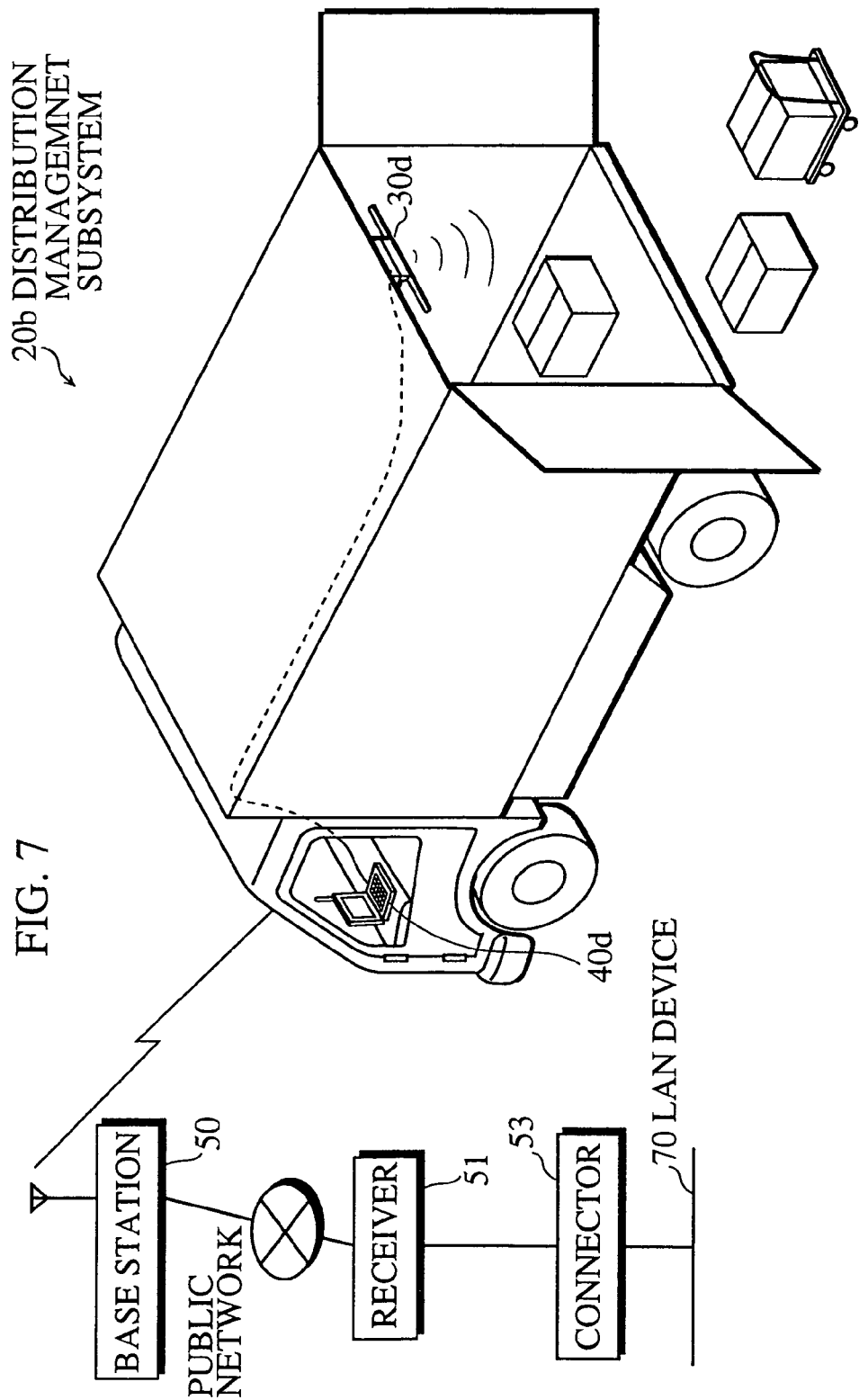
FIG. 7 shows the state where a reader/writer 30d and mobile-phone-equipped management device 40d in a third group which belongs to a distribution management subsystem 20b are mounted on a cargo truck.

(3) Reader/Writer 30*d* and Mobile-Phone-Equipped Management Device 40*d* in the Third Group FIG. 7 shows the state where the reader/writer 30*d* and mobile-phone-equipped management device 40*d* in the third group which belongs to the distribution management subsystem 20*b* are mounted on a cargo truck. As illustrated, the mobile-phone-equipped management device 40*d* is equipped with a liquid crystal display unit, a body unit having a keyboard, and an antenna unit that transmits/receives radio waves to/from the base station 50. The mobile-phone-equipped management device 40*d* is placed in front of a front passenger seat of the cargo truck. The reader/writer 30*d* has an antenna unit, and is installed inside the cargo truck at the top of the carry-in entrance so that radio waves are transmitted in a downward direction.

(4) Mobile-Phone-Type Reader/Writer 30*c* in the Second Group

Figure 8:
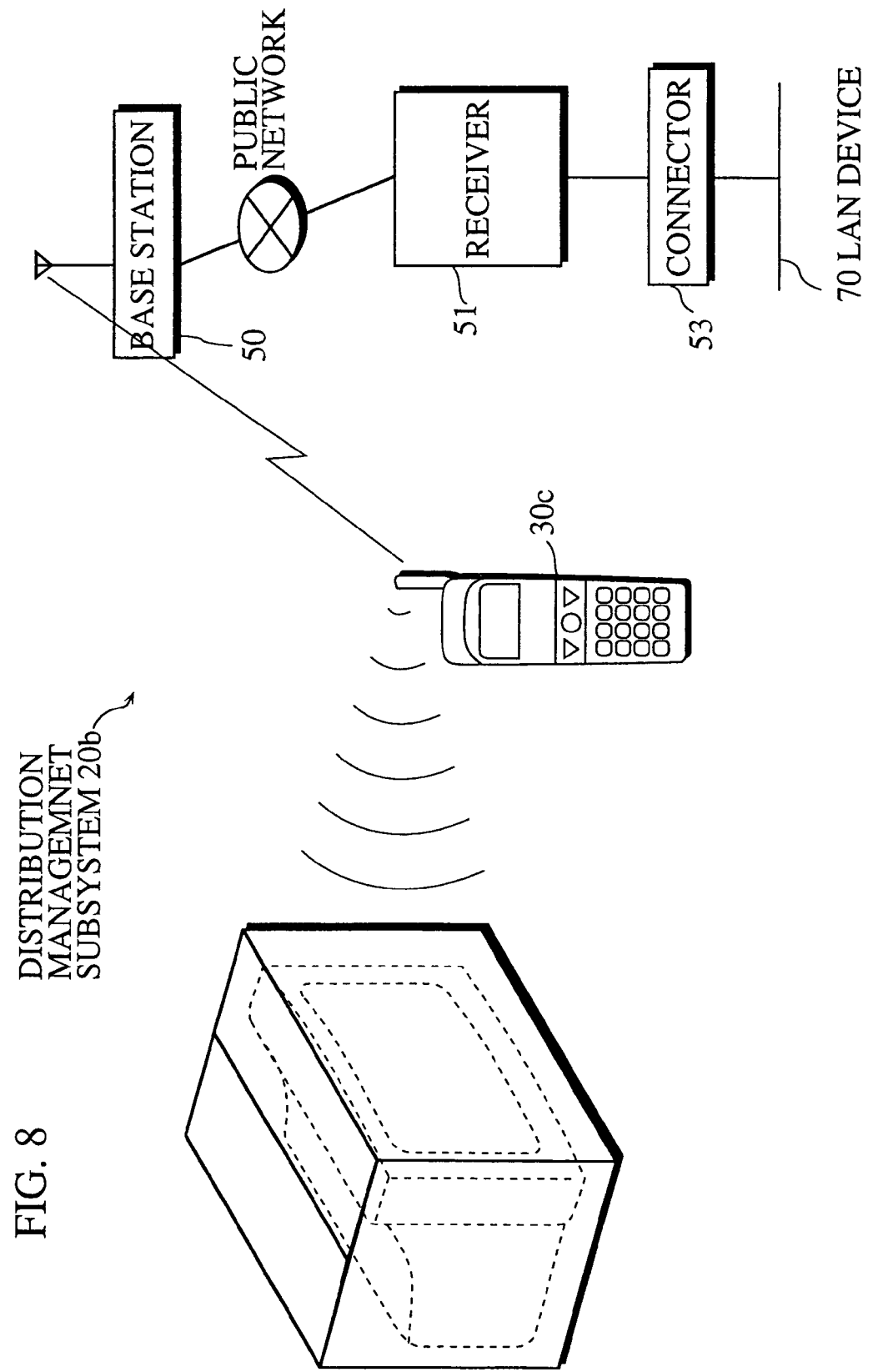
FIG. 8 shows the outward appearance of a mobile-phone-type reader/writer 30c in a second group which belongs to the distribution management subsystem 20b.

FIG. 8 shows the outward appearance of the mobile-phone-type reader/writer 30*c* in the second group which belongs to the distribution management subsystem 20*b*. The mobile-phone-type reader/writer 30*c* has a body unit shaped like a mobile phone. The mobile-phone-type reader/writer 30*c* also has an antenna unit on top of the body unit, which transmits/receives radio waves to/from the base station 50 and to/from the radio IC tag 80. The mobile-phone-type reader/writer 30c further has a plurality of operation buttons, a display unit, a microphone, and a speaker on the front of the body unit.

(5) Reader/Writer 30b in the First Group

Figure 9:
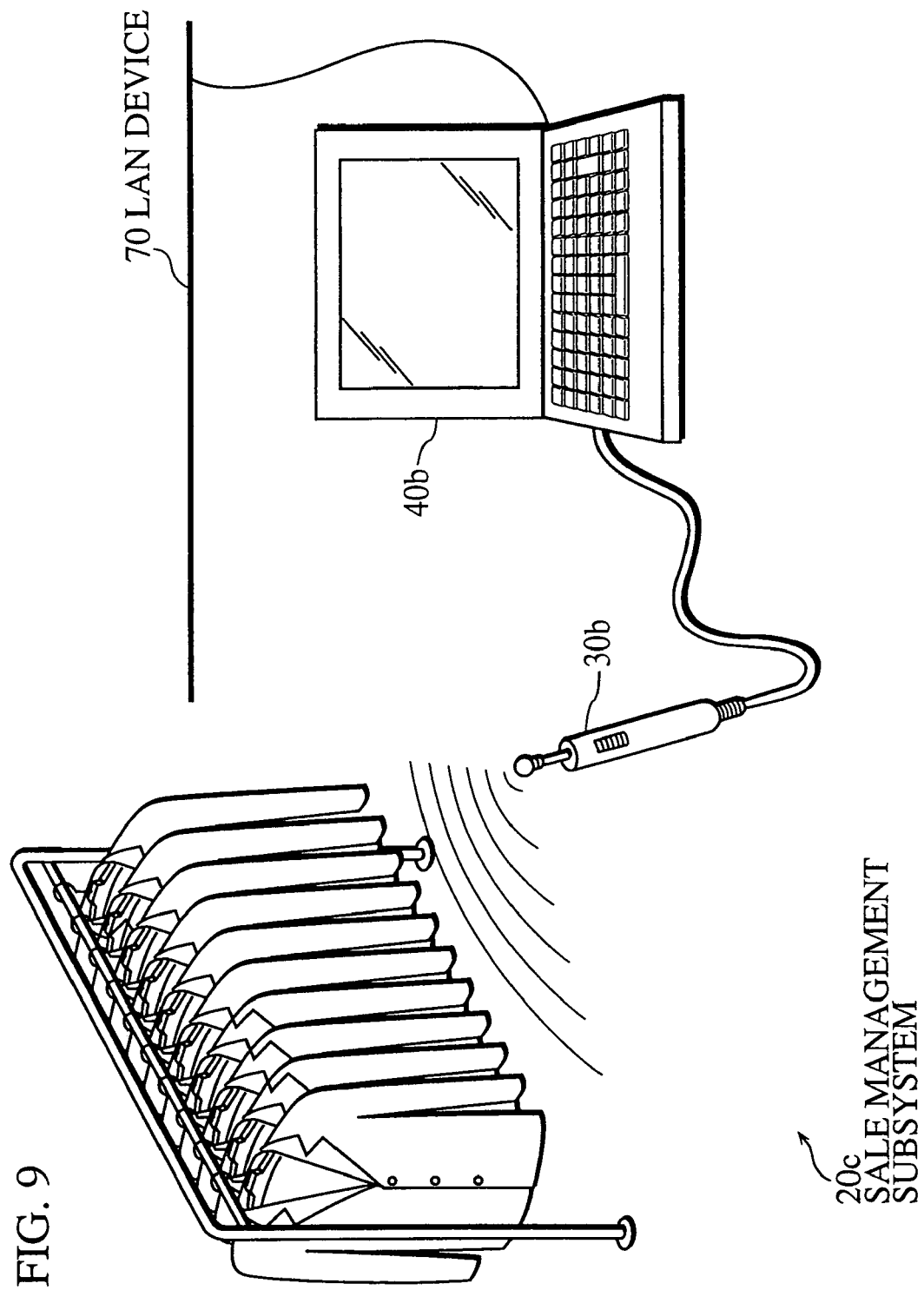
FIG. 9 shows the outward appearance of a reader/writer 30b in the first group which belongs to a sale management subsystem 20c.

FIG. 9 shows the outward appearance of the reader/writer 30b in the first group which belongs to the sale management subsystem 20c. The reader/writer 30b has a body unit shaped like a cylinder, and an antenna unit at the top of the body unit, which transmits/receives radio waves to/from the radio IC tag 80. The reader/writer 30b also has an operation button at one side of the body unit. This reader/writer 30b performs reading/writing of data simultaneously for a plurality of radio IC tags.

(6) Portable-Terminal-Type Reader/Writer 30e in the Fourth Group

Figure 10:
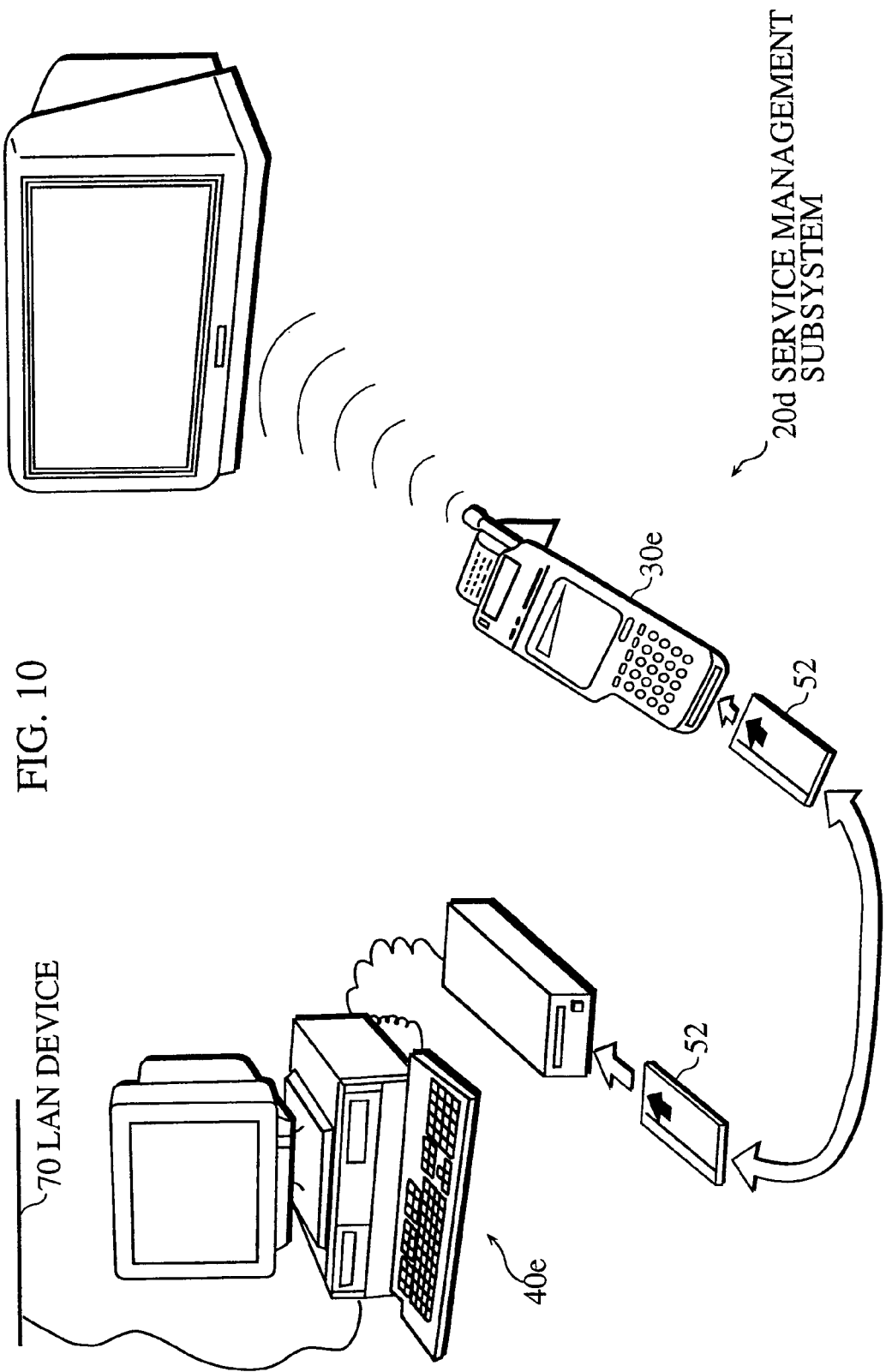
FIG. 10 shows the outward appearance of a portable-terminal-type reader/writer 30e in a fourth group which belongs to a service management subsystem 20d.

FIG. 10 shows the outward appearance of the portable-terminal-type reader/writer 30e in the fourth group which belongs to the service management subsystem 20d. The portable-terminal-type reader/writer 30e has a body unit, an antenna unit for transmitting/receiving radio waves to/from the radio IC tag 80, and a printer unit. The antenna unit and the printer unit are positioned on top of the body unit. The portable-terminal-type reader/writer 30e also has a plurality of operation buttons and a display unit on the front of the body unit, and an IC card insertion slot at the bottom of the body unit. The IC card 52 is loaded to this IC card insertion slot. The management device 40e is provided with a display unit, a body unit, and a keyboard unit, like a personal computer. The management device 40e also has an IC card input/output unit, to which the IC card 52 is loaded.

1.4. Construction of a Reader/Writer 30

The reader/writers 30a, 30b, and 30d have the same construction. Also, the mobile-phone-type reader/writer 30c and the portable-terminal-type reader/writer 30e contain the same construction as the reader/writer 30a. Accordingly, these devices are collectively explained as a reader/writer 30 below.

Figure 11:
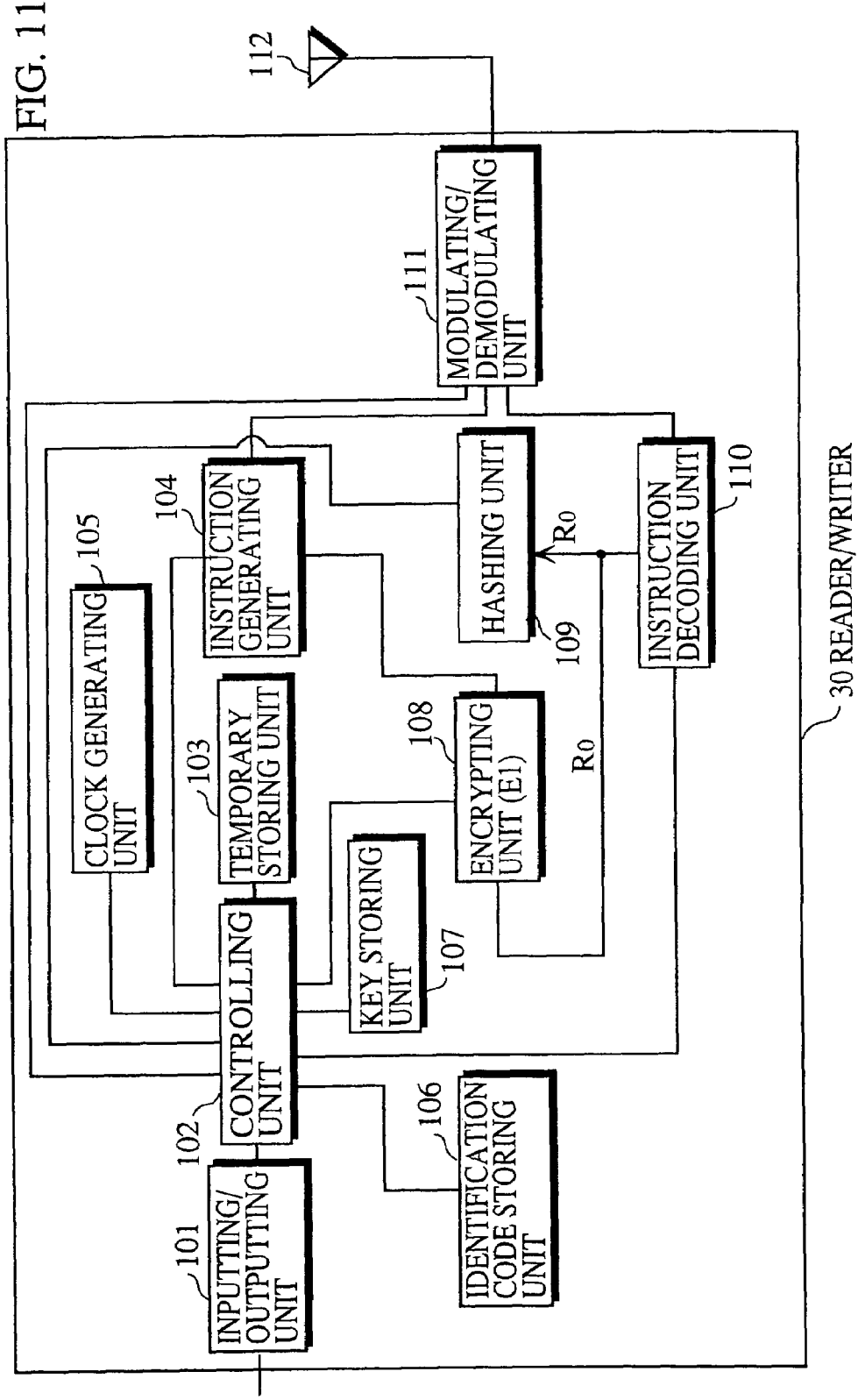
FIG. 11 is a block diagram showing a construction of a reader/writer 30.

The reader/writer 30 is capable of simultaneously reading/writing information from/to fifty radio IC tags at the maximum. As shown in FIG. 11, the reader/writer 30 includes an inputting/outputting unit 101, a controlling unit 102, a temporary storing unit 103, an instruction generating unit 104, a clock generating unit 105, an identification code storing unit 106, a key storing unit 107, an encrypting unit 108, a hashing unit 109, an instruction decoding unit 110, a modulating/demodulating unit 111, and an antenna unit 112.

(1) Temporary Storing Unit 103

The temporary storing unit 103 has fifty identification code areas for temporarily storing fifty identification codes that each identify a radio IC tag.

(2) Identification Code Storing Unit 106

The identification code storing unit 106 has fifty areas for storing fifty identification codes.

(3) Key Storing Unit 107

The key storing unit 107 stores area key K1 for accessing a stage area (described later) of the radio IC tag 80 which the reader/writer 30 is permitted to access, and area key K6 for accessing a common area (described later) of the radio IC tag 80. These area keys are each 56 bits long.

Here, depending on which stage area of the radio IC tag 80 the reader/writer 30 is permitted to access, the key storing unit 107 may store one of area keys K2–K5 instead of area key K1. Area keys K2–K5 are each 56 bits long.

(4) Inputting/Outputting Unit 101

The inputting/outputting unit 101 is connected to a management device 40 (described later), and receives a combination of an input/output instruction and input/output information from the management device 40.

The input/output instruction is either an input instruction or an output instruction. The input instruction is to read data from memory of a radio IC tag, whereas the output instruction is to write data to the memory of the radio IC tag. When the input/output instruction is an input instruction, the input/output information includes a physical address of the memory of the radio IC tag and the number of bytes to be read. When the input/output instruction is an output instruction, the input/output information includes a physical address of the memory of the radio IC tag, the number of bytes to be written, and the contents of writing.

The inputting/outputting unit 101 outputs the received input/output instruction and input/output information to the controlling unit 102. The inputting/outputting unit 101 also receives an access response instruction, access response information, and an identification code from the controlling unit 102, and outputs the received access response instruction, access response information, and identification code to the management device 40.

(5) Controlling Unit 102

Figure 12:
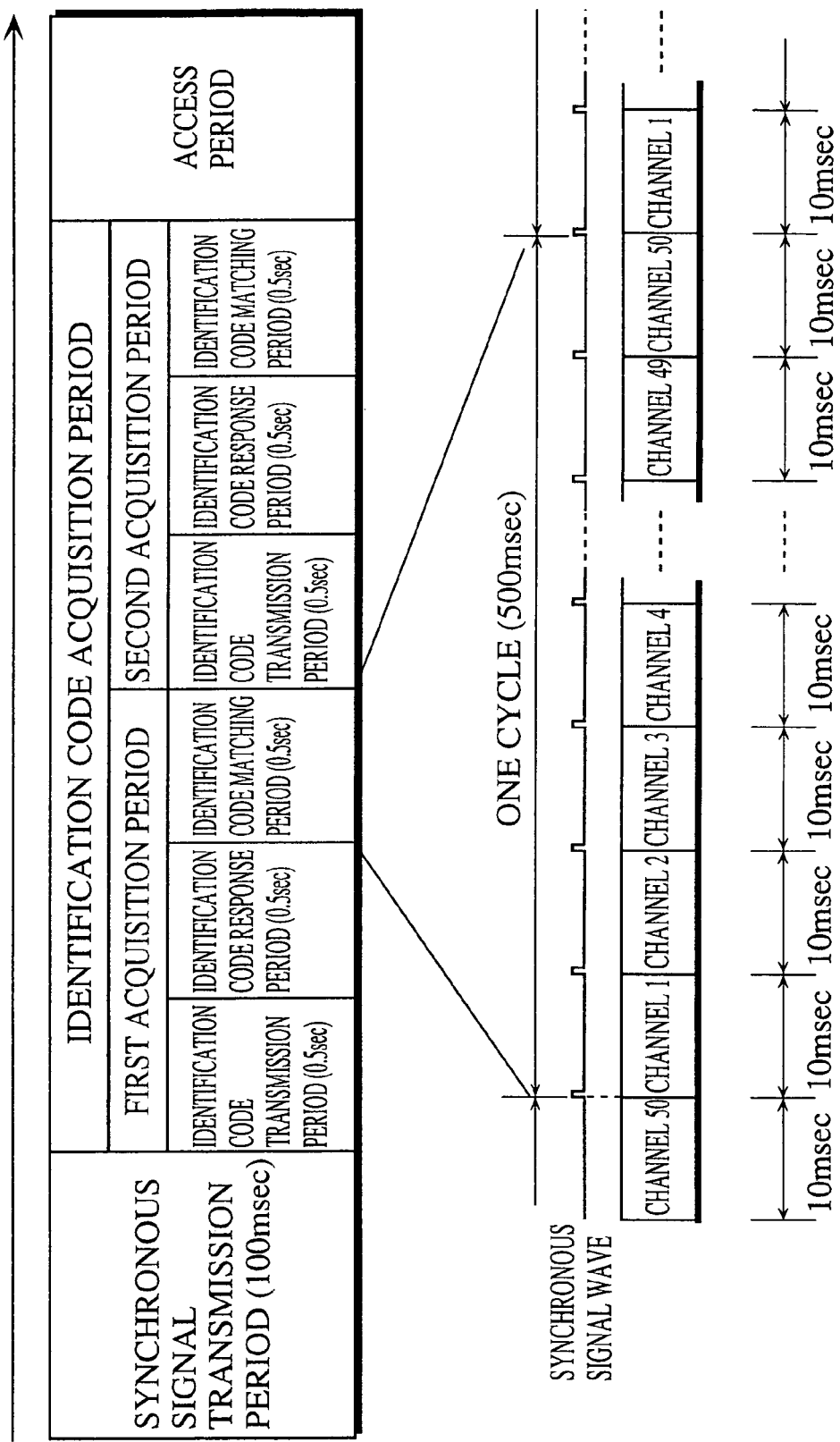
FIG. 12 shows a synchronous signal transmission period, an identification code acquisition period, and an access period.

The controlling unit 102 exercises control of charging radio wave transmission, synchronous signal transmission, identification code acquisition, and access, respectively in a charge radio wave transmission period, a synchronous signal transmission period, an identification code acquisition period, and an access period, as shown in FIG. 12. In the drawing, the horizontal axis represents time.

The charging radio wave transmission period, the synchronous signal transmission period, the identification code acquisition period, and the access period are consecutive in this order on the time axis.

The identification code acquisition period is made up of first and second acquisition periods. The first and second acquisition periods are each made up of an identification code transmission period, an identification code response period, and an identification code matching period, which each have a cycle of 500 msec.

One cycle is evenly divided into fifty blocks of 10 msec. These 10 msec blocks are called channels. The fifty channels which compose one cycle are channel 1, channel 2, channel 3, . . . , and channel 50 beginning with the start of the cycle. The fifty channels are identified by these channel numbers.

(Instruction Output)

The controlling unit 102 receives the input/output instruction and the input/output information from the inputting/outputting unit 101. The controlling unit 102 then outputs a synchronous signal transmission instruction for transmitting a synchronous signal and an identification code acquisition instruction for acquiring an identification code of each radio IC tag, to the instruction generating unit 104 in this order.

(Identification Code Acquisition)

After outputting the identification code acquisition instruction, the controlling unit 102 collects the identification code from each radio IC tag during the identification code acquisition period of 3 seconds, in the following manner. Once the identification code acquisition period has passed, the controlling unit 102 judges that the collection of the identification code of each radio IC tag has completed, and ends the identification code acquisition. As mentioned earlier, the identification code acquisition period is made up of the first and second acquisition periods, in each of which the controlling unit 102 exercises identification code transmission control, identification code response control, and identification code matching control. The reason why the acquisition is repeated twice in the first and second acquisition periods will be given later.

In the identification code transmission period, the controlling unit 102 receives an identification code transmission instruction and an identification code from the instruction decoding unit 110, and a hash value from the hashing unit 109. On receiving the identification code transmission instruction, the controlling unit 102 writes the received identification code to an identification code area in the temporary storing unit 103 which is specified by the received hash value.

The controlling unit 102 receives a reference clock from the clock generating unit 105, and generates a synchronous signal wave in which a synchronous signal made up of one pulse signal of 10 msec is repeated. The controlling unit 102 then outputs the generated synchronous signal wave to the instruction generating unit 104 for 100 msec.

As shown in FIG. 12, one cycle of the synchronous signal wave is 500 msec. One cycle is evenly divided into fifty 10 msec blocks which are each a channel.

The controlling unit 102 selects a channel whose channel number matches the received hash value. The controlling unit 102 then outputs the received identification code and an identification code response instruction for transmitting the identification code, to the instruction generating unit 104 at the selected channel in the identification code response period.

Since the controlling unit 102 selects the channel by using the hash value as the channel number, the same channel may be selected for different radio IC tags. When this happens, the controlling unit 102 gives up collecting the identification codes of these radio IC tags in the first acquisition period, and instead collects the identification codes in the second acquisition period. There is only a little possibility that the same channel is selected for the different radio IC tags again in the second acquisition period.

The controlling unit 102 waits for receiving an identification code matching instruction from the instruction decoding unit 110, at the selected channel in the identification code matching period. On receiving the identification code matching instruction at the selected channel, the controlling unit 102 judges that the identification code stored in the identification code area specified by the hash value in the temporary storing unit 103 is an identification code that properly identifies a radio IC tag. The controlling unit 102 then reads the identification code from the temporary storing unit 103, and writes it to the identification code storing unit 106.

(Authentication by the Radio IC Tag 80 and Area Access)

The controlling unit 102 performs an access request and an area access in the access period, for all radio IC tags identified by the identification codes stored in the identification code storing unit 106, in the following way.

In the access period, the controlling unit 102 reads an identification code from the identification code storing unit 106, and outputs an access request instruction for requesting access to a radio IC tag identified by the read identification code, and the read identification code, to the instruction generating unit 104.

The controlling unit 102 then receives an authenticator transmission instruction and an identification code from the instruction decoding unit 110. On receiving the authenticator transmission instruction, the controlling unit 102 reads an area key (K1 or K6) stored in the key storing unit 107, and outputs the read area key (K1 or K6) to the encrypting unit 108. Which of area keys K1 and K6 is read is determined by the input/output information received from the inputting/outputting unit 101. Which is to say, when the physical address included in the input/output information shows an address in the stage area which the reader/writer 30 is permitted to access, area key K1 is read. When the physical address included in the input/output information shows an address in the common area, area key K6 is read.

The controlling unit 102 then outputs the read identification code and an authentication response instruction to the instruction generating unit 104.

Following this, when receiving an access prohibition instruction an identification code, and a reason code from the instruction decoding unit 110, the controlling unit 102 recognizes an operation error such as an error of area key K1 based on the reason code, and gives up accessing the radio IC tag identified by the identification code. The controlling unit 102 then generates an access response instruction and access response information that includes the reason code, and outputs the access response instruction, the access response information, and the identification code to the inputting/outputting unit 101. The controlling unit 102 generates an access instruction based on the input/output instruction, and generates access information based on the input/output information. The controlling unit 102 then outputs the read identification code, the access information, and the access instruction to the instruction generating unit 104.

When receiving an access response instruction, access response information, and an identification code from the instruction decoding unit 110, the controlling unit 102 outputs the access response instruction, the access response information, and the identification code to the inputting/outputting unit 101.

Note here that each instruction is a code of 4 bits.

The controlling unit 102 also controls the modulating/demodulating unit 111 to output a silence wave in periods during which radio waves are received from the radio IC tag. These periods are the identification code transmission period, the identification code matching period, and the access period, during which the reader/writer 30 receives data from the radio IC tag.

(6) Instruction Generating Unit 104

The instruction generating unit 104 receives the synchronous signal transmission instruction, the identification code acquisition instruction, the combination of the identification code and the identification code response instruction, the combination of the access request instruction and the identification code, the combination of the identification code and the authenticator response instruction, and the combination of the identification code, the access information, and the access instruction, from the controlling unit 102.

The instructions and operands which accompany these instructions are shown in FIG. 13.

On receiving the synchronous signal transmission instruction from the controlling unit 102, the instruction generating unit 104 generates a pulse signal wave based on the synchronous signal transmission instruction, and outputs the generated pulse signal wave to the modulating/demodulating unit 111. Following this, the instruction generating unit 104 receives the synchronous signal wave from the controlling unit 102, generates a pulse signal wave of one second based on the received synchronous signal wave, and outputs the pulse signal wave to the modulating/demodulating unit 111.

When receiving the identification code acquisition instruction, the identification code response instruction, the access request instruction, the authenticator response instruction, or the access instruction from the controlling unit 102, the instruction generating unit 104 generates a pulse signal wave based on the received instruction, and outputs the generated pulse signal wave to the modulating/demodulating unit 111.

On receiving the identification code and the identification code response instruction from the controlling unit 102, the instruction generating unit 104 generates a pulse signal wave based on the identification code after outputting a pulse signal wave based on the identification code response instruction, and outputs the generated pulse signal wave to the modulating/demodulating unit 111.

On receiving the access request instruction and the identification code from the controlling unit 102, the instruction generating unit 104 generates a pulse signal wave based on the identification code after outputting a pulse signal wave based on the access request instruction, and outputs the generated pulse signal to the modulating/demodulating unit 111.

Also, the information generating unit 104 receives the identification code and the authenticator response instruction from the controlling unit 102, and receives encrypted random number R0' from the encrypting unit 108. After outputting a pulse signal wave based on the authenticator response instruction, the information generating unit 104 generates a pulse signal wave based on the identification code and encrypted random number R0', and outputs the generated pulse signal wave to the modulating/demodulating unit 111.

On receiving the identification code, the access information, and the access instruction from the controlling unit 102, the information generating unit 104 generates a pulse signal wave based on the identification code and the access information after outputting a pulse signal wave based on the access instruction, and outputs the generated pulse signal wave to the modulating/demodulating unit 111.

(7) Clock Generating Unit 105

The clock generating unit 105 repeatedly generates the reference clock which shows reference time, and outputs it to the controlling unit 102.

(8) Encrypting Unit 108

The encrypting unit 108 has encryption algorithm E1. Encryption algorithm E1 is an encryption algorithm defined by DES (Data Encryption Standard). An encryption key of encryption algorithm E1 is 56 bits long, and a plaintext inputted to encryption algorithm E1 and ciphertext generated by encryption algorithm E1 are both 64 bits long.

The encrypting unit 108 receives the area key (K1 or K6) from the controlling unit 102, and receives random number R0 from the instruction decoding unit 110. The encrypting unit 108 encrypts random number R0 using the area key (K1 or K6) according to encryption algorithm E1, to generate encrypted random number R0'. The encrypting unit 108 outputs encrypted random number R0' to the instruction generating unit 104.

In this specification, encrypting plaintext M using key K according to encryption algorithm E to generate ciphertext C is expressed as $$C = E(M, K)$$

(9) Hashing Unit 109

The hashing unit 109 receives random number R0 from the instruction decoding unit 110, and inputs random number R0 to hash function H to generate the hash value.

The generated hash value takes one of the fifty values from 1 to 50. Hash function H evenly divides the input value to the fifty values, and sets a value corresponding to the input value, as the hash value.

The hashing unit 109 outputs the hash value to the controlling unit 102.

(10) Instruction Decoding Unit 110

The instruction decoding unit 110 receives pulse signal waves from the modulating/demodulating unit 111. The instruction decoding unit 110 decodes the received pulse signal waves, extracts instructions and operands, and outputs the extracted instructions to the controlling unit 102. The extracted instructions include the identification code transmission instruction, the identification code matching instruction, the authenticator transmission instruction, the access prohibition instruction, and the access response instruction, as shown in FIG. 14. These instructions are each 4 bits long.

When the extracted instruction is the identification code transmission instruction, the instruction decoding unit 110 extracts random number R0 and the identification code as operands, outputs random number R0 to the hashing unit 109, and outputs the identification code to the controlling unit 102.

When the extracted instruction is the authenticator transmission instruction, the instruction decoding unit 110 extracts random number R0 and the identification code as operands. Random number R0 here is an authenticator for authenticating whether the reader/writer 30 is permitted to access a stage area. The instruction decoding unit 110 outputs random number R0 to the encrypting unit 108, and the identification code to the controlling unit 102.

When the extracted instruction is the identification code matching instruction, the instruction decoding unit 110 extracts the identification code as an operand, and outputs the identification code to the controlling unit 102.

When the extracted instruction is the access prohibition instruction, the instruction decoding unit 110 extracts the identification code and the reason code as operands, and outputs them to the controlling unit 102.

When the extracted instruction is the access response instruction, the instruction decoding unit 110 extracts the access response information and the identification code as operands, and outputs them to the controlling unit 102.

(11) Modulating/Demodulating Unit 111

The modulating/demodulating unit 111 receives pulse signal waves or silence waves from the instruction generating unit 104. The modulating/demodulating unit 111 also receives silence waves from the controlling unit 102. On receiving a pulse signal wave, the modulating/demodulating unit 111 uses the received pulse signal wave as a modulation signal, and varies the amplitude of a carrier wave of 2.45 GHz based on the modulation signal. The modulating/demodulating unit 111 outputs the carrier wave of the varied amplitude to the antenna unit 112. On receiving a silence wave, on the other hand, the modulating/demodulating unit 111 outputs a carrier wave of 2.45 GHz to the antenna unit 112 as it is.

The modulating/demodulating unit 111 also receives a power signal from the antenna unit 112, and selects a signal having a frequency of 2.45 GHz from the power signal. The modulating/demodulating unit 111 extracts a pulse signal wave from the selected signal, and outputs the pulse signal wave to the instruction decoding unit 110.

(12) Antenna Unit 112

The antenna unit 112 is roughly made up of a transmitting antenna and a receiving antenna.

As the transmitting antenna, the antenna unit 112 is a directional antenna that emits a radio wave to a specific direction. The antenna unit 112 receives a carrier wave of varied or unvaried amplitude from the modulating/demodulating unit 111, and radiates it into space as a radio wave.

As the receiving antenna, the antenna unit 112 receives a radio wave, converts the received radio wave to a power signal, and outputs the power signal to the modulating/demodulating unit 111.

1.5. Construction of the Radio IC Tag 80

Figure 15:
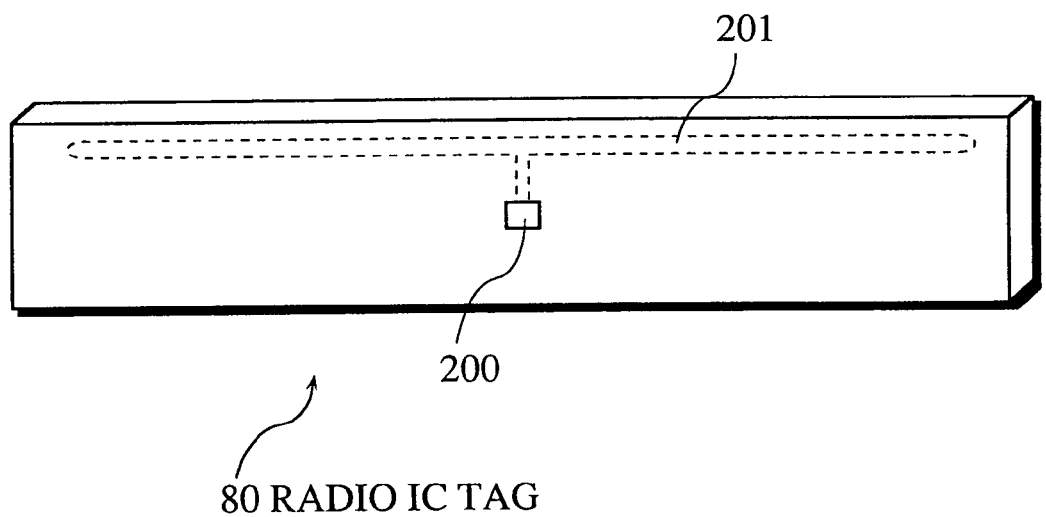
FIG. 15 shows the outward appearance of a radio IC tag 80.

As shown in FIG. 15, the radio IC tag 80 is formed by enclosing an IC chip unit 200 and an antenna unit 201 into a resin made in the form of a plate with a length of 30 mm, a width of 5 mm, and a thickness of 0.5 mm.

The method of forming the radio IC tag 80 is described in Japanese Laid-Open Patent Application No. H08-276458, so that its detailed explanation has been omitted here.

The communication distance of the radio IC tag 80 is approximately 1 m or less, and the communication speed 10–20 msec/byte. Up to fifty radio IC tags 80 can be read at the same time (multiread).

Figure 16:
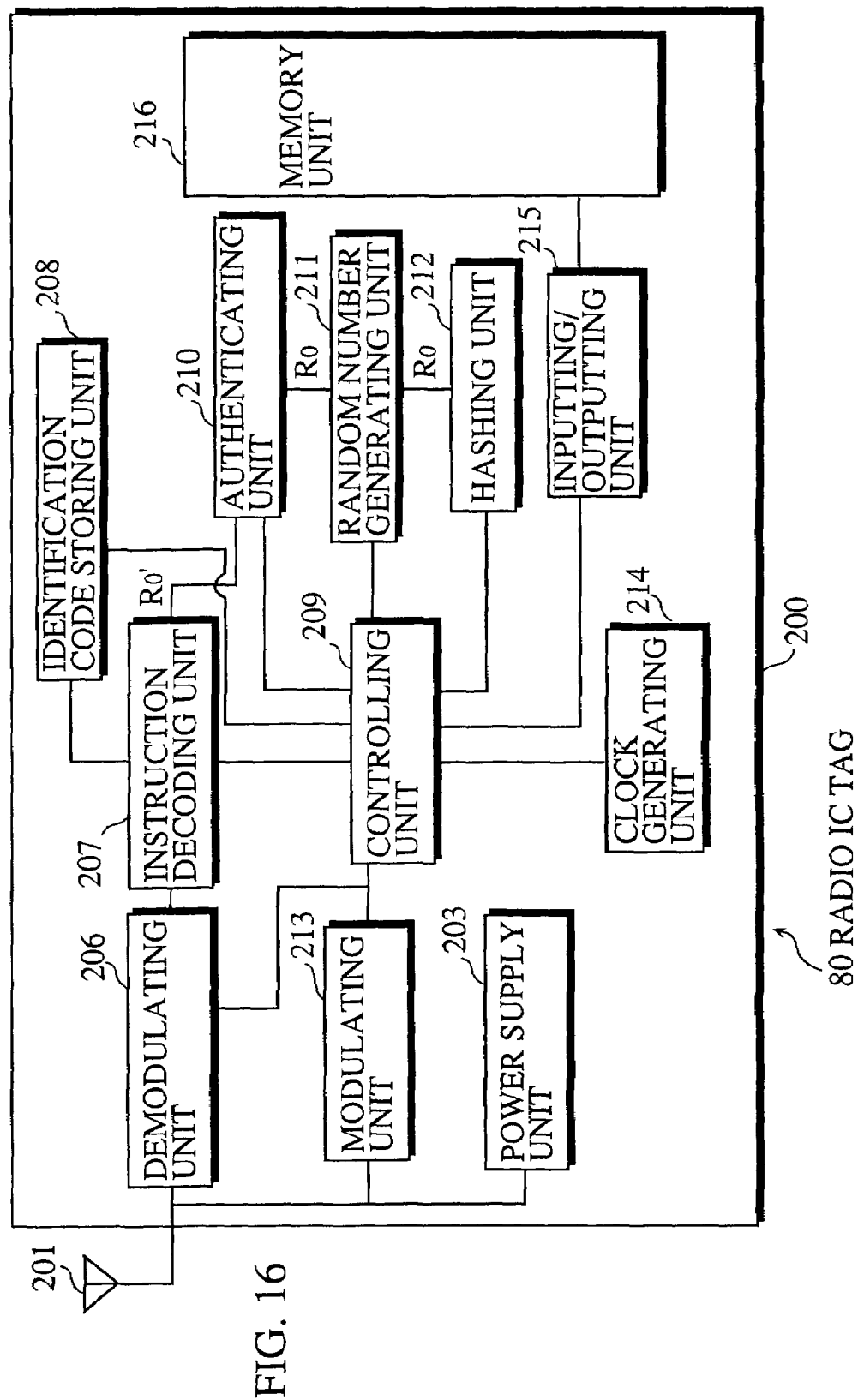
FIG. 16 is a block diagram showing a construction of an IC chip unit 200 in the radio IC tag 80.

As shown in FIG. 16, the IC chip unit 200 includes a power supply unit 203, a demodulating unit 206, an instruction decoding unit 207, an identification code storing unit 208, a controlling unit 209, an authenticating unit 210, a random number generating unit 211, a hashing unit 212, a modulating unit 213, a clock generating unit 214, an inputting/outputting unit 215, and a memory unit 216.

The size of the IC chip unit 200 is 1 mm long, 1 mm wide, and 0.25 µm thick.

(1) Identification Code Storing Unit 208

The identification code storing unit 208 stores an identification code that uniquely identifies the radio IC tag 80. The identification code is 32 bits, and made up of a manufacturer identification code (10 bits), a type code (10 bits), and a production number (12 bits). The manufacturer identification code is used to identify the manufacturer of the radio IC tag 80. The type code is used to identify the specification and type of the radio IC tag 80, out of different specifications and types of radio IC tags. The production number is a value which is set uniquely for each manufacturer and type.

(2) Memory Unit 216

The memory unit 216 is made up of an EEPROM (Electric Erasable and Programmable ROM) having a capacity of 1 KB.

Here, a fuse ROM may be used instead of the EEPROM. The fuse ROM is a type of memory in which data that is once written cannot be erased. By employing the fuse ROM, tampering of data can be prevented. Also, both the EEPROM and the fuse ROM may be used.

Figure 17:
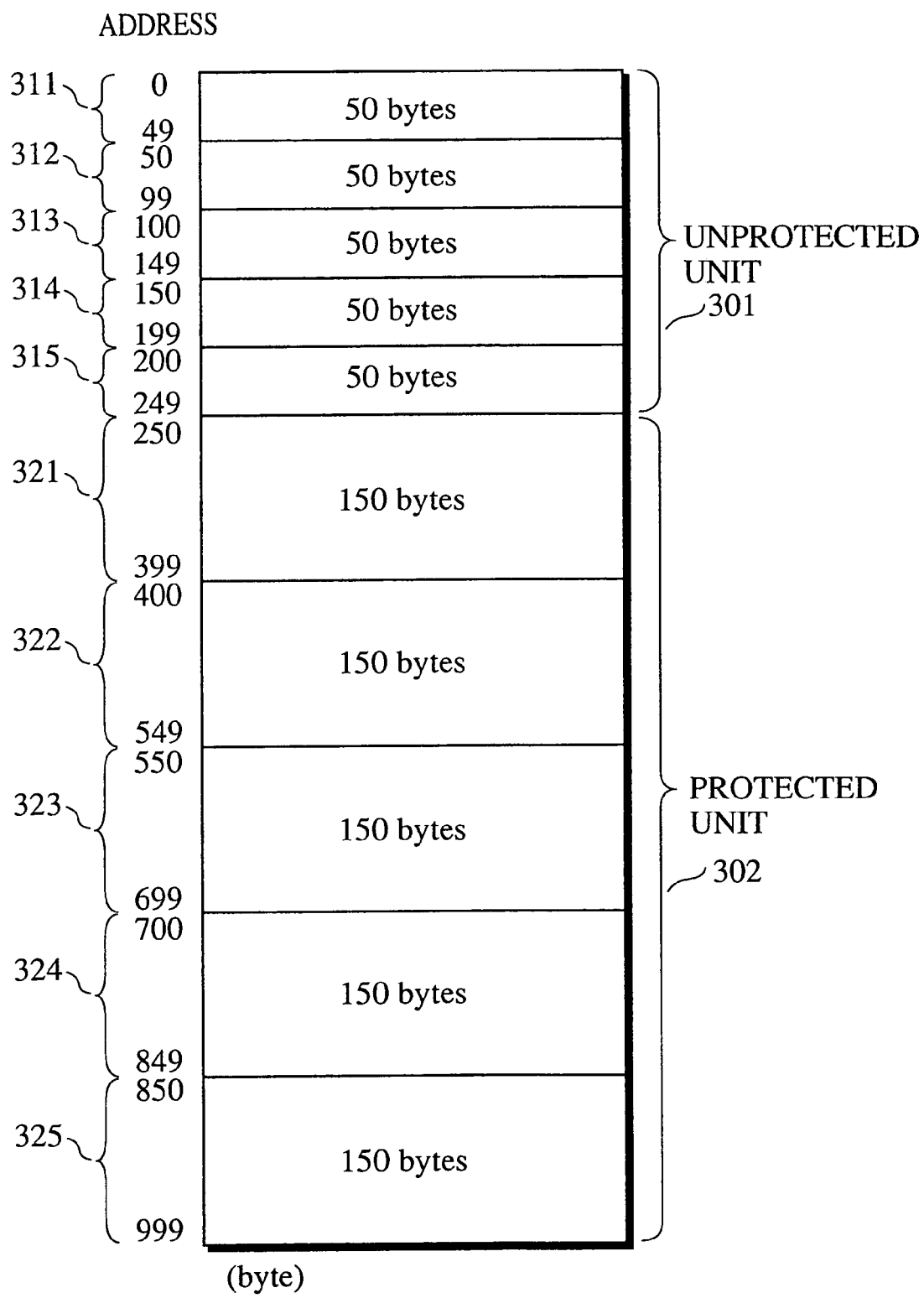
FIG. 17 is a memory map showing a construction of a memory unit 216.

As shown in FIG. 17, the memory unit 216 has an unprotected unit 301 and a protected unit 302. The unprotected unit 301 is located at addresses 0–249 (addresses are expressed in decimal numerals in this specification) and is composed of 250 bytes. The protected unit 302 is located at addresses 250–999 and is composed of 750 bytes.

The unprotected unit 301 is made up of five areas 311–315 which are each 50 bytes. Areas 311–315 are located at addresses 0–49, 50–99, 100–149, 150–199, and 200–249 respectively. The protected unit 302 is made up of five areas 321–325 which are each 150 bytes. Areas 321–325 are located at addresses 250–399, 400–549, 550–699, 700–849, and 850–999 respectively.

Areas 311 and 321, areas 312 and 322, areas 313 and 323, areas 314 and 324, and areas 315 and 325 are stages areas which are used for the five stages of manufacture, distribution, sale, service, and collection/recycle, respectively.

Areas 311–315 are common areas which are permitted to access by area key K6, whereas areas 321–325 are areas which are permitted to access only by area keys K1–K5, respectively.

The reason why the access to the common areas by area key K6 is permitted is to eliminate the risk of unintentional reading/writing of data, by permitting access only to those who have area key K6.

Areas 321–325 are each made up of a write-once unit which can be written only once and a rewritable unit which can be updated.

An example of information which is stored in each area of the memory unit 216 is shown in FIG. 18.

In the drawing, the contents of the memory unit 216 are shown for each stage area.

In the manufacture stage area, "manufacturer name", "product name", and "product number" are stored in the unprotected unit 301, while "production number", "manufacture date", and "factory name" are stored in the write-once unit of the protected unit 302.

In the distribution stage area, "transportation company name" is stored in the unprotected unit 301, while "storage/retrieval date" and "global location number (GLN)" are stored in the write-once unit of the protected unit 302.

In the sale stage area, "guarantee period" and "guarantee number" are stored in the unprotected unit 301, while "wholesaler name", "store name", and "selling date" are stored in the write-once unit of the protected unit 302.

In the service stage area, "washing method" is stored in the unprotected unit 301, while "repairperson name", "repair date", and "repaired component" are stored in the rewritable unit of the protected unit 302.

In the collection/recycle stage area, "collector name", "collection date", "disposer name", and "disposal date" are stored in the write-once unit of the protected unit 302, while "reuse record" is stored in the rewritable unit of the protected unit 302.

(3) Power Supply Unit 203

The power supply unit 203 is connected to the antenna unit 201. The power supply unit 203 receives a power signal from the antenna unit 201, and accumulates the received power signal as electrical charge. The power supply unit 203 also supplies power to each construction element of the radio IC tag 80.

Figure 19:
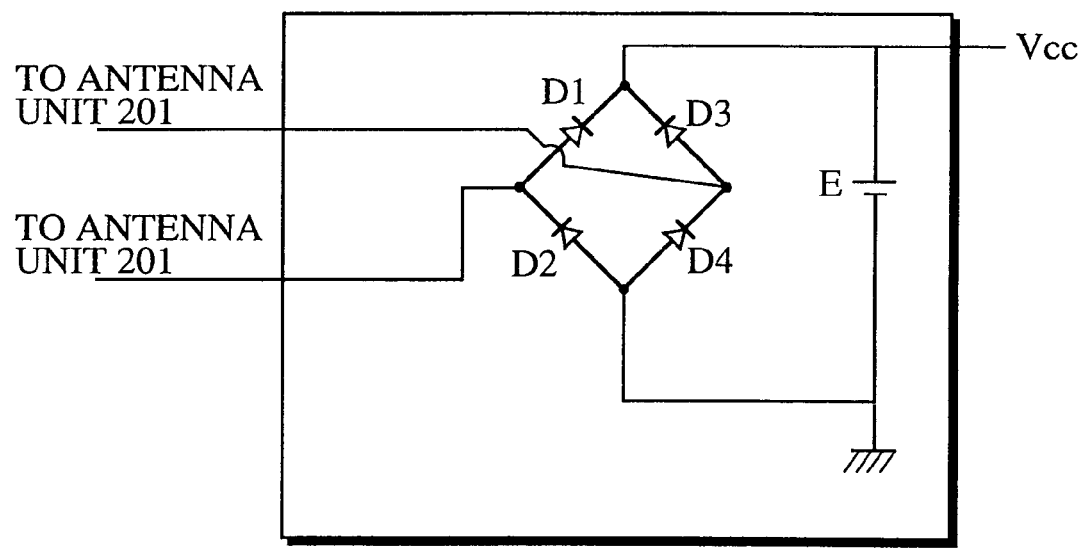
FIG. 19 shows an example of a power supply circuit included in a power supply unit 203.

An example power supply circuit included in the power supply unit 203 is shown in FIG. 19. This power supply circuit is mainly made up of four diodes D1–D4 and battery E. Diodes D1–D2 are connected in series in the same direction, diodes D3–D4 are connected in series in the same direction, and diodes D1–D2 and diodes D3–D4 are connected in parallel in the same direction. One end of the antenna unit 201 is connected to the midpoint of diodes D1 and D2, whilst the other end of the antenna unit 201 is connected to the midpoint of diodes D3 and D4. One end of battery E is connected to the midpoint of diodes D1 and D3, whilst the other end of battery E is connected to the midpoint of diodes D2 and D4.

(4) Demodulating Unit 206

The demodulating unit 206 receives a power signal form the antenna unit 201, and selects a signal having a frequency of 2.45 GHz from the received power signal. The demodulating unit 206 extracts a pulse signal wave from the selected signal, and outputs it to the instruction decoding unit 207.

(5) Instruction Decoding Unit 207

The instruction decoding unit 207 receives pulse signal waves from the demodulating unit 206. The instruction decoding unit 207 decodes the received pulse signal waves, extracts instructions and operands, and outputs them to the controlling unit 209. The extracted instructions include a synchronous signal transmission instruction, an identification code acquisition instruction, an access request instruction, an access instruction, an identification code response instruction, and an authenticator response instruction, as shown in FIG. 13. These instructions and accompanying operands have already been explained, so that their explanation is omitted here.

(6) Controlling Unit 209

The controlling unit 209 receives the instructions and the operands from the instruction decoding unit 207. The received instructions include the synchronous signal transmission instruction, the identification code acquisition instruction, the access request instruction, the access instruction, the identification code response instruction, and the authenticator response instruction. The controlling unit 209 also receives number Xi (described later) which identifies a stage area, or information indicating that there is no matching encrypted random number, from a comparator 235.

After receiving the synchronous signal transmission instruction, the controlling unit 209 receives a synchronous signal wave from the demodulating unit 206, and extracts a synchronous signal from the received synchronous signal wave. The controlling unit 209 also receives a reference clock from the clock generating unit 214, and generates a synchronous signal wave that repeatedly contains a synchronous signal which is synchronous with the extracted synchronous signal, based on the reference clock.

(Identification Code Output)

After receiving the identification code acquisition instruction, the controlling unit 209 instructs the random number generating unit 211 to generate a random number. The controlling unit 209 receives random number R0 from the random number generating unit 211, receives a hash value from the hashing unit 212, and reads the identification code from the identification code storing unit 208. Following this, the controlling unit 209 selects a channel whose channel number matches the hash value, and outputs the read identification code, random number R0, and an identification code transmission instruction to the modulating unit 213, at the selected channel in the identification code transmission period.

In the subsequent identification code response period, the controlling unit 209 receives the identification code response instruction at the selected channel, and further receives an identification code. The controlling unit 209 compares the identification code read from the identification code storing unit 208, with the received identification code. If they match, the controlling unit 209 outputs the identification code and an identification code matching instruction to the modulating unit 213, at the selected channel in the identification code matching period. If they do not match, the controlling unit 209 repeats the above operation beginning with the random number generation by the random number generating unit 211.

(Access Authentication)

In the access period, the controlling unit 209 receives the access request instruction and an identification code. The controlling unit 209 compares the identification code read from the identification code storing unit 208, with the received identification code. If they do not match, the controlling unit 209 waits for receiving another access request instruction. If they match, the controlling unit 209 instructs the random number generating unit 211 to generate a random number, receives random number R0 from the random number generating unit 211, and outputs the identification code, random number R0, and an authenticator transmission instruction to the modulating unit 213.

On receiving the authenticator response instruction, the controlling unit 20–9 further receives an identification code and encrypted random number R0'. The controlling unit 209 compares the identification code read from the identification code storing unit 208, with the received identification code. If they do not match, the controlling unit 209 waits for receiving another authenticator response instruction. If they match, the controlling unit 209 outputs encrypted random number R0' to the comparator 235 in the authenticating unit 210.

When notified by the comparator 235 that there is no matching encrypted random number, the controlling unit 209 outputs the identification code, an access prohibition instruction, and a reason code to the modulating unit 213. The reason code here indicates access to a prohibited stage area. On the other hand, when receiving number Xi, the controlling unit 209 receives the access instruction.

On receiving the access instruction, the controlling unit 209 further receives an identification code and access information. The access instruction is either a read instruction or a write instruction. When the access instruction is a read instruction, the access information includes a physical address and the number of bytes to be read. When the access instruction is a write instruction, the access information includes a physical address, the number of bytes to be written, and the contents of writing. The controlling unit 209 compares the received identification code, with the identification code read from the identification code storing unit 208.

If they do not match, the controlling unit 209 waits for receiving another access instruction. If they match, the controlling unit 209 judges whether the physical address included in the access information is an address in a stage area shown by number Xi. If not, the controlling unit 209 outputs the identification code, an access prohibition instruction, and a reason code to the modulating unit 213. This reason code indicates access to a prohibited stage area. If the physical address is within the stage area shown by number Xi, the controlling unit 209 outputs the access instruction and the access information to the inputting/outputting unit 215.

The controlling unit 209 receives information read from the memory unit 216 or information showing the completion of writing, from the inputting/outputting unit 215. On receiving such information, the controlling unit 209 outputs the identification code, an access response instruction, and access response information to the modulating unit 213. The access response information referred to here is the information read from the memory unit 216 or the information showing the write completion.

(7) Authenticating Unit 210

Figure 20:
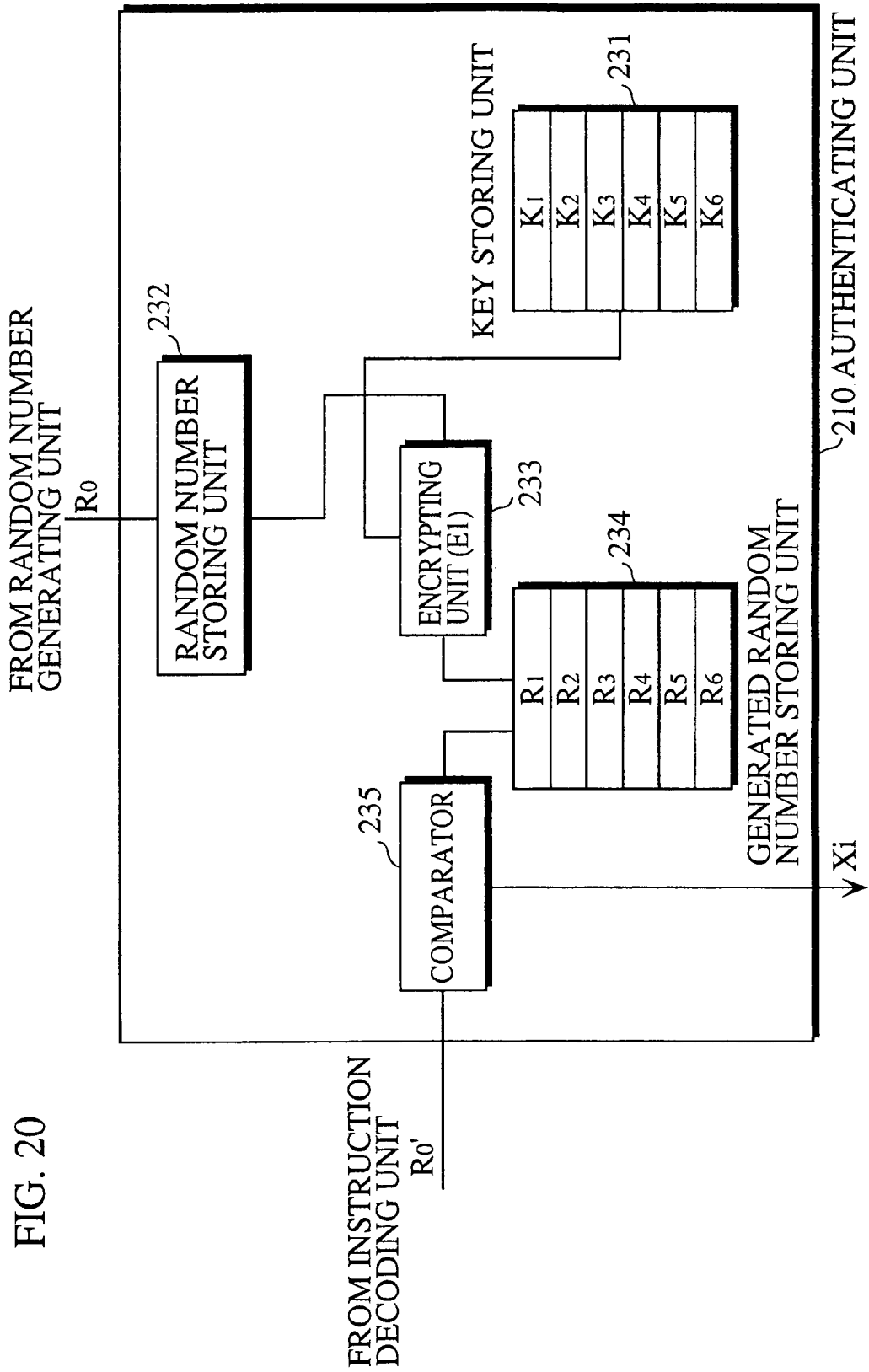
FIG. 20 is a block diagram showing a construction of an authenticating unit 210.

The authenticating unit 210 includes a key storing unit 231, a random number storing unit 232, an encrypting unit 233, a generated random number storing unit 234, and the comparator 235, as shown in FIG. 20.

(a) Key Storing Unit 231

The key storing unit 231 stores area keys K1–K5 for accessing the five stage areas, and area key K6 for accessing the common areas. These area keys are each 56 bits long.

(b) Random Number Storing Unit 232

The random number storing unit 232 receives random number R0 from the random number generating unit 211, and stores random number R0.

(c) Encrypting Unit 233

The encrypting unit 233 has encryption algorithm E1 which is the same as encryption algorithm E1 of the encrypting unit 108.

The encrypting unit 233 reads area keys K1–K6 from the key storing unit 231, reads random number R0 from the random number storing unit 232, and encrypts random number R0 using area keys K1–K6 according to encryption algorithm E1, to generate encrypted random numbers R1–R6. The encrypting unit 233 writes encrypted random numbers R1–R6 to the generated random number storing unit 234.

(d) Generated Random Number Storing Unit 234

The generated random number storing unit 234 stores encrypted random numbers R1–R6.

(e) Comparator 235

The comparator 235 receives encrypted random number R0' from the instruction decoding unit 207, and searches the generated random number storing unit 234 for an encrypted random number that matches encrypted random number R0'. If there is the matching encryption random number, the comparator 235 outputs number Xi that identifies the matching encrypted random number, to the controlling unit 209. For instance, if the matching encrypted random number is R1, number Xi is 1. If the matching encrypted random number is R2, number Xi is 2. Number Xi is a number used for identifying a stage area. When number Xi is 1, 2, 3, 4, or 5, it identifies the manufacture, distribution, sale, service, or collection/recycle stage area, respectively.

When there is no matching encrypted random number, the comparator 235 notifies the controlling unit 209 that there is no matching encrypted random number.

(8) Random Number Generating Unit 211

The random number generating unit 211 receives the instruction to generate a random number from the controlling unit 209, and accordingly generates random number R0. Random number R0 is 160 bits long. The random number generating unit 211 outputs random number R0 to the hashing unit 212, the authenticating unit 210, and the controlling unit 209.

(9) Hashing Unit 212

The hashing unit 212 receives random number R0 from the random number generating unit 211, and inputs random number R0 to hash function H to generate a hash value.

Hash function H is the same as the hash function of the hashing unit 109. The generated hash value takes one of the fifty values 1–50. Hash function H divides the input value evenly into the fifty values, and sets a value corresponding to the input value as the hash value.

The hashing unit 212 outputs the hash value to the controlling unit 209.

(10) Modulating Unit 213.

The modulating unit 213 receives an instruction and an operand or operands from the controlling unit 209, generates a bit string made up of the instruction and the operand, and switches the impedance of the antenna unit 201 in accordance with the bits ("0" or "1") included in the generated bit string. More specifically, when each bit is "1", the modulating unit 213 sets the impedance at a first value, whereas when each bit is "0", the modulating unit 213 sets the impedance at a second value. In so doing, the amplitude and phase of a radio wave reemitted from the antenna unit 201 can be varied, with it being possible to transfer information.

(11) Clock Generating Unit 214

The clock generating unit 214 repeatedly generates the reference clock that shows reference time, and outputs it to the controlling unit 209.

(12) Inputting/Outputting Unit 215

The inputting/outputting unit 215 receives the access instruction and the access information from the controlling unit 209. The access instruction is either a read instruction or a write instruction. When the access instruction is a read instruction, the access information includes the physical address and the number of bytes to be read. When the access instruction is a write instruction, the access information includes the physical address, the number of bytes to be written, and the contents of writing.

When the access instruction is a read instruction, the inputting/outputting unit 215 reads the number of bytes of information beginning with a position specified by the physical address in the memory unit 216. The inputting/outputting unit 215 then outputs the read information to the controlling unit 209.

When the access instruction is a write instruction, the inputting/outputting unit 215 writes the write contents of the number of bytes beginning with a position specified by the physical address in the memory unit 216. The inputting/outputting unit 215 then outputs the write completion information to the controlling unit 209.

Here, the write completion information indicates whether the writing has completed properly. If the writing has not completed properly, the write completion information further includes information showing why the writing has not completed.

(13) Antenna Unit 201

The antenna unit 201 is a receiving antenna. The antenna unit 201 receives a radio wave, converts it to a power signal, and outputs the power signal to the demodulating unit 206 and the power supply unit 203. The antenna unit 201 also reflects (reemits) the received radio wave.

1.6. Construction of a Management Device 40

The management devices 40a and 40b have the same construction. Also, the mobile-phone-type reader/writer 30c, the mobile-phone-equipped management device 40d, and the portable-terminal-type reader/writer 30e contain the same construction as the management device 40a. Accordingly, these devices are collectively explained as a management device 40 below.

Figure 21:
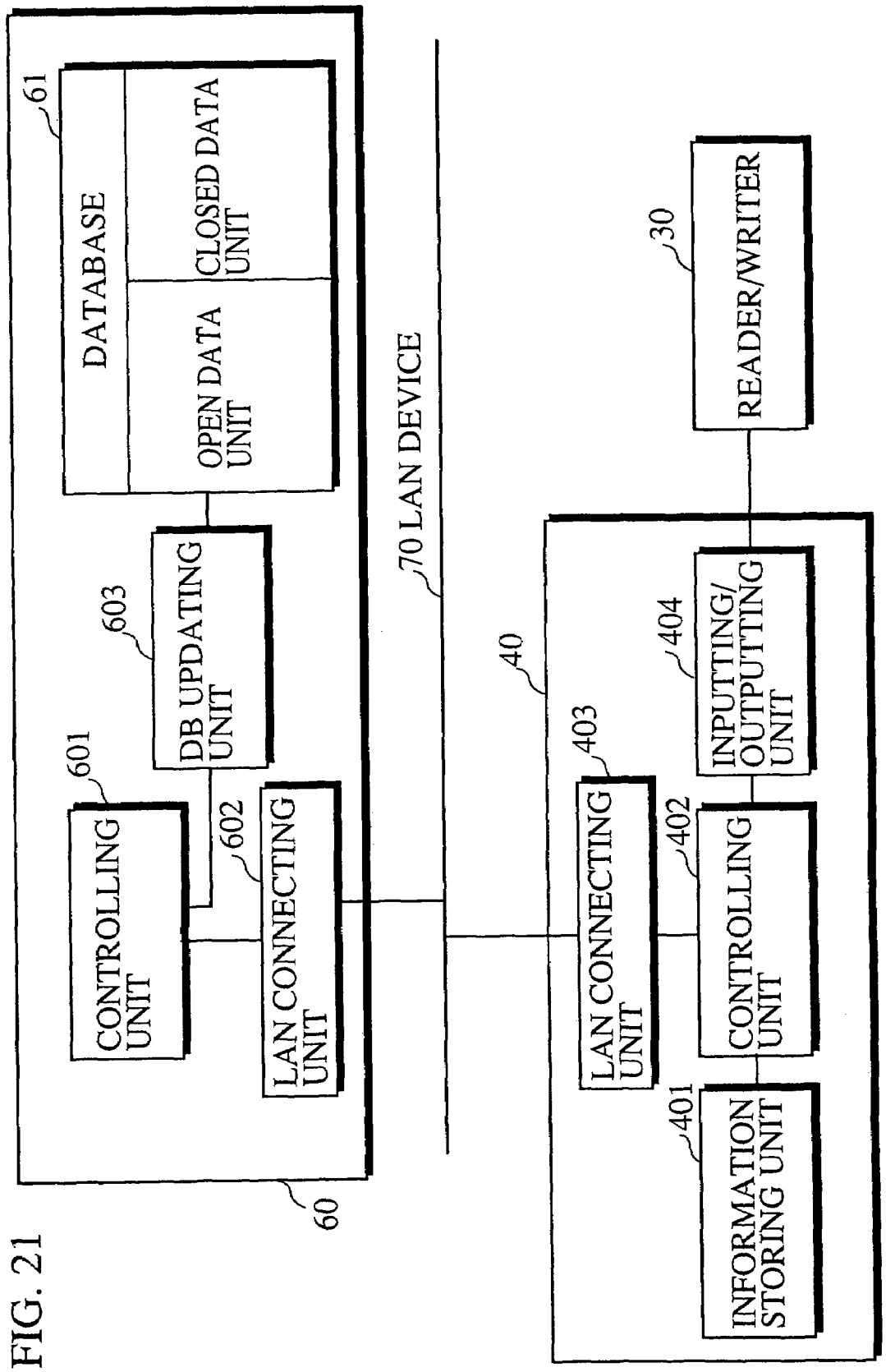
FIG. 21 is a block diagram showing constructions of a management device 40 and host computer 60.

As shown in FIG. 21, the management device 40 includes an information storing unit 401, a controlling unit 402, a LAN connecting unit 403, and an inputting/outputting unit 404. The management device 40 is implemented by a microprocessor, a hard disk, a ROM (Read Only Memory), a RAM (Random Access Memory), and the like.

(1) Inputting/Outputting Unit 404

The inputting/outputting unit 404 is connected to the inputting/outputting unit 101 of the reader/writer 30. The inputting/outputting unit 404 receives a combination of an input/output instruction and input/output information from the controlling unit 402, and outputs the combination to the inputting/outputting unit 101.

The inputting/outputting unit 404 also receives an access response instruction, access response information, and an identification code from the inputting/outputting unit 101, and outputs them to the controlling unit 402.

(2) Controlling Unit 402

The controlling unit 402 generates the combination of the input/output instruction and the input/output information, and outputs the combination to the inputting/outputting unit 404.

The input/output instruction is either an input instruction or an output instruction. The input instruction is to read data from memory of a radio IC tag, whereas the output instruction is to write data to the memory of the radio IC tag. When the input/output instruction is an input instruction, the input/output information includes a physical address of the memory of the radio IC tag and the number of bytes to be read. When the input/output instruction is an output instruction, the input/output information includes a physical address of the memory of the radio IC tag, the number of bytes to be written, and the contents of writing.

The controlling unit 402 has encryption algorithm E2 and decryption algorithm B2. Encryption algorithm E2 is used to encrypt a plaintext using an encryption key to generate a ciphertext. Decryption algorithm B2 is used to decrypt the ciphertext using a decryption key to generate the plaintext. Though encryption algorithm E2 is different with encryption algorithm E1 in this embodiment, they may be the same encryption algorithm.

When generating the input information corresponding to the input instruction, the controlling unit 402 encrypts the input information such as "manufacturer name" and "transportation company name" using the encryption key according to encryption algorithm E2, to generate a ciphertext. The controlling unit 402 sets this ciphertext as the input information. This encryption of the input information may be omitted.

The controlling unit 402 also receives the access response instruction, the access response information, and the identification code from the inputting/outputting unit 404. When the access response instruction corresponds to the input instruction, the controlling unit 402 decrypts the access response information using the decryption key according to decryption algorithm B2, to generate a plaintext. The controlling unit 402 writes the plaintext as the access response information and the identification code to the information storing unit 401. Here, if the access response information has not been encrypted, such decryption is unnecessary.

The controlling unit 402 receives information from the host computer 60 via the LAN connecting unit 403, and writes the received information to the information storing unit 401. The controlling unit 402 also outputs information stored in the information storing unit 401, to the host computer 60 via the LAN connecting unit 403.

(3) Information Storing Unit 401

The information storing unit 401 stores various information.

(4) LAN Connecting Unit 403

The LAN connecting unit 403 connects the controlling unit 402 and the LAN device 70.

(5) Constructions of the Mobile-Phone-Type Reader/Writer 30c, Mobile-Phone-Equipped Management Device 40d, and Portable-Terminal-Type Reader/Writer 30e The mobile-phone-type reader/writer 30c, the mobile-phone-equipped management device 40d, and the portable-terminal-type reader/writer 30e have constructions similar to the management device 40. Their differences with the management device 40 are briefly explained below.

The mobile-phone-type reader/writer 30c and the mobile-phone-equipped management device 40d have a mobile phone function in place of the LAN connecting unit 403. With such a mobile phone function, the mobile-phone-type reader/writer 30c and the mobile-phone-equipped management device 40d are connected to the host computer 60 via the base station 50, the public network, the receiver 51, the connector 53, and the LAN device 70.

The portable-terminal-type reader/writer 30e is loaded with the IC card 52 instead of the LAN connecting unit 403. With the IC card 52, the portable-terminal-type reader/writer 30e is connected to the host computer 60 via the management device 40e and the LAN device 70.

1.7. Construction of the Host Computer 60

As shown in FIG. 21, the host computer 60 is roughly made up of a controlling unit 601, a LAN connecting unit 602, a DB updating unit 603, and the database 61. The host computer 60 is implemented by a microprocessor, a hard disk, a ROM, a RAM, and the like.

(1) Database 61

The database 61 is composed of an open data unit and a closed data unit. The open data unit and the closed data unit are each made up of a manufacture data unit, a distribution data unit, a sale data unit, a service data unit, and a collection/recycle data unit.

Figure 22:
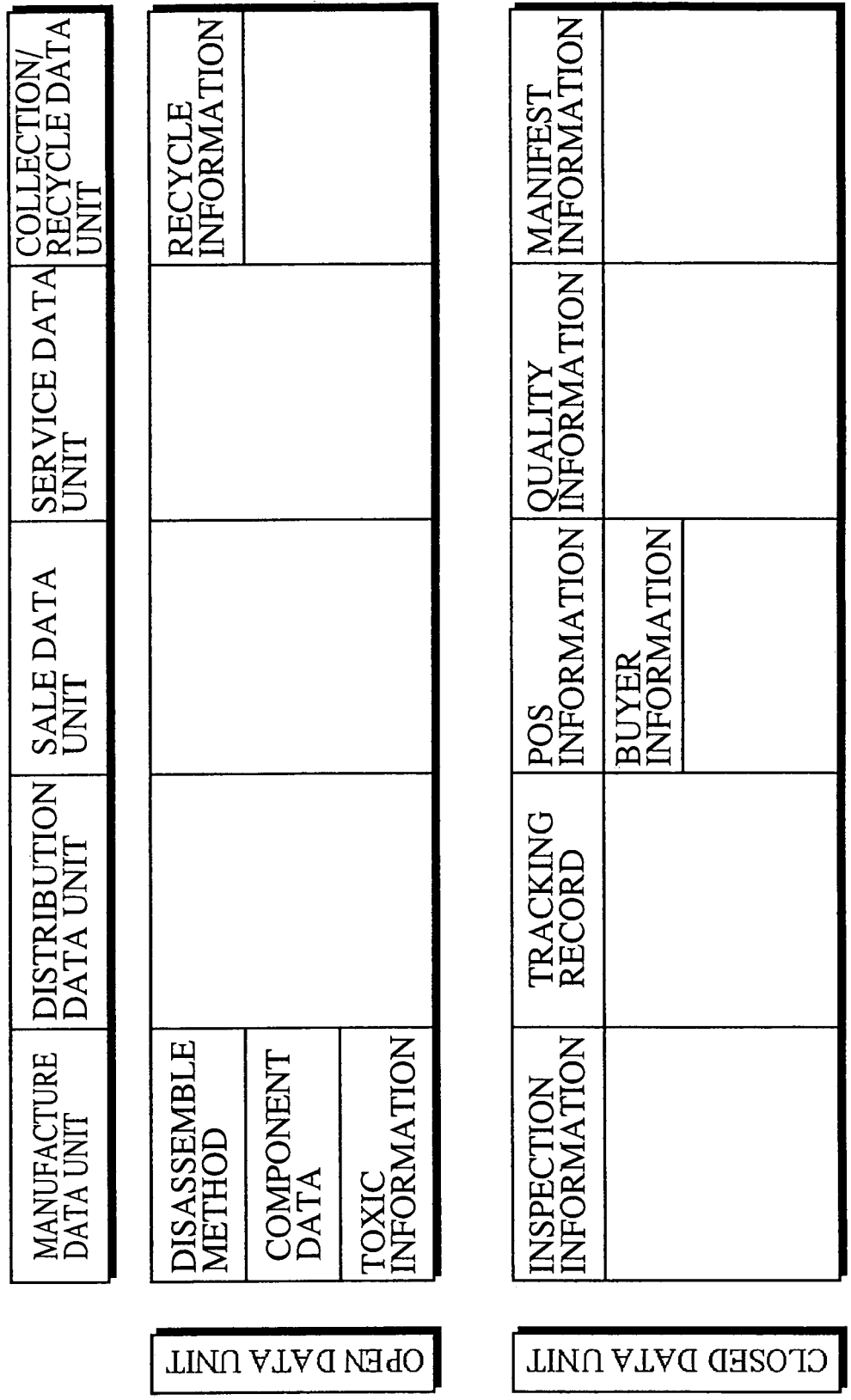
FIG. 22 shows an example of information stored in a database 61 in the host computer 60.

An example of information stored in the database 61 is shown in FIG. 22. In the open data unit, "disassemble method", "component data", and "toxic information" are stored in the manufacture data unit, and "recycle information" is stored in the collection/recycle data unit.

In the closed data unit, "inspection information" is stored in the manufacture data unit, "tracking information" in the distribution data unit, "POS information" and "buyer information" in the sale data unit, "quality information" in the service data unit, and "manifest information" in the collection/recycle data unit.

(2) DB Updating Unit 603

The DB updating unit 603 writes/reads information to/from the database 61, according to instructions from the controlling unit 601.

(3) Controlling Unit 601

The controlling unit 601 writes/reads information to/from the database 61, via the DB updating unit 603.

The controlling unit 601 is connected to the management device 40 through the LAN connecting unit 602. The controlling unit 601 receives information from the management device 40, and writes it to the database 61. The controlling unit 601 also outputs information read from the database 61, to the management device 40.

(4) LAN Connecting Unit 602

The LAN connecting unit 602 connects the controlling unit 601 and the LAN device 70.

1.8. Operations of the Reader/Writer 30 and the Radio IC Tag 80

Operations of the reader/writer 30 and the radio IC tag 80 are explained next.

(1) Overall Operations of the Reader/Writer 30 and the Radio IC Tag 80

Overall operations of the reader/writer 30 and radio IC tag 80 are explained with reference to FIG. 23.

In the synchronous signal transmission period, the controlling unit 102 outputs a synchronous signal transmission instruction, and outputs a generated synchronous signal wave. The instruction generating unit 104 generates and outputs a pulse signal wave based on the synchronous signal transmission instruction, and generates and outputs a pulse signal wave based on the synchronous signal wave. The modulating/demodulating unit 111 varies the amplitude of a carrier wave and outputs the resulting carrier wave. The antenna unit 112 emits the carrier wave into space as a radio wave. The controlling unit 209 receives the synchronous signal transmission instruction via the antenna unit 201, the demodulating unit 206, and the instruction decoding unit 207. The controlling unit 209 further receives the synchronous signal wave, extracts a synchronous signal, and generates a synchronous signal wave which repeatedly contains a synchronous signal that synchronizes with the extracted synchronous signal (S102).

The controlling unit 102 outputs an identification code acquisition instruction. The instruction generating unit 104 generates and outputs a pulse signal wave. The modulating/demodulating unit 111 varies the amplitude of a carrier wave, and outputs the resulting carrier wave. The antenna unit 112 emits the carrier wave into space as a radio wave. The controlling unit 209 receives the identification code acquisition instruction via the antenna unit 201, the demodulating unit 206, and the instruction decoding unit 207 (S103).

The controlling unit 102 monitors whether the identification code acquisition period of 3 seconds has passed (S104). In this identification code acquisition period of 3 seconds, an identification code of each radio IC tag is collected (S105). Once the identification code acquisition period has passed, the controlling unit 102 judges that the collection of the identification code of each radio IC tag has completed, and ends the identification code acquisition process.

In the access period that follows, the controlling unit 102 repeatedly performs area access authentication and area access for a radio IC tag identified by an identification code (S107), for all identification codes stored in the identification code storing unit 106 (S106). The controlling unit 102 then completes the operation.

(2) Operation of Acquiring the Identification Code of the Radio IC Tag 80

Figure 23:
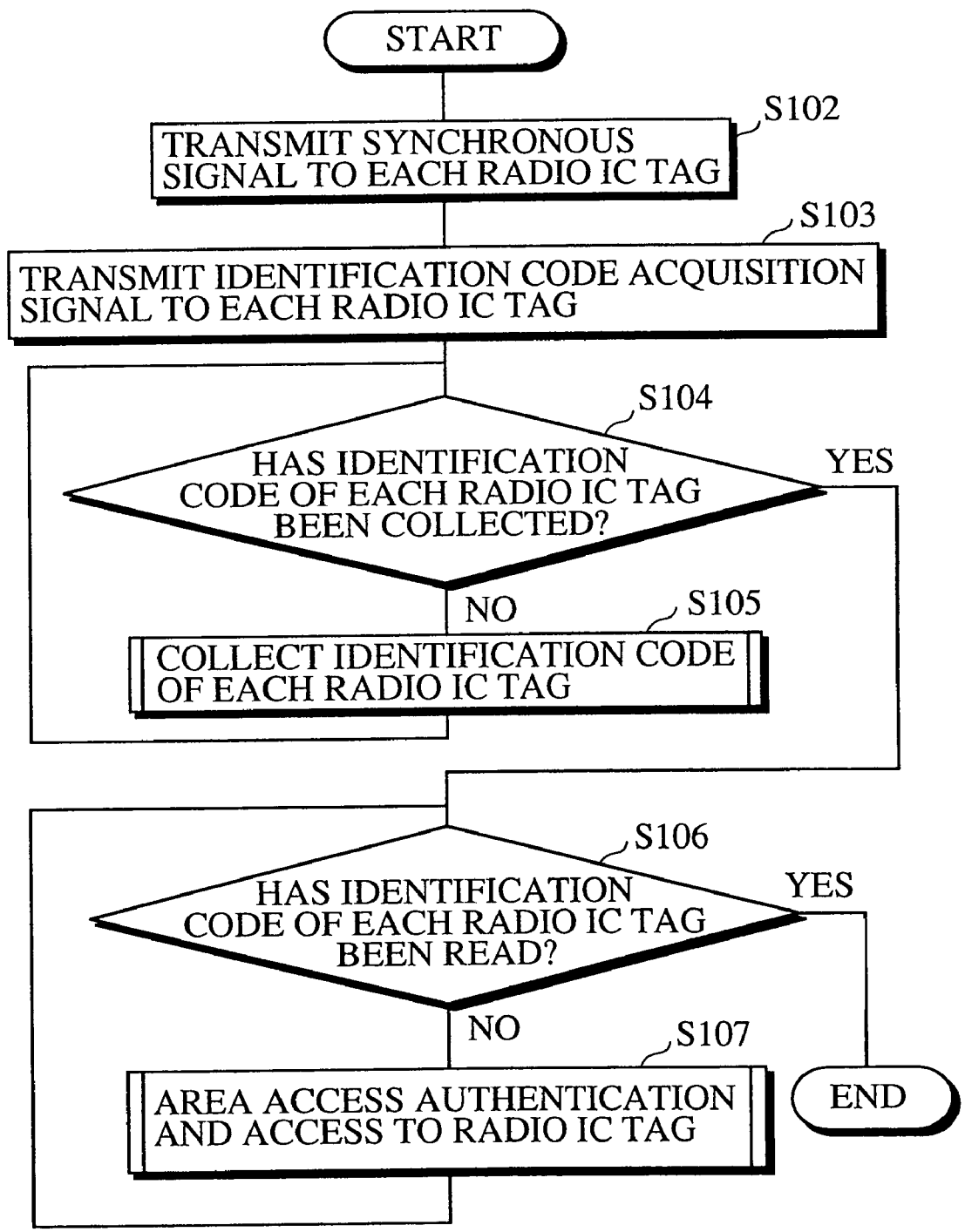
FIG. 23 is a flowchart showing overall operations of the reader/writer 30 and radio IC tag 80.
Figure 24:
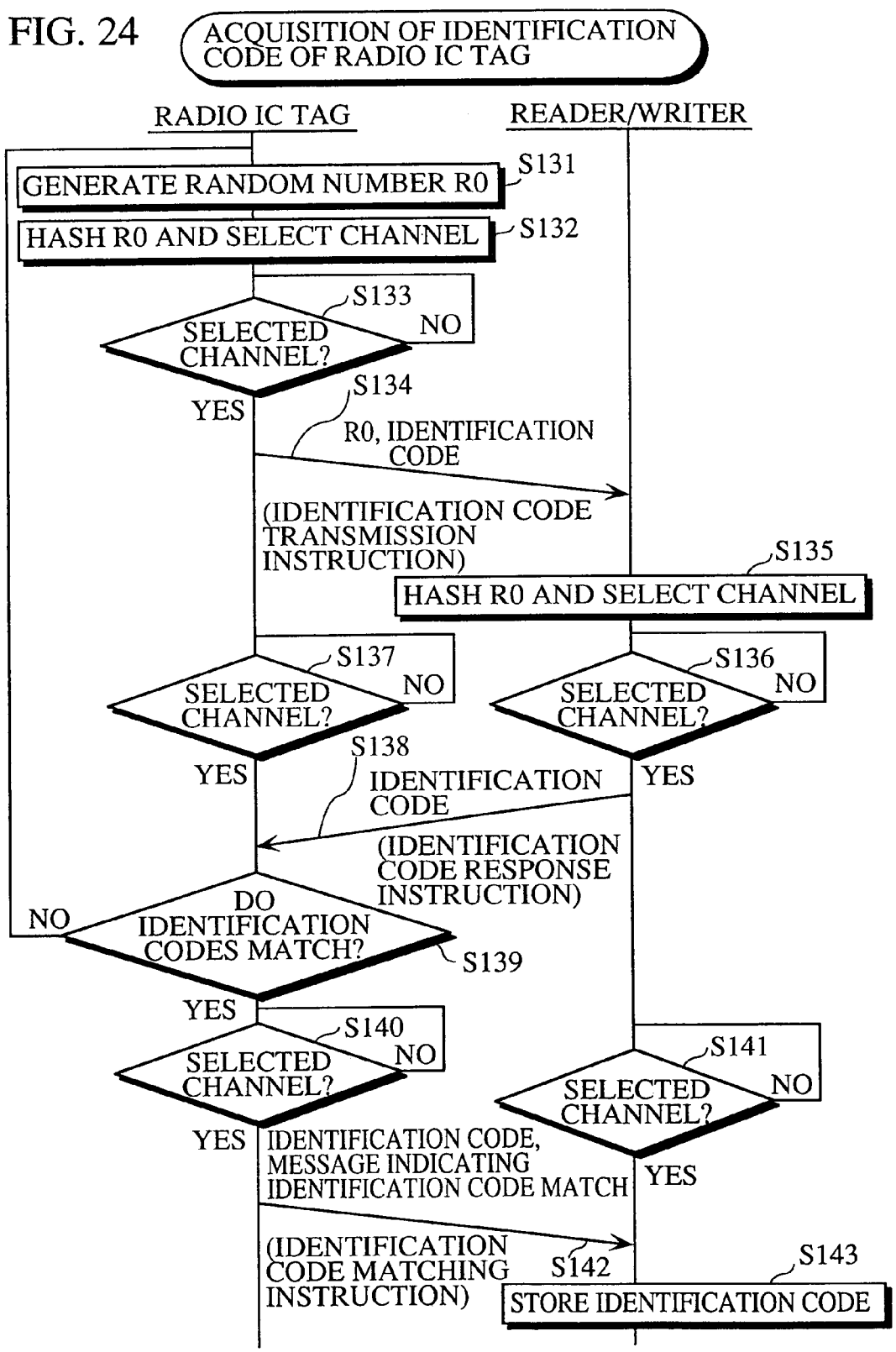
FIG. 24 is a diagram showing an operation of acquiring an identification code of the radio IC tag 80.

An operation of acquiring the identification code of the radio IC tag 80 shown in step S105 of FIG. 23 is explained in detail below, by referring to FIG. 24.

The controlling unit 209 instructs the random number generating unit 211 to generate a random number, and the random number generating unit 211 generates random number R0 (S131). The hashing unit 212 generates a hash value. The controlling unit 209 reads an identification code from the identification code storing unit 208, receives the hash value from the hashing unit 212, and selects a channel whose channel number is the received hash value (S132). The controlling unit 209 transmits the read identification code, random number R0, and an identification code transmission instruction to the reader/writer 30 via the modulating unit 213 and the antenna unit 201, at the selected channel in the identification code transmission period (S133). The controlling unit 102 receives the identification code transmission instruction and the identification code through the antenna unit 112, the modulating/demodulating unit 111, and the instruction decoding unit 110, and the hashing unit 109 receives random number R0 (S134). The hashing unit 109 generates a hash value. The controlling unit 102 writes the received identification code to the temporary storing unit 103, and selects a channel whose channel number is the generated hash value (S135). The controlling unit 102 transmits the identification code and an identification code response instruction to the radio IC tag 80 via the instruction generating unit 104, the modulating/demodulating unit 111, and the antenna unit 112, at the selected channel in the identification code response period (S136). The controlling unit 209 receives the identification code response instruction and the identification code via the antenna unit 201, the demodulating unit 206, and the instruction decoding unit 207 (138), at the selected channel in the identification code response period (S137). The controlling unit 209 compares the received identification code with the identification code read from the identification code storing unit 208. If they match (S139), the controlling unit 209 outputs the identification code and an identification code matching instruction via the modulating unit 213 and the antenna unit 201, at the selected channel in the identification code matching period (S140). If they do not match, the operation returns to step S131.

The controlling unit 102 receives the identification code matching instruction via the antenna unit 112, the modulating/demodulating unit 111, and the instruction decoding unit 110 (S142), at the selected channel in the identification code matching unit (S141). The controlling unit 102 reads the identification code from the temporary storing unit 103, and writes the identification code to the identification code storing unit 106 (S143).

(3) Area Access Authentication Operation and Area Access Operation of the Reader/Writer 30 and the Radio IC Tag 80

An area access authentication operation and an area access operation shown in step S107 of FIG. 23 is explained in detail below, by referring to FIG. 25.

In the access period, the controlling unit 102 reads one identification code from the identification code storing unit 106 (S161), and outputs the identification code and an access request instruction via the instruction generating unit 104, the modulating/demodulating unit 111, and the antenna unit 112. The controlling unit 209 receives the identification code and the access request instruction via the antenna unit 201, the demodulating unit 206, and the instruction decoding unit 207 in the access period (S162). The controlling unit 209 compares the received identification code with the identification code read from the identification code storing unit 208 (S163). If they do not match, the controlling unit 209 waits for receiving another access request instruction. If they match, the controlling unit 209 instructs the random number generating unit 211 to generate a random number, and the random number generating unit 211 generates random number R0 (S164). The encrypting unit 233 reads area keys K1–K6 from the key storing unit 231, and encrypts random number R0 using area keys K1–K6 according to encryption algorithm E1. The encrypting unit 233 writes encrypted random numbers R1–R6 to the generated random number storing unit 234 (S166). The controlling unit 209 outputs the identification code, random number R0, and an authenticator transmission instruction via the modulating unit 213 and the antenna unit 201. The controlling unit 102 receives the authenticator transmission instruction and the identification code via the antenna unit 112, the modulating/demodulating unit 111, and the instruction decoding unit 110, and the hashing unit 109 receives random number R0 (S165). The hashing unit 109 generates a hash value. The controlling unit 102 reads an area key stored in the key storing unit 107, and the encrypting unit 108 encrypts random number R0 using the area key to generate encrypted random number R0' (S167). The controlling unit 102 outputs the identification code and an authenticator response instruction to the instruction generating unit 104. The instruction generating unit 104 outputs encrypted random number R0', the identification code, and the authenticator response instruction via the modulating/demodulating unit 111 and the antenna unit 112. The instruction decoding unit 207 receives encrypted random number R0', and the controlling unit 209 receives the authenticator response instruction and the identification code, via the antenna unit 201 and the demodulating unit 206 (S168). The controlling unit 209 compares the received identification code with the identification code read from the identification code storing unit 208 (S169). If they do not match, the controlling unit 209 waits for receiving another authenticator response instruction. If they match, the comparator 235 searches the generated random number storing unit 234 for an encrypted random number which matches encrypted random number R0' (S170). If there is a matching encrypted random number, the comparator 235 outputs number Xi identifying the matching encrypted random number, to the controlling unit 209 (S172).

If there is no matching encrypted random number, the comparator 235 outputs information indicating that no encrypted random number matches encrypted random number R0', to the controlling unit 209. The controlling unit 209 outputs the identification code, an access prohibition instruction, and a reason code via the modulating unit 213 and the antenna unit 201 (S171).

The controlling unit 102 outputs the identification code, access information, and an access instruction via the instruction generating unit 104, the modulating/demodulating unit 111, and the antenna unit 112. The controlling unit 209 receives the access instruction, the identification code, and the access information via the antenna unit 201, the demodulating unit 206, and the instruction decoding unit 207 (S173). The controlling unit 209 compares the received identification code with the identification code read from the identification code storing unit 208 (S174). If they do not match, the controlling unit 209 waits for receiving another access instruction. If they match, the controlling unit 209 judges whether a physical address included in the access information is an address in a stage area identified by number Xi (S175). If the physical address is not in the stage area identified by number Xi, the controlling unit 209 outputs the identification code, an access prohibition instruction, and a reason code through the modulating unit 213 and the antenna unit 201. The controlling unit 102 receives the identification code, the access prohibition instruction, and the reason code via the antenna unit 112, the modulating/demodulating unit 111, and the instruction decoding unit 110 (S176).

If the physical address is in the stage area identified by number Xi, the controlling unit 209 outputs the access instruction and the access information to the inputting/outputting unit 215. The inputting/outputting unit 215 receives the access instruction and the access information from the controlling unit 209, and accesses the memory unit 216 in accordance with the access instruction and the access information. The controlling unit 209 generates access response information based on the access result (S177), and outputs the identification code, an access response instruction, and the access response information via the modulating unit 213 and the antenna unit 201. The controlling unit 102 receives the access response instruction, the access response information, and the identification code via the antenna unit 112, the modulating/demodulating unit 111, and the instruction decoding unit 110 (S178). The inputting/outputting unit 101 receives the access response instruction, the access response information, and the identification code, and outputs the received access response instruction, access response information, and identification code to the management device 40.

1.9. Type of the Radio IC tag 80 and its Applications

The radio IC tag 80 uses a semi-microwave band of 2.4 to 2.5 GHz as a carrier frequency, and performs communication by radio type.

Alternatively, the radio IC tag 80 may use an UHF band of 860 to 915 MHz, and perform communication by radio type. In this case, the size of the radio IC tag 80 is, for instance, 100 mm long, 15 mm wide, and 0.5 mm thick. Also, the communication distance is 2–3 m, and the communication speed 10–20 msec/byte.

A radio IC tag which employs magnetic type (electromagnetic induction type) is also known, that uses a frequency of 125 KHz or 13.56 MHz. The size of this radio IC tag is 6 cm long and 8 cm wide. Its communication distance is 50 cm or less, and its communication speed is several kilobits per second. According to this type, only one radio IC tag can be read at one time, or up to about three radio IC tags can be multi-read.

Thus, the radio type uses higher frequencies than the magnetic type, with it being possible to reduce the antenna size and miniaturize the tag.

Figure 26:
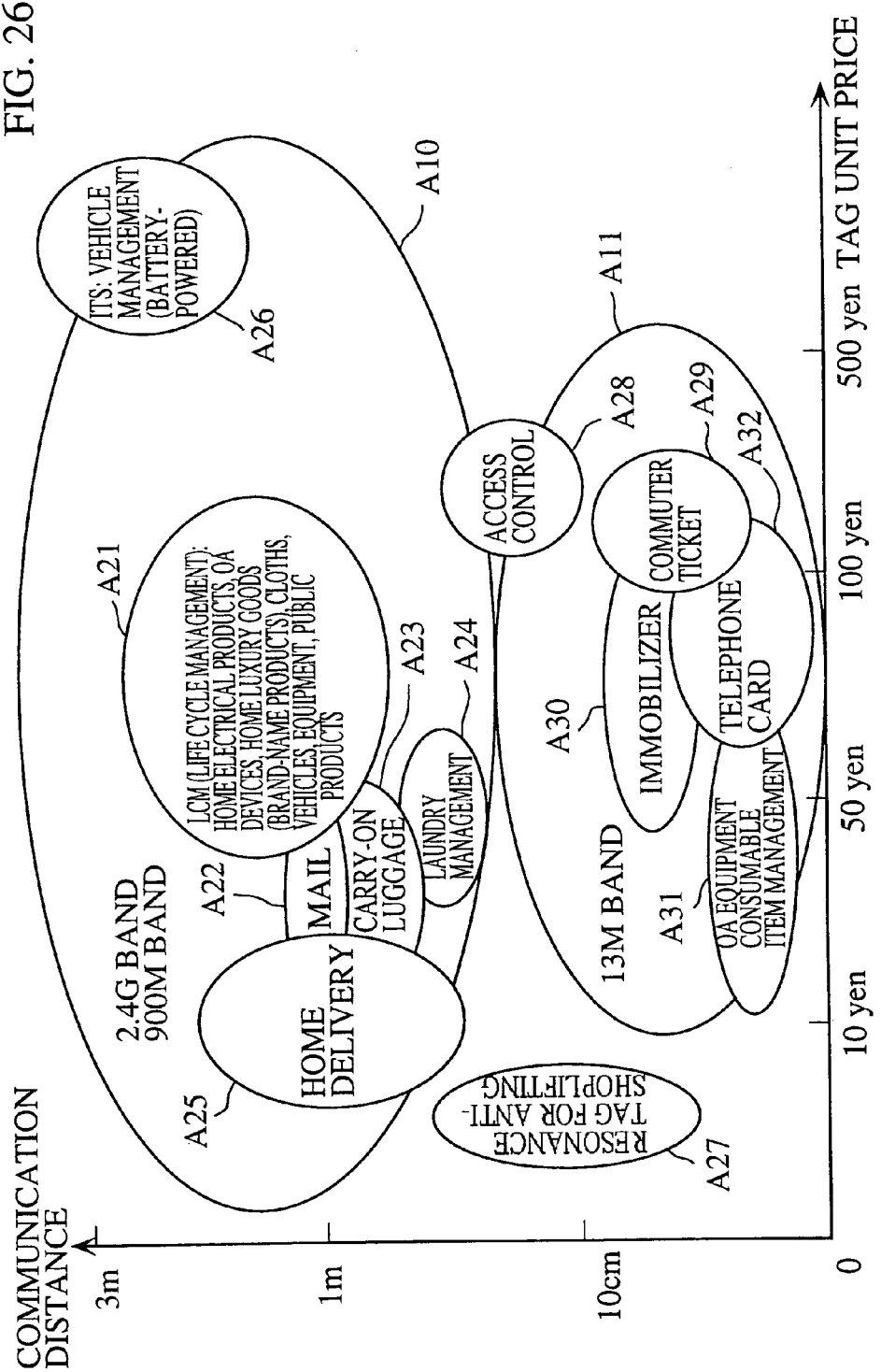
FIG. 26 shows the relations between applications of the radio IC tag 80, unit prices, and communication distances.

Relations between applications, tag unit prices, and communication distances of the radio IC tag 80 are shown in FIG. 26. In the drawing, the horizontal axis represents the unit price, while the vertical axis represents the communication distance.

Range A10 where the unit price is about several yen to five hundred yen and the communication distance is no less than several tens centimeters is an application range of a radio IC tag that uses radio type. Applications of this range include home delivery A25, mail A22, carry-on luggage A23, laundry management A24, life cycle management A21, and vehicle management A26.

Range A11 where the unit price is ten to five hundred yen and the communication distance is within 50 cm is an application range of a radio IC tag that uses magnetic type (13 MHz band). Applications of this range include OA equipment consumable item management A31, immobilizer A30, telephone card A32, and commuter ticket A29.

In range A27 where the unit price is within ten yen and the communication distance is several tens centimeters, a resonance tag is known for use as an anti-shoplifting tag.

1.10. Other Modifications

Although the present invention has been described based on the above embodiment, the invention should not be limited to such. For instance, the following modifications are possible.

Figure 27:
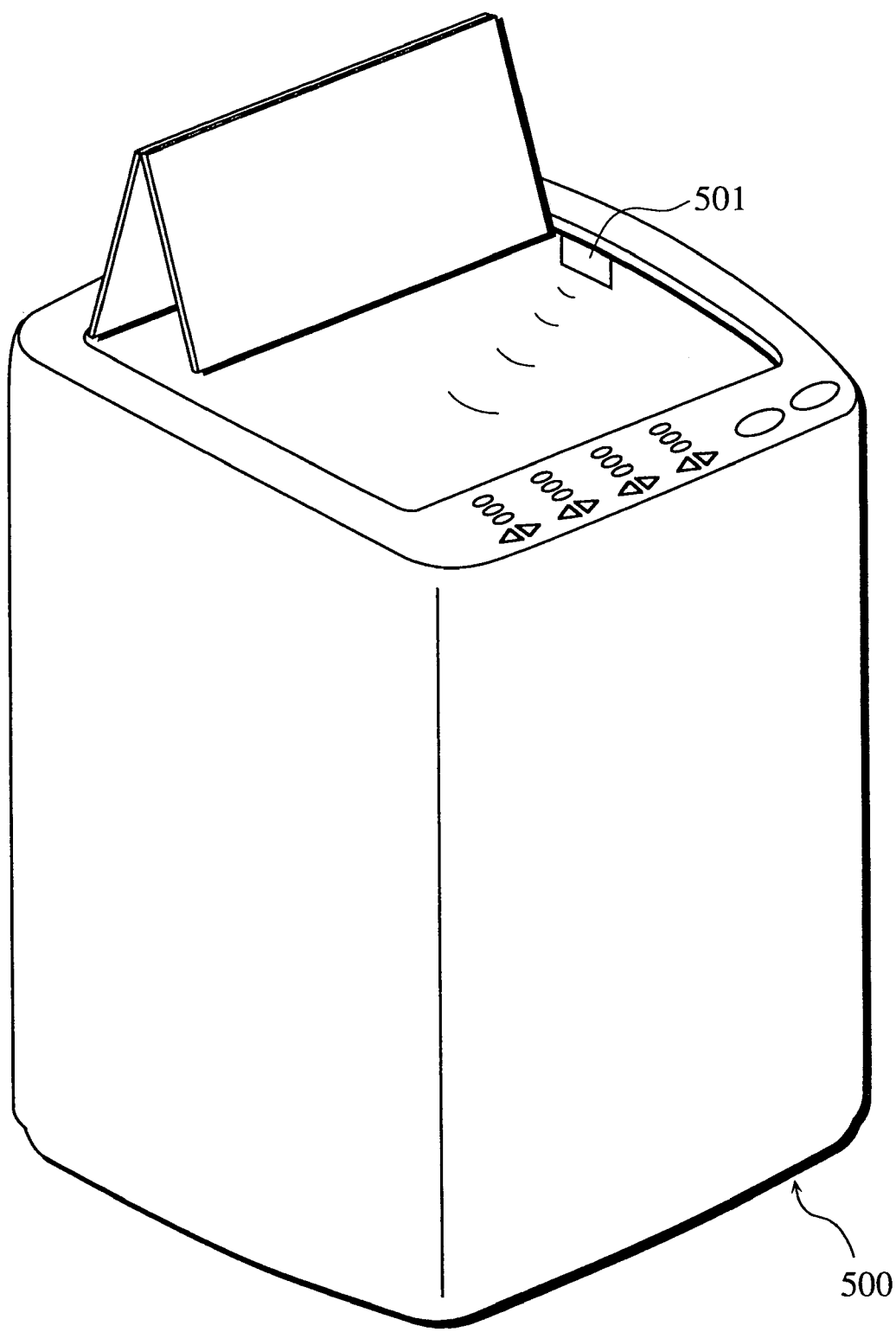
FIG. 27 shows the outward appearance of a home washing machine equipped with a reader/writer similar to the reader/writer 30.

(1) In the radio IC tag 80b attached to the cloths 90 in FIG. 3, "washing method" is stored in the service stage area of the unprotected unit 301 as shown in FIG. 18. In FIG. 27, a home electrical washing machine 500 is equipped with a reader/writer similar to the reader/writer 30 at the top of the washing tub 501, and stores washing courses corresponding to various washing methods. When the cloths 90 is put in the washing tub, the reader/writer in the home electrical washing machine 500 reads "washing method" stored in the service stage area of the unprotected unit 301 in the radio IC tag 80b. The home electrical washing machine 500 reads a washing course corresponding to the read washing method, and starts washing in accordance with the read washing course.

Also, a radio IC tag is attached to a foodstuff. This radio IC tag stores a recipe in the service stage area of the unprotected unit 301. A kitchen machine such as a microwave oven is equipped with a reader/writer similar to the reader/writer 30, and stores cooking courses corresponding to various recipes. When the foodstuff with the attached radio IC tag is put in the kitchen machine, the reader/writer in the kitchen machine reads "recipe" stored in the service stage area of the unprotected unit 301 in the radio IC tag. The kitchen machine reads a cooking course corresponding to the read recipe, and cooks the foodstuff in accordance with the cooking course.

(2) The above embodiment describes the case where the memory unit 216 has five stage areas, but the number of stage areas is not limited to such. The memory unit 216 may have more stage areas, or fewer stage areas.

Also, the rewritable unit in the memory unit 216 may be used in such a way as to write data over existing data from the top once the rewritable unit has become full.

Figure 28:
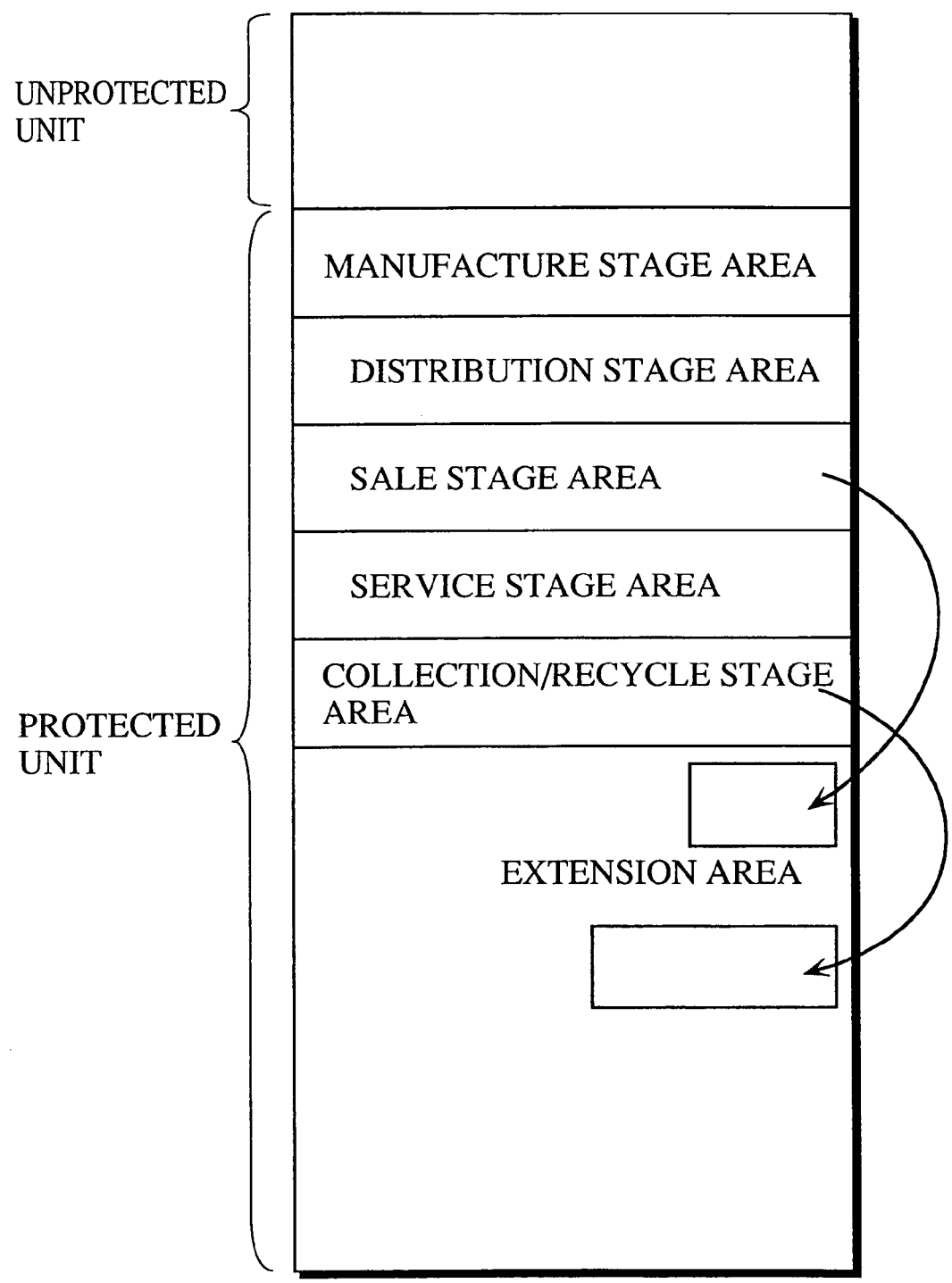
FIG. 28 is an example memory map of a memory unit that includes an extension area.

Also, the structure of the memory unit 216 may be modified as shown in FIG. 28. In the drawing, the memory unit 216 is made up of an unprotected unit and a protected unit, with the protected unit including a manufacture stage area, a distribution stage area, a sale stage area, a service stage area, a collection/recycle stage area, and an extension area. The extension area is used to write information when each stage area is full.

Figure 25:
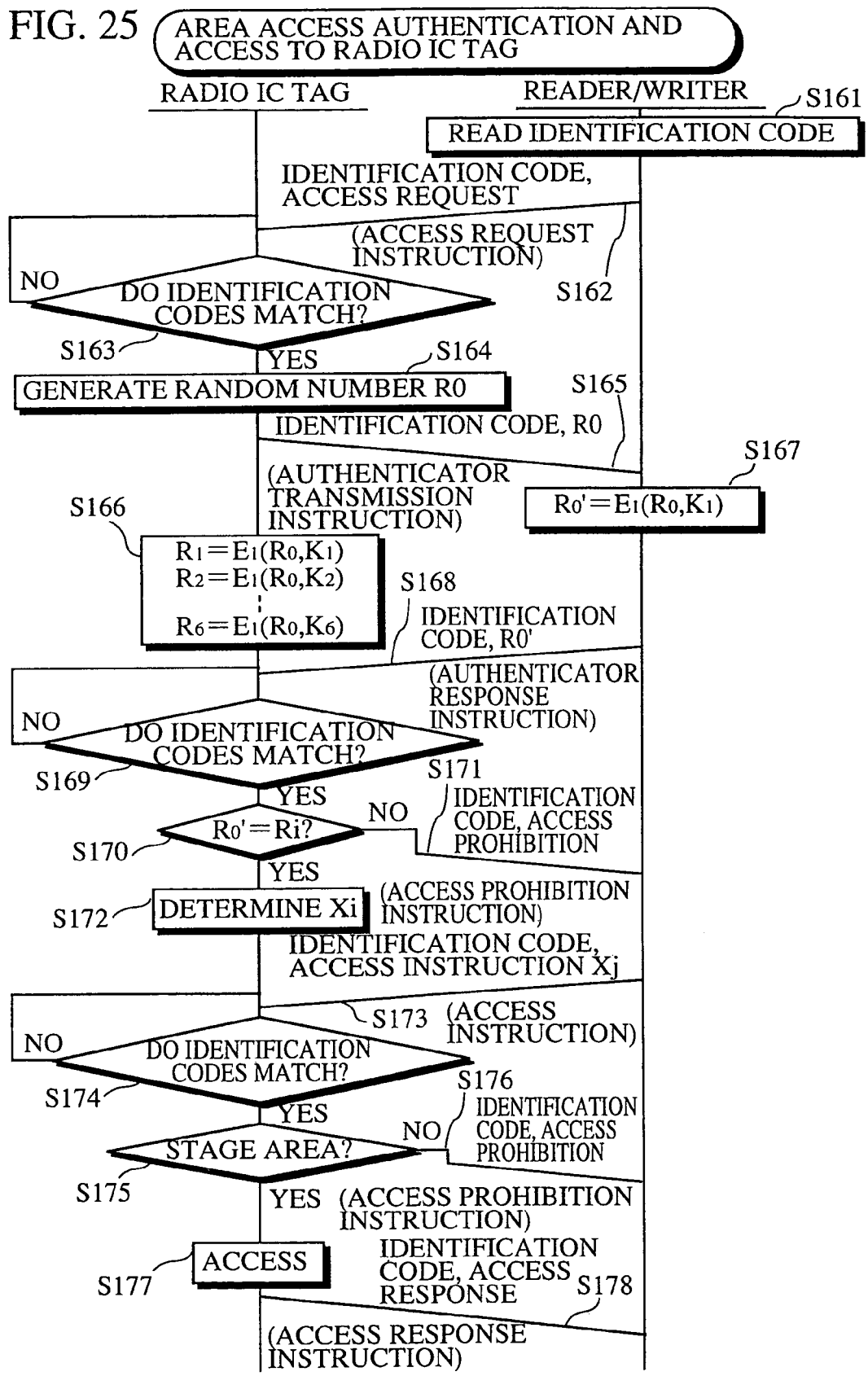
FIG. 25 is a diagram showing an area access authentication operation and area access operation of the reader/writer 30 and radio IC tag 80.
Figure 29:
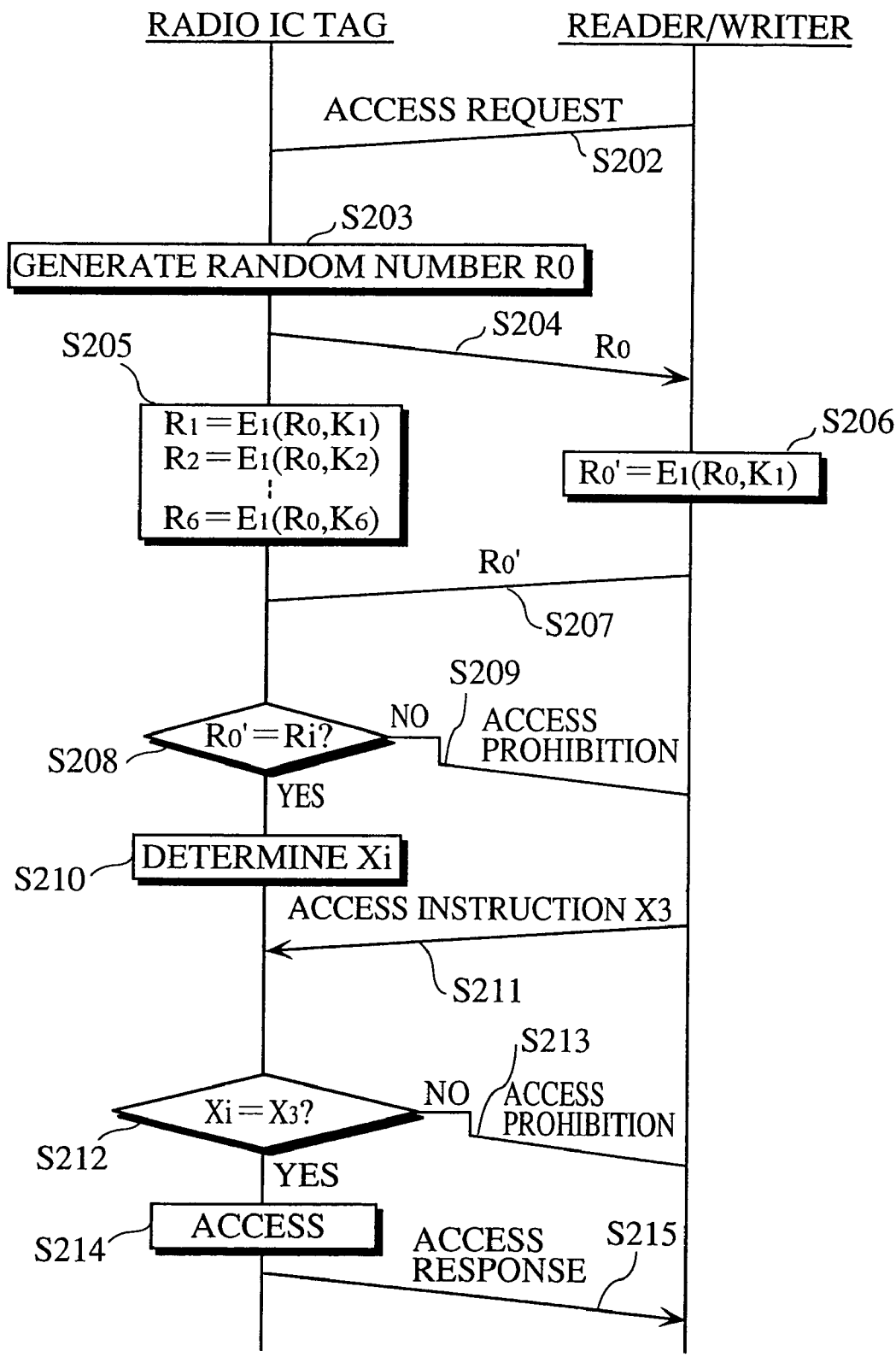
FIG. 29 is a diagram showing an area access authentication operation and an area access operation, when the reader/writer 30 performs reading/writing for only one radio IC tag.

(3) When the reader/writer 30 performs reading/writing for no more than one radio IC tag 80 at the same time, area access authentication and area access may be performed as shown in FIG. 29, instead of FIG. 25.

The reader/writer 30 sends an access request instruction to the radio IC tag 80 (S202). The radio IC tag 80 generates random number R0 (S203), and outputs random number R0 to the reader/writer 30 (S204). The reader/writer 30 generates encrypted random number R0'=E1 (R0,K1) (S206), and outputs encrypted random number R0' to the radio IC tag 80 (S207). The radio IC tag 80 generates encrypted random numbers R1=E1(R0,K1), R2=E1(R0,K2), . . . , and R6=E1 (R0,K6) (S205), and judges whether encrypted random number R0' matches any of R1–R6 (S208). If there is no match, the radio IC tag 80 sends an access prohibition instruction to the reader/writer 30 (S209). If there is a match, the radio IC tag 80 determines number Xi that identifies a stage area (S210). The reader/writer 30 sends an access instruction to access area X3 to the radio IC tag 80 (S211). The radio IC tag 80 judges whether Xi matches X3 (S212). If they do not match, the radio IC tag 80 sends an access prohibition instruction to the reader/writer 30 (S213). If they match, the radio IC tag 80 accesses its memory based on the access instruction (S214), and sends the access result to the reader/writer 30 as an access response (S215).

(4) The above embodiment describes the case where the radio IC tag 80 uses a semi-microwave band of 2.4–2.5 GHz as a carrier frequency and performs communication according to radio type. However, both a semi-microwave band of 2.4–2.5 GHz and an UHF band of 860–915 MHz may be used as carrier frequencies, with communication being performed by radio type.

Also, the reader/writer 30 may select the UHF band or the semi-microwave band as a carrier frequency, depending on which stage the radio IC tag 80 is used for. For example, in the manufacturing factory where the reader/writer 30 and the radio IC tag 80 keep a close distance with each other, the semi-microwave band that has a short communication distance may be selected. Meanwhile, in the distribution stage where the distance between the reader/writer 30 and the radio IC tag 80 is likely to vary, the UHF band that has a long communication distance may be selected.

(5) The above embodiment describes the case where, for conducting multiread in which access is performed to a plurality of radio IC tags at the same time, the reader/writer 30 collects an identification code of each radio IC tag by timesharing in the identification code acquisition period, while accessing each radio IC tag one by one in the access period. However, the reader/writer 30 may access each radio IC tag by timesharing in the access period.

Also, the identification code acquisition period is described as being made up of the first and second acquisition periods in each of which identification codes are collected. Instead, the identification code acquisition period may be made up of three or more acquisition periods in each of which identification codes are collected.

Also, a semi-microwave band of 2.4–2.5 GHz as a carrier frequency may be divided and the divided frequencies may be assigned to the plurality of radio IC tags, so that the reader/writer 30 can access the plurality of radio IC tags using the divided frequencies.

Also, a CDMA (Code Division Multiple Access) method based on spread spectrum technology may be employed, whereby a different diffusion code is set for each radio IC tag and the plurality of radio IC tags share the same wide-band radio channel.

Further, the reader/writer 30 may access the radio IC tag using packet data. The packet data is generated by dividing information communicated between the reader/writer 30 and each radio IC tag, with an identification code identifying the radio IC tag being attached to the top of the packet data.

(6) Each identification code is 32 bits long, and is made up of a manufacturer identification code (10 bits), a type code (10 bits), and a production number (12 bits). Accordingly, $2^{32}$ identification codes can be used.

If more identification codes are necessary, the bit length of the identification code may be increased.

To provide more identification codes without changing the bit length of the identification code at 32 bits, a 32-bit random number may be generated and added to the 32-bit identification code to obtain the 32-bit addition result, which is set as the identification code for use in communication between the radio IC tag 80 and the reader/writer 30. This is possible because the reader/writer 30 only needs to identify up to fifty radio IC tags when accessing the radio IC tag 80. Here, operations other than the addition are applicable, too.

(7) The radio IC tag 80 and the reader/writer 30 may adopt a tampering method to protect stored area keys from leakage. According to this method, if an unauthorized party disassembles the radio IC tag 80 or the reader/writer 30 to read an area key, the memory that stores the area key is destroyed.

(8) An area key distribution device may be provided that is connected to the radio IC tag 80 and writes the six area keys (K1–K6) into the radio IC tag 80. Also, the area key distribution device may be connected to the reader/writer 30 and write the two area keys (K1 and K6, K2 and K6, K3 and K6, K4 and K6, or K5 and K6) into the reader/writer 30.

This area key distribution device may be possessed by a third party other than the manufacturers of the reader/writer 30 and radio IC tag 80, with such a third party writing the area keys to the reader/writer 30 and the radio IC tag 80 using the area key distribution device. In this way, the leakage of the area keys which are being written to the reader/writer 30 and the radio IC tag 80 can be prevented.

(9) Master key K7 may be provided that permits access to all areas. Such master key K7 is held in an area in the reader/writer 30 which can be used only by a specially authorized user, enabling such a user to access all areas of the radio IC tag 80 using master key K7. Here, the authorized user may be a third party.

(10) The above embodiment describes the case where the radio IC tag 80 authenticates the reader/writer 30, but the operation of the reader/writer 30 and the operation of the radio IC tag 80 in steps S161–S170 in FIG. 25 may be interchanged so that the reader/writer 30 authenticates the radio IC tag 80. As a result, the reader/writer 30 can reject unauthorizedly-manufactured radio IC tags.

Also, the radio IC tag 80 and the reader/writer 30 may perform mutual authentication.

(11) WPC codes (JAN, EAN, UPC codes) may be stored in the sale stage area. Here, EAN (European Article Numbering System) is an international standard coding scheme for packaging of retail food products used in Europe. UPC (Universal Product Code) is a standard barcode symbol for packaging of retail food products in the United States. JAN (Japanese Article Number) is a common commodity product coding scheme which was introduced to JIS in 1978 and has since been used in Japan.

(12) The reader/writer 30 may be constructed to further read barcodes.

Also, a barcode may be printed on a resin surface of the radio IC tag 80, and the radio IC tag 80 together with the printed barcode may be attached to the product. In this case, the reader/writer 30 reads the barcode from the radio IC tag 80, or accesses the radio IC tag 80.

(13) The position at which the radio IC tag 80 is attached is not limited to the reverse side of the logotype. For instance, the radio IC tag 80 may be attached on top of a wiring board equipped inside a TV set. Thus, the radio IC tag 80 can be attached inside a product, so long as a radio wave emitted from the reader/writer 30 can reach the radio IC tag 80.

(14) The radio IC tag 80 may be attached to a product displayed at a store. For example, a first reader/writer having the same construction as the reader/writer 30 is installed at a cash register in the store. If the right price is paid for the product, the first reader/writer writes information showing the proper payment to the radio IC tag 80 attached to the product. Also, a second reader/writer having the same construction as the reader/writer 30 is installed at the door of the store. The second reader/writer monitors whether the proper payment information is stored in the radio IC tag 80. In this way, shoplifting can be prevented.

(15) An apparel manufacturer may attach a radio IC tag storing the name of the manufacturer to cloths. A supplier reads the manufacturer name from the radio IC tag using the reader/writer 30, to check the manufacturer. In this way, the supplier will be kept from buying copycat products by mistake.

Also, by attaching radio IC tags to luxury brand-name products such as expensive clothing items or ornamental articles, not only can the distribution of fake brand-name products be prevented, but also the quality of brand-name products be ensured. Also, by writing route information to radio IC tags, management and search of distribution routes are possible.

(16) In a manufacturing factory, each factory worker may wear a name plate on the reverse side of which a radio IC tag storing the name of the worker is attached. This being so, reader/writers having the same construction as the reader/writer 30 are installed in various sites of the factory, which each read the name stored in the radio IC tag and record it together with the site name. By doing so, the movements of people in the factory can be managed. The same applies to a retail store or similar.

(17) In a hospital, there are multiple stages from when a patient is admitted to the hospital and receives medical treatment to when he or she is released from the hospital, just like a product's life cycle. Such stages include hospital admission, examination, surgery, treatment, post-operative care, medication, checkout, and discharge. For each of these stages, there is necessary information.

For instance, the patient wears a radio IC tag which has a stage area for each stage. The name of the patient and his or her condition are written in an admission stage area. An examination result is written in an examination stage area. Operation method and result are written in a surgery stage area. Treatment information such as treatment method and result is written in a treatment stage area. Condition information during the post-operative care is written in a post-operative care stage area. Drug information is written in a medication stage area. An insurance point and account information for the treatment and medication are written in a checkout stage area. Condition information at the time of discharge is written in a discharge stage area. Persons who have the rights to access each stage area are limited. Reader/writers that have the same construction as the reader/writer 30 are installed in various sites in the hospital such as a patient room, a treatment room, an operation room, and an accounting room. Each person who has the rights to operate a reader-writer of some stage, e.g. a patient, a doctor, a nurse, or an accountant, inputs a password which only he or she knows, into the reader/writer. Upon verifying the password, the reader/writer reads information from a corresponding stage area of the radio IC tag, or writes information to the radio IC tag.

In this way, the patient can obtain proper information about his or her condition and treatment, and the doctor and the nurse can be kept from confusing the patient with another or committing malpractice. Also, the accountant can calculate medical expenses accurately.

(18) In the distribution stage, the reader/writer 30*d* and mobile-phone-equipped management device 40*d* in the third group which belongs to the distribution management subsystem 20*b* are mounted on the cargo truck with the reader-writer 30*d* having the antenna unit being placed inside the truck at the top of the carry-in entrance, as shown in FIG. 7. This makes it possible to know the contents of the cargo accompanied by a radio IC tag near the carry-in entrance, by reading information recorded on the radio IC tag. Such obtained information about the contents of cargo and information about the current location of the cargo truck are then written to the database 61 of the host computer 60 via the base station 50, the public network, the receiver 51, the connector 53, and the LAN device 70.

By such recording the contents and location of incoming or outgoing cargo time after time, it is possible to know the distribution route of the cargo with reliability.

(19) Even if radio IC tags are attached to books, CDs, cloths or the like which are stored one on top of another, the reader/writer 30 can access these radio IC tags, with it being possible to exercise inventory control for the books, CDs, cloths or the like.

(20) A radio IC tag which stores information showing devices connected by a wire may be attached to each wire which connects computers and printers installed in an office and is embedded under floor.

This being so, the position of the wire that connects the devices can be obtained by operating the reader/writer 30 above floor to read the information stored in the radio IC tag attached to the wire.

(21) The radio IC tag 80 may be attached to the body of a vehicle, to regularly record the drive conditions of the vehicle, such as the number of miles driven or the amount of fueling, in the service stage area together with date information. The repair history of the vehicle may be recorded, too. When the vehicle is junked, such information can be used to judge whether to reuse the parts and module of the vehicle.

Thus, judgements on whether to reuse disposed items can be made easily. This improves the collection ratio of disposed items, and the recycle ratio of disposed items.

(22) Sensors such as a temperature sensor and a pressure sensor may be added to the radio IC tag 80, to regularly detect the temperature and pressure around the radio IC tag 80. Such detected temperature and pressure are then recorded on the radio IC tag 80. Here, the radio IC tag 80 may be equipped with a battery for driving these sensors.

(23) Family asset management is possible by attaching the radio IC tag 80 to each electrical product and cloths used in the home and reading information recorded on the radio IC tag 80 through the use of the reader/writer 30.

(24) Secret-key encryption is described as being used in the above embodiment, but public-key encryption may instead be employed. For example, a cryptographic communication technique that uses a discrete logarithm problem on an elliptic curve as a basis for security is applicable.

2. Second Embodiment

Figure 30:
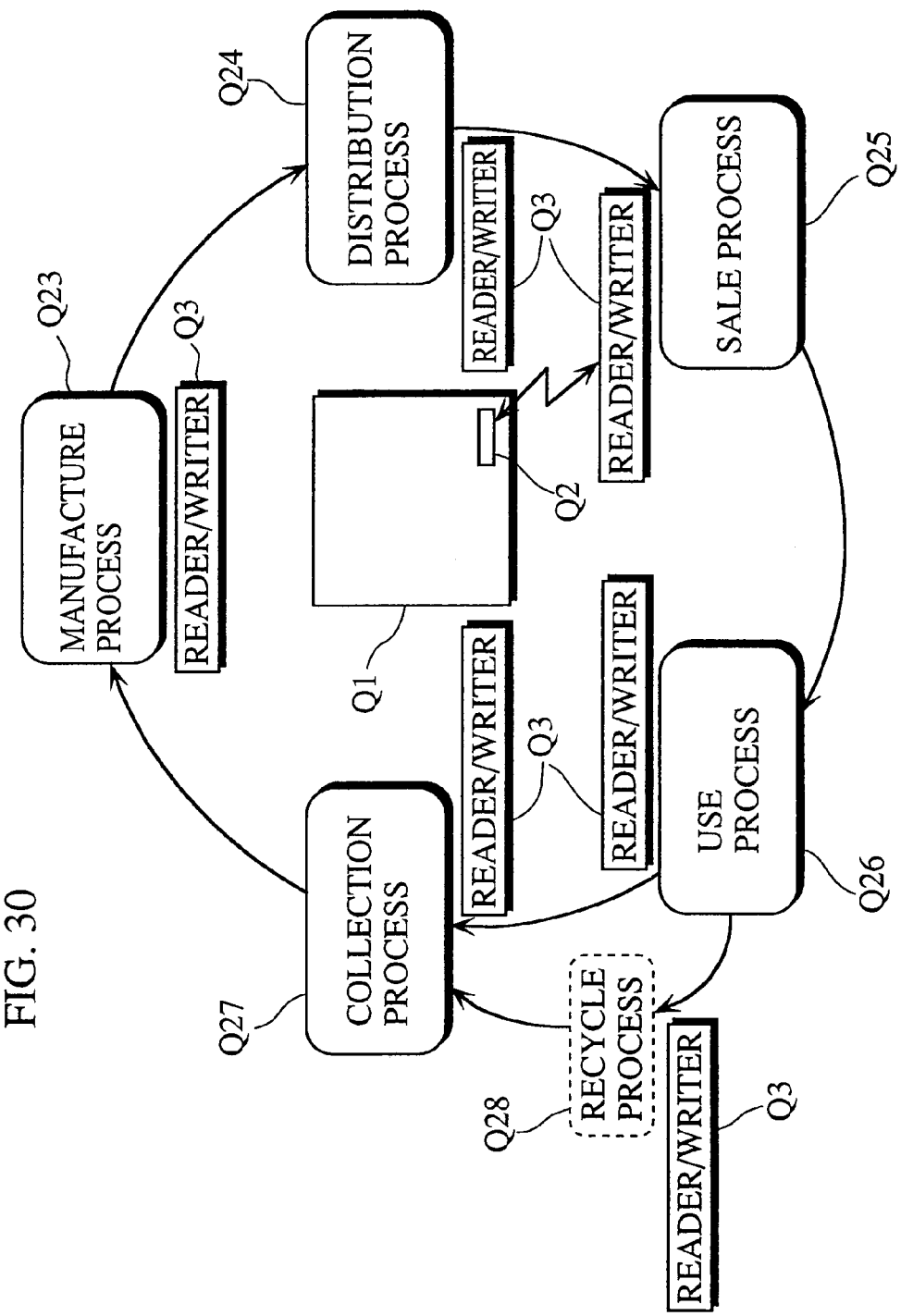
FIG. 30 shows a life cycle procedure of a life cycle management system according to the invention.

FIG. 30 shows a life cycle procedure of a life cycle management system according to the second embodiment of the invention. In the following explanation, the life cycle procedure is divided into five processes of a manufacture process Q23, a distribution process Q24, a sale process Q25, a use process Q26, and a collection process Q27 as shown in the drawing, though the life cycle procedure is not limited to such. For instance, a recycle process Q28 may be provided between the use process Q26 and the collection process Q27.

In each process or between processes of the illustrated management system for a product Q1, product information relating to the product Q1 is written to or read from a memory in an IC tag Q2 which is attached to the product Q1 and performs contactless communication, through the use of a reader/writer Q3 which is provided for each process and performs radio communication.

Here, the product Q1 is a product from a variety of industries. Examples of the product Q1 include a home electrical product, electronic equipment such as a computer, an electronic component, or industrial equipment in the electrical industry, a car, a motorcycle, or its component in the vehicle industry, a packed foodstuff in the food industry, a home-building material or an article of furniture in the housing industry, cloths in the apparel industry, or a bag, a pair of shoes, a tableware, or miscellaneous goods in other industries.

In this embodiment, an IC tag is used as an example information recording medium.

The IC tag Q2 is attached to the product Q1 or each component of the product Q1. Especially, by attaching the IC tag Q2 between the product Q1 and a logotype of a company emblem, trade name, or mark appended to the product Q1, or near the logotype, the IC tag Q2 becomes not so noticeable from the outside. This prevents the appearance of the product Q1 from being ruined. Also, since the position of the IC tag Q2 is fixed, the IC tag Q2 can easily be found in each process.

Figure 31:
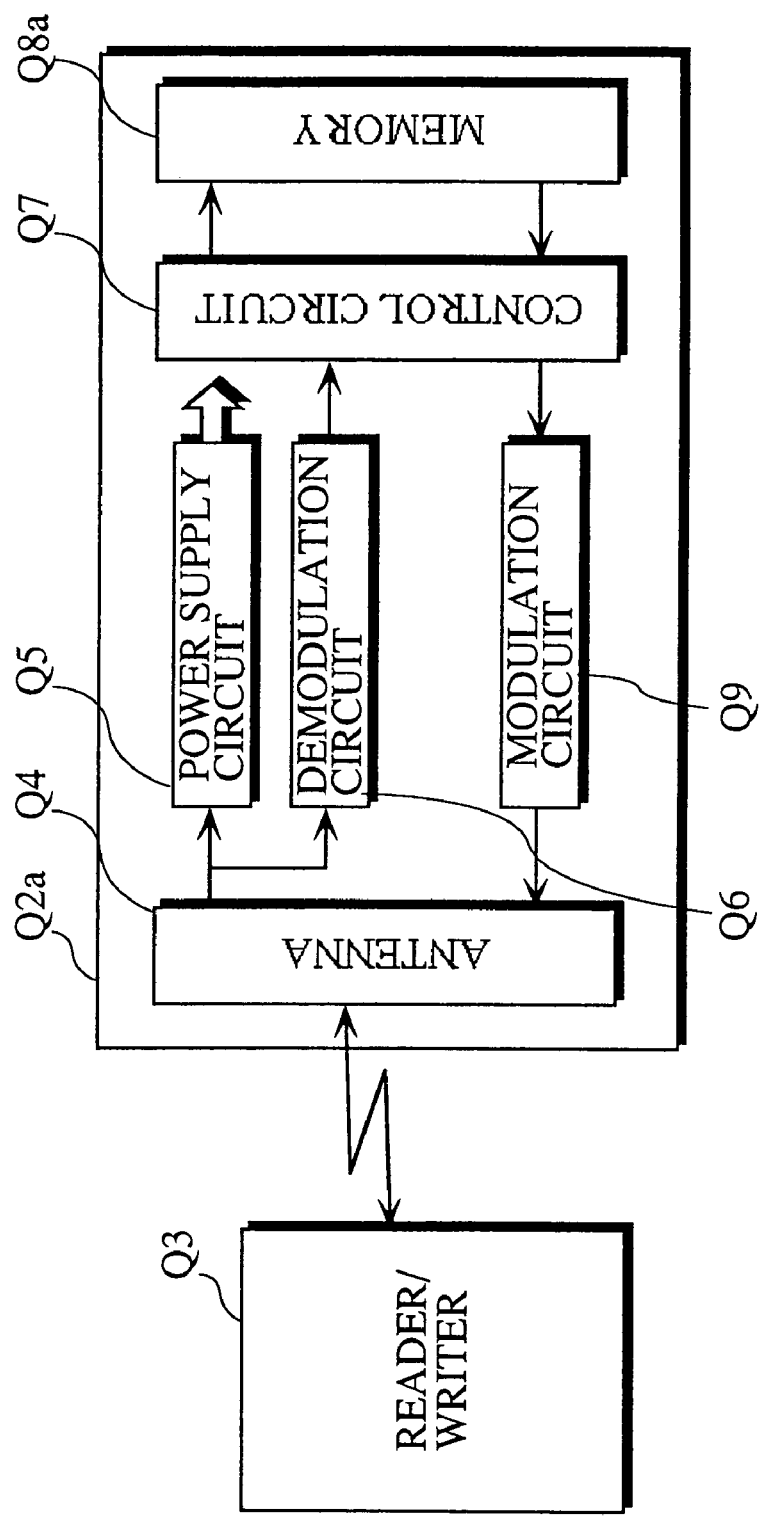
FIG. 31 is a block diagram showing a construction of a contactless IC tag and a reader/writer according to the second embodiment of the invention.

The following explains a communication system of the life cycle management system in the second embodiment, by referring to FIG. 31.

FIG. 31 is a block diagram showing the reader/writer Q3 and a construction of a contactless IC tag Q2a to which the second embodiment relates.

The contactless IC tag Q2a performs communication by radio with the reader/writer Q3 that writes/reads product information to/from the IC tag Q2a.

As shown in FIG. 31, the IC tag Q2a includes an antenna Q4, a power supply circuit Q5, a demodulation circuit Q6, a control circuit Q7, a memory Q8a, and a modulation circuit Q9.

To write product information to the IC tag Q2a, a signal of the encrypted product information is sent from the reader/writer Q3 and received at the antenna Q4 of the IC tag Q2a. The received signal is converted to power by the power supply circuit Q5 to supply power to all construction elements of the IC tag Q2a, and at the same time demodulated by the demodulation circuit Q6. The demodulated signal is written in the memory Q8a by the control circuit Q7, in accordance with the contents of the signal.

To read product information from the IC tag Q2a, a reading signal is sent from the reader/writer Q3 and received at the antenna Q4 of the IC tag Q2a. The received reading signal is converted to power by the power supply circuit Q5, and also demodulated by the demodulation circuit Q6. The necessary product information is read from the memory Q8a by the control circuit Q7 in accordance with the demodulated signal, and the read information is modulated by the modulation circuit Q9 and outputted by the antenna Q4 as a radio signal. Thus, the reader/writer Q3 reads the product information and makes judgements based on the read product information.

Note here that product information written in the memory Q8a of the IC tag Q2a in each process shown in FIG. 30 is historical information of the product Q1 such as follows, though the product information is not limited to such.

Examples of product information written in the IC tag Q2a in the manufacture process Q23 as the first process include a manufacturer name, a product name, a product number, a production number, a date or time of manufacture, a factory name, materials used for the product Q1, a manufacturing method, manufacturing conditions, and a guarantee period of each component of the product Q1.

Examples of product information written in the IC tag Q2a in the distribution process Q24 as the second process include a storage/retrieval date, a global location number, and a transportation company name.

Examples of product information written in the IC tag Q2a in the sale process Q25 as the third process include information about the product guarantee at the time of sale (i.e. guarantee start date, seller guarantee, etc.), a guarantee card number, a wholesaler name and a wholesale date, and a retail store name and a selling date.

Examples of product information written in the IC tag Q2a in the use process Q26 as the fourth process include a repair record such as a fault location, the details of the fault, the number of repairs, repair dates, repaired components, the details of the repairs in the event of failure of the product Q1, as well as a repair company name and a repairperson name.

Examples of product information written in the IC tag Q2a in the collection process Q27 as the fifth process include a collection date, a reuse record such as component names, a recycle method and date, a recycle company, and a recycle person, as well as a name of a collector that collects the product Q1 or disposer that disposes the product Q1.

Also, information about the date and time of writing may be added to product information which is written in the memory Q8a in each life cycle process. In doing so, when the reader/writer Q3 cannot write new product information to the memory Q8a due to insufficient memory, the oldest product information can be automatically deleted so as to write the new product information to the memory Q8a.

In this case, a list of product information stored in the memory Q8a may be sent to the reader/writer Q3, so that the user of the reader/writer Q3 can select the most unnecessary product information as the product information to be deleted.

3. Third Embodiment

Figure 32:
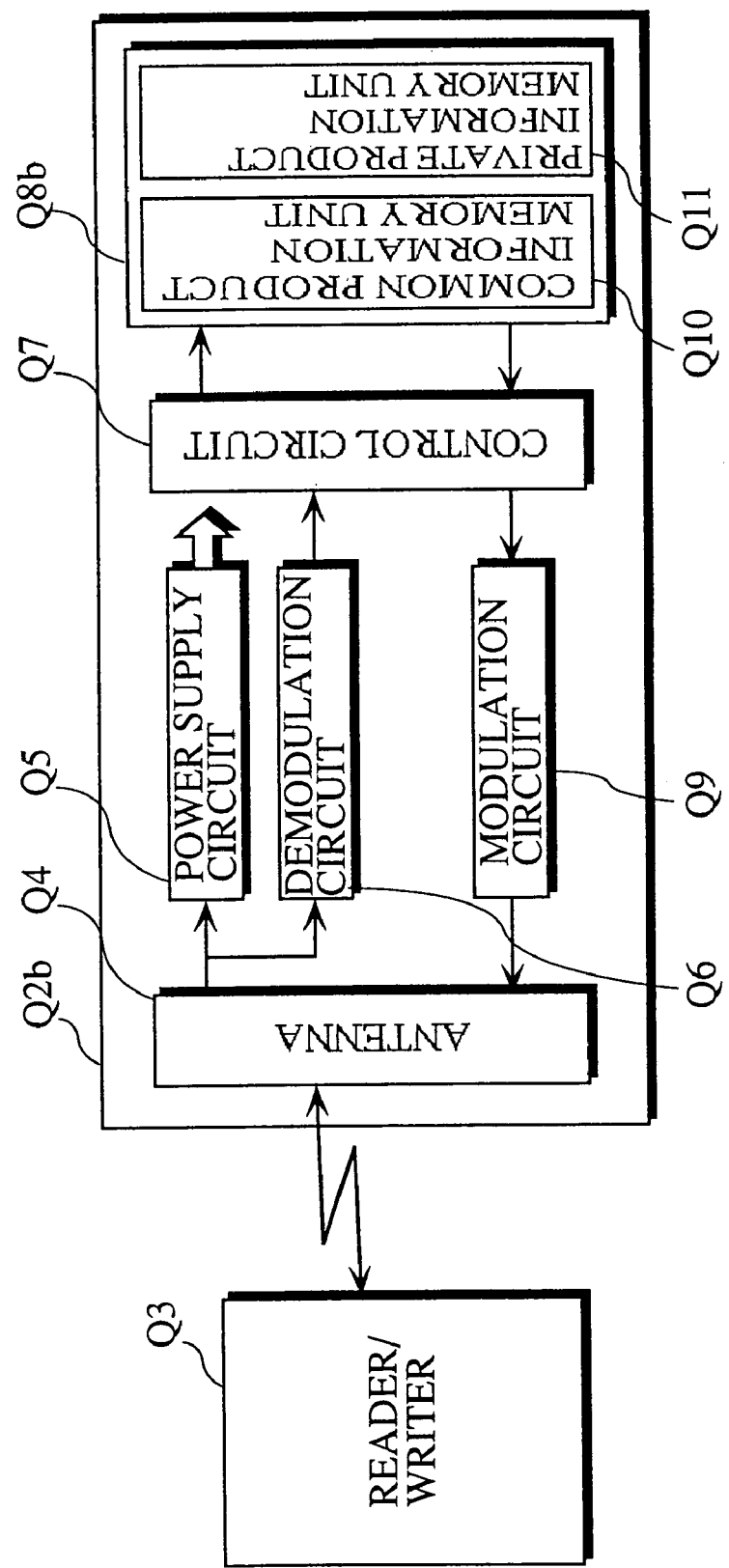
FIG. 32 is a block diagram showing a construction of a contactless IC tag and a reader/writer according to the third embodiment of the invention.

The following explains a life cycle management system according to the third embodiment of the invention. A life cycle procedure of the third embodiment is the same as that of the second embodiment shown in FIG. 30. A construction of an IC tag in the third embodiment is shown in FIG. 32, where the same construction elements are given the same reference numerals as FIG. 31 and their explanation is omitted.

In this embodiment, product information in each of the five processes shown in FIG. 30 is classified into common product information which is common to the five processes and private product information which is exclusive to each individual process. In this way, the security of the product information between the processes is ensured, as the private product information is available only to specific persons.

An example classification of common and private product information in each process is given below.

In the manufacture process Q23 as the first process, examples of common product information written to an IC tag Q2b include a manufacturer name, a product name, a product number, a production number, a manufacture date and time, and a guarantee period of the product Q1 and its components. Examples of private product information include a factory name, materials used for the product Q1, a manufacturing method, and manufacturing conditions.

In the distribution process Q24 as the second process, examples of common product information written to the IC tag Q2b include a storage/retrieval date and a global location number. Examples of private product information include a transportation company name.

In the sale process Q25 as the third process, examples of common product information written to the IC tag Q2b include information relating to the product guarantee at the time of sale (i.e. guarantee start date and seller guarantee) and a guarantee card number. Examples of private product information include a wholesaler name and a wholesale date, and a retail store name and a selling date.

In the use process Q26 as the fourth process, examples of common product information written to the IC tag Q2b include a repair record such as a fault location, the details of the fault, the number of repairs, repair dates, repaired components, and the details of the repairs at the event of failure of the product Q1. Examples of private product information include a repair company name and a repairperson name.

In the collection process Q27 as the fifth process, examples of common product information written to the IC tag Q2b include a collection date and a reuse record such as component names, a recycle method, and a recycle date. Examples of private product information include a collector name, a disposer name, a recycle factory name, and a recycler name.

Here, it should be noted that common and private product information is not limited to such. They may be determined in accordance with the type of the product and the management pattern of the life cycle management system. For instance, the above common product information may be treated as private product information, and vice versa.

A communication system of the IC tag Q2b and the reader/writer Q3 in the third embodiment where product information is sorted into common and private product information in each process for the purpose of security is explained next.

The difference with the second embodiment lies in that a memory Q8b in the IC tag Q2b is divided into a common product information memory unit Q10 for storing common product information and a private product information memory unit Q11 for storing private product information, as shown in FIG. 32.

To write product information to the IC tag Q2b, the user of the reader/writer Q3 determines whether the product information should be treated as common product information or private product information, and sends a signal of the encrypted product information and a signal of memory indication information indicating whether to write to the common product information memory unit Q10 or the private product information memory unit Q11, to the IC tag Q2b.

The signal of the encrypted product information is received by the antenna Q4, and converted to power by the power supply circuit Q5 to supply power to each construction element of the IC tag Q2b. The signal is also demodulated by the demodulation circuit Q6.

The demodulated signal includes the memory indication information indicating whether to write to the common product information memory unit Q10 or the private product information memory unit Q11, so that the control circuit Q7 writes the contents of the received signal to the common product information memory unit Q10 or the private product information memory unit Q11, in accordance with the memory indication information.

To read common product information from the IC tag Q2b, the user of the reader/writer Q3 can communicate with the IC tag Q2b unconditionally, so that the reader/writer Q3 sends a signal including a signal for reading the common product information, to the IC tag Q2b.

The reading signal is received by the antenna Q4, converted to power by the power supply circuit Q5, and also demodulated by the demodulation circuit Q6. The necessary common product information is then read from the common product information memory unit Q10 of the memory Q8b by the control circuit Q7, and sent from the antenna Q4 to the reader/writer Q3 via the modulation circuit Q9 as a radio signal.

To read private product information from the IC tag Q2b, the user of the reader/writer Q3 sends a signal that indicates the private product information memory unit Q11, namely, an encryption key, to the IC tag Q2b, so as to gain access to the private product information memory unit Q11.

Once the reader/writer Q3 obtains a permission to read the private product information using the encryption key, the reader/writer Q3 sends a signal for reading the private product information to the IC tag Q2b.

The reading signal is received by the antenna Q4, converted to power by the power supply circuit Q5, and also demodulated by the demodulation circuit Q6. The necessary private product information is then read from the private product information memory unit Q11 of the memory Q8b by the control circuit Q7.

A signal of the read private product information is sent from the antenna Q4 to the reader/writer Q3 via the modulation circuit Q9, as a radio signal.

Thus, at least when reading private product information written in the private product information memory unit Q11, the signal which indicates the private product information memory unit Q11, i.e. the encryption key, should be included in the reading signal to be sent from the reader/write Q3 to the IC tag Q2b. If the control circuit Q7 judges that the reading signal does not include the encryption key, the private product information memory unit Q11 cannot be accessed.

The reader/writer Q3 in each process has a different encryption key, with it being possible to establish a system where only specific users can obtain private product information.

Here, the encryption key is the means for accessing the private product information memory unit Q11, and is a signal such as an encryption code signal or a password. The encryption key may also be a block signal or stream signal that uses the chaos theory. The same applies to the following embodiments.

According to this embodiment, the reader/write Q3 can access private product information stored in the memory Q8b only when the encryption key exists, which ensures the security of the product information.

In the case where the encryption key is a password and the user of the reader/writer Q3 inputs the password in the reader/writer Q3, a reader/writer of the same function can be used for each process shown in FIG. 30, to ensure security.

In the case where the encryption key is set in the reader/writer Q3 in advance and the reader/writer 30 can access the private product information memory unit Q11 without the user knowing the existence of the encryption key, the security between processes is maintained if a different reader/writer is used for each process.

An encryption key common to each process may also be set for reading common product information, while setting an encryption key different with the common encryption key separately for each process (e.g. first and fifth encryption keys in the processes shown in FIG. 30) for reading private product information. As a result, the security can be attained between processes or within each process, in an industry where specific products are distributed.

Also, information on the date and time of writing may be added to product information written in the common product information memory unit Q10 or the private product information memory unit Q11 in each life cycle process. In this way, when new product information cannot be written to the common product information memory unit Q10 or the private product information memory unit Q11 due to insufficient memory, the oldest product information can be automatically deleted from that memory unit, so as to write the new product information.

Here, a list of product information stored in the common product information memory unit Q10 or the private product information memory unit Q11 may be sent to the reader/writer Q3, so that the user of the reader/writer Q3 can select the most unnecessary product information as the product information to be deleted.

Also, if the common product information memory unit Q10 does not have enough free space to write new product information, the new product information may instead be written automatically to the private product information memory unit Q11 that has enough free space.

In such a case, the new product information is written as private product information despite the user's intention to write it as common product information. This being so, the user may be inquired as to whether the product information can be written as private product information.

4. Fourth Embodiment

Figure 33:
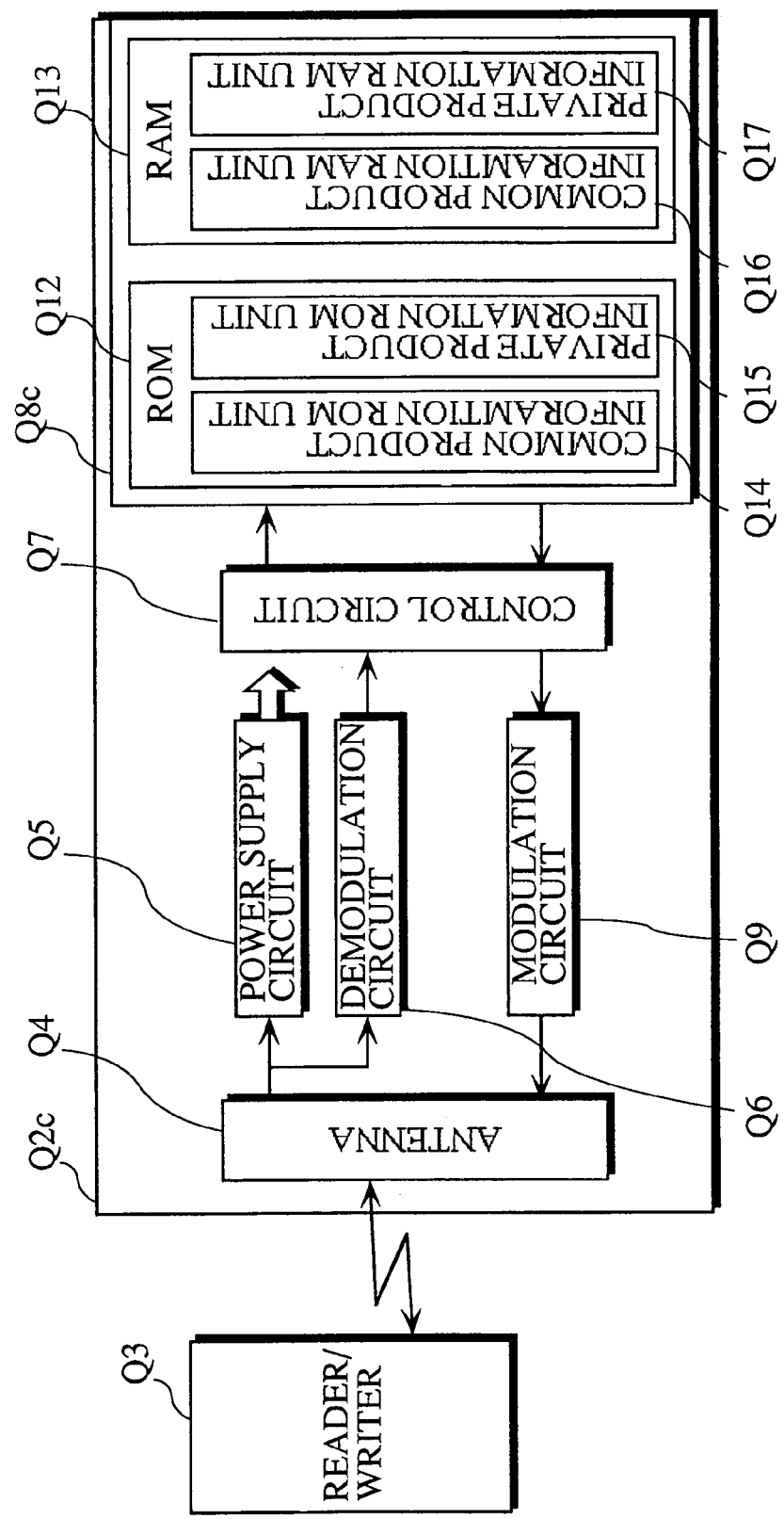
FIG. 33 is a block diagram showing a construction of a contactless IC tag and a reader/writer according to the fourth embodiment of the invention.

A life cycle management system according to the fourth embodiment of the invention is described below. A life cycle procedure of the fourth embodiment is the same as that of the second embodiment shown in FIG. 30. A construction of an IC tag in the fourth embodiment is shown in FIG. 33, where the same construction elements are given the same reference numerals and their explanation is omitted.

In this embodiment, product information in each process shown in FIG. 30 is the same as that in the second embodiment. Also, to establish security between the processes, product information is classified into common product information which is common to the processes and private product information which is exclusive to each process, as in the third embodiment.

The difference with the second and third embodiments lies in that a memory Q8c in an IC tag Q2c is made up of a ROM Q12 that is a write-once, read-only memory and a RAM Q13 that is a readable and rewritable memory.

For the purpose of security, the ROM Q12 is divided into a common product information ROM unit Q14 for storing common product information and a private product information ROM unit Q15 for storing private product information. Likewise, the RAM Q13 is divided into a common product information RAM unit Q16 for storing common product information and a private product information RAM unit Q17 for storing private product information. Note here that product information stored in the ROM Q12 is mainly ID information of the product Q1 in the manufacture process Q23, which is common to each process.

Security can also be obtained if either the ROM Q12 or the RAM Q13 has a common product information memory unit and a private product information memory unit.

A communication system of the IC tag Q2c and the reader/writer Q3 in the fourth embodiment is explained below, with reference to FIG. 33. Here, it is assumed that each of the ROM Q12 and the RAM Q13 has a common product information memory unit and a private product information memory unit.

To write product information to the IC tag Q2c, the product information is written to the ROM Q12 if the user of the reader/writer Q3 wants the product information to be non-erasable, whereas the product information is written to the RAM 13 when the user wants the product information to be erasable.

As shown in FIG. 33, when writing product information to the IC tag Q2c, the user of the reader/writer Q3 decides whether the product information should be treated as common product information or private product information. The user also decides whether the product information can be deleted or not, and sends a signal of the encrypted product information to the IC tag Q2c.

The signal of the encrypted product information is received by the antenna Q4, and converted to power by the power supply circuit Q5 to supply power to each construction element of the IC tag Q2c. The signal is also demodulated by the demodulation circuit Q6.

The demodulated signal includes memory indication information showing whether to write to the common product information ROM unit Q14, the private product information ROM unit Q15, the common product information RAM unit Q16, or the private product information RAM unit Q17. According to this memory indication information, the control circuit Q7 writes the contents of the received signal to the indicated memory unit.

To read common product information from the IC tag Q2c, the user of the reader/writer Q3 sends a signal including a signal for reading the common product information, to the IC tag Q2c.

The reading signal is received by the antenna Q4, converted to power by the power supply circuit Q5, and also demodulated by the demodulation circuit Q6. The necessary common product information is then read from the common product information ROM unit Q14 or the common product information RAM unit Q16 of the memory Q8c by the control circuit Q7, and sent from the antenna Q4 to the reader/writer Q3 via the modulation circuit Q9 as a radio signal.

To read private product information from the IC tag Q2c, the user of the reader/writer Q3 sends a signal of memory indication information which indicates the private product information ROM unit Q15 or the private product informant RAM unit 17, i.e. an encryption key, to the IC tag Q2c, so as to gain access to the private product information ROM unit Q15 or the private product information RAM unit Q17.

Once the reader/writer Q3 has obtained a permission to read the private product information using the encryption key, the reader/writer Q3 sends a signal for reading the private product information to the IC tag Q2c.

The reading signal is received by the antenna Q4, converted to power by the power supply circuit Q5, and also demodulated by the demodulation circuit Q6. The necessary private product information is then read from the private product information ROM unit Q15 or the private product information RAM unit Q17 by the control circuit Q7.

A signal of the read private product information is sent from the antenna Q4 to the reader/writer Q3 via the modulation circuit Q9, as a radio signal.

Thus, as in the third embodiment, at least when reading private product information written in the private product information ROM unit Q15 or private product information RAM unit Q17, the signal that indicates the private product information memory unit, i.e. the encryption key, need be included in the reading signal to be sent to the IC tag Q2c.

If the control circuit Q7 judges that the encryption key is not included in the reading signal, the private product information memory unit cannot be accessed.

The reader/writer Q3 in each process has a different encryption key, with it being possible to establish a system where only specific users can obtain private product information.

Here, the encryption key is a signal for reading private product information from the private product information ROM unit Q15 or the private product information RAM unit Q17. In the case where the user of the reader/writer Q3 inputs a password as the encryption key, the security can be ensured by using a reader/writer of the same function for each process shown in FIG. 30.

In the case where the encryption key is set in the reader/writer Q3 in advance and the reader/writer Q3 can access the private product information ROM unit Q15 or the private product information RAM unit Q17 without the user knowing the existence of the encryption key, the security between the processes can be obtained by using a different reader/writer for each process.

Here, a first encryption key and a second encryption key that are common to each process may be set for the common product information ROM unit Q14 and the common product information RAM unit Q16 respectively, for reading common product information. Also, two encryption keys different for each process may be set for the private product information ROM unit Q15 and the private product information RAM unit Q17, for reading private product information. In this way, the security can be ensured in each individual process.

Also, information on the date and time of writing may be added to product information written to the common product information RAM unit Q16 or the private product information RAM unit Q17 in each life cycle process. In this way, when new product information cannot be written to the common product information RAM unit Q16 or the private product information RAM unit Q17 due to insufficient memory, the oldest product information can be automatically deleted from that RAM unit so as to write the new product information.

Here, a list of product information stored in the RAM unit may be sent to the reader/writer Q3, so that the user of the reader/writer Q3 can select the most unnecessary product information as the product information to be deleted.

Also, if the common product information RAM unit Q16 does not have enough free space to write new product information, the new product information may be automatically written to the private product information RAM unit Q17 that has enough free space.

In such a case, the product information is written to the private product information RAM unit Q17 as private product information despite the user's intention to write it as common product information. This being so, the user may be inquired as to whether the product information can be written as private product information. The same applies to the ROM units.

Also, if the ROM Q12 does not have enough free space to write new product information, the new product information may instead be written to the RAM Q13 with enough free space. In this case, it is preferable not to treat common product information as private product information and vice versa in the ROM Q12 and the RAM Q13, though this is not a limit for the invention.

5. Fifth Embodiment

Figure 34:
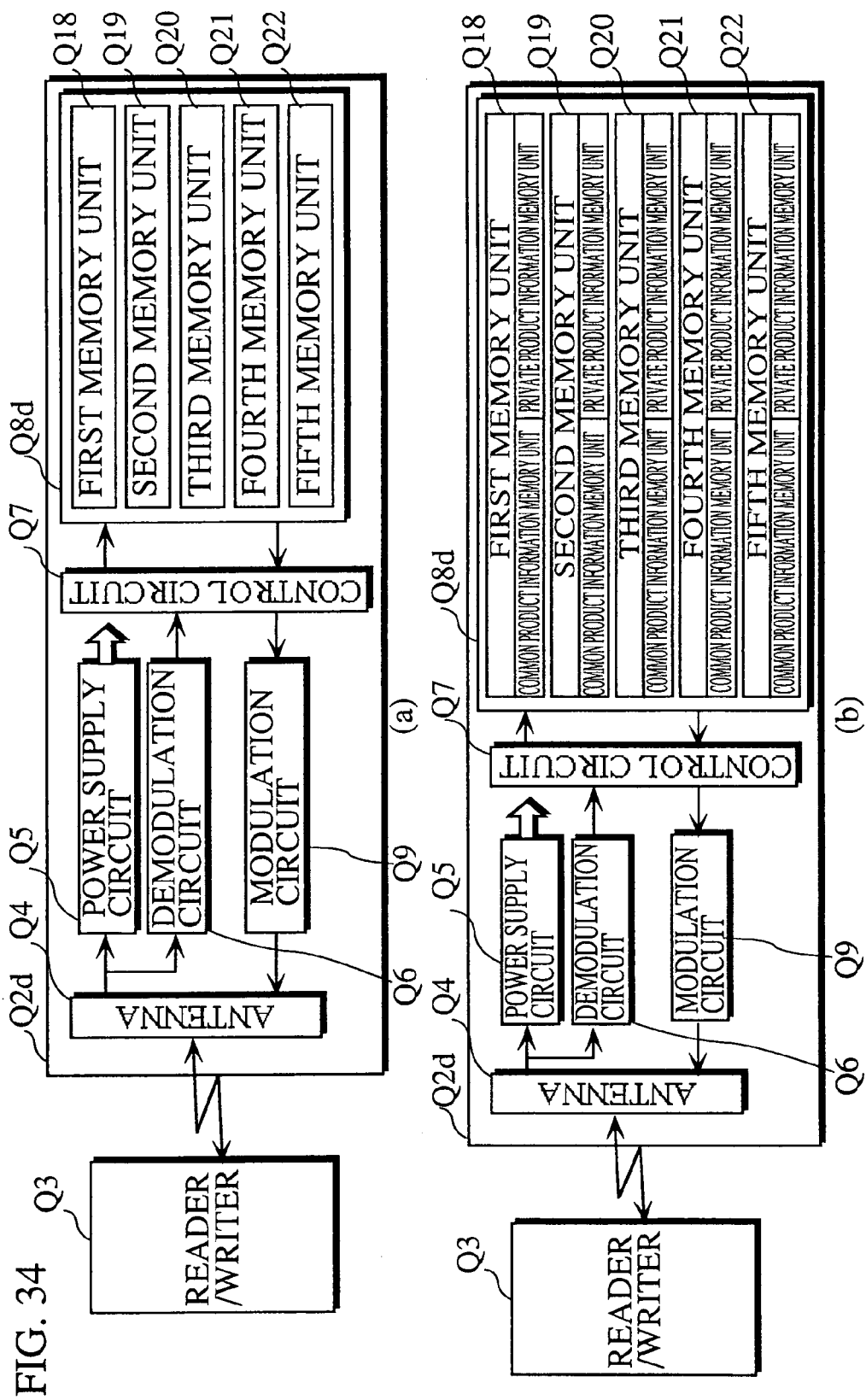
FIG. 34 is a block diagram showing a construction of a contactless IC tag and a reader/writer according to the fifth embodiment of the invention.

The following is a description of a life cycle management system according to the fifth embodiment of the invention. A life cycle procedure of the fifth embodiment is the same as that of the second embodiment shown in FIG. 30. A construction of an IC tag in the fifth embodiment is shown in FIG. 34, where the same construction elements are given the same reference numerals and their explanation is omitted.

As shown in FIG. 34(a), the difference with the second, third, and fourth embodiments lies in that a memory Q8d of an IC tag Q2d in the fifth embodiment is divided into memory units as many as the processes shown in FIG. 30, namely, a first memory unit Q18 for storing product information for the manufacture process Q23, a second memory unit Q19 for storing product information for the distribution process Q24, a third memory unit Q20 for storing product information for the sale process Q25, a fourth memory unit Q21 for storing product information for the use process Q26, and a fifth memory unit Q22 for storing product information for the collection process Q27. It is to be noted that the number of memory units is not limited to five, as long as the memory Q8d is divided into the same number of memory units as life cycle processes.

In this embodiment, product information in each process shown in FIG. 30 is the same as that explained in the second embodiment. Also, the security between the processes can be attained by classifying product information as common product information common to each process and private product information exclusive to each process, and dividing each of the first to fifth memory units Q18–Q22 into a common product information memory unit and a private product information memory unit as in the third embodiment, as shown in FIG. 34(b).

The security can also be attained by dividing each of the first to fifth memory units Q18–Q22 into an ROM and an RAM, dividing the ROM into a common product information ROM unit for storing common product information and a private product information ROM unit for storing private product information, and dividing the RAM into a common product information RAM unit for storing common product information and a private product information RAM unit for storing private product information, as in the fourth embodiment (not illustrated).

A communication system of the IC tag Q2d and the reader/writer Q3 in the fifth embodiment is explained below, by referring to FIG. 34(b).

To write product information to the IC tag Q2d in the first process, the user of the reader/writer Q3 in the first process decides whether the product information should be treated as common product information or private product information, and sends a signal of the encrypted product information to the IC tag Q2d.

The signal of the encrypted product information is received by the antenna Q4, and converted to power by the power supply circuit Q5 to supply power to each construction element of the IC tag Q2d. The received signal is also demodulated by the demodulation circuit Q6.

The demodulated signal contains memory indication information for indicating whether to write to the common product information memory unit or the private product information memory unit in the first memory unit Q18. According to this memory indication information, the contents of the signal are written to the indicated memory unit by the control circuit Q7.

To read common product information from the IC tag Q2d in the first process, the user of the reader/writer Q3 sends a signal including a signal for reading the common product information, to the IC tag Q2d.

The reading signal is received by the antenna Q4, converted to power by the power supply circuit Q5, and also demodulated by the demodulation circuit Q6. The necessary common product information is then read from the common product information memory unit of the first memory unit Q18 by the control circuit Q7, and sent from the antenna Q4 to the reader/writer Q3 via the modulation circuit Q9 as a radio signal.

To read private product information from the IC tag Q2d, if the private product information was written in the first process, the user of the reader/writer Q3 sends a signal which indicates the private product information memory unit of the first memory unit Q18, namely, a process-specific encryption key, to the IC tag Q2d, so as to gain access to the private product information memory unit of the first memory unit Q18.

Once the reader/writer Q3 has obtained a permission to read the private product information using the process-specific encryption key, the reader/writer Q3 sends a signal for reading the private product information to the IC tag Q2d.

The reading signal is received by the antenna Q4, converted to power by the power supply circuit Q5, and also demodulated by the demodulation circuit Q6. The necessary private product information is then read from the private product information memory unit of the first memory unit Q18 by the control circuit Q7.

A signal of the read private product information is sent from the antenna Q4 to the reader/writer Q3 via the modulation circuit Q9, as a radio signal.

Here, if the first memory unit Q18 does not have enough free space, product information stored in the first memory unit Q18 may be deleted automatically, or a list of product information stored in the first memory unit Q18 may be sent to the reader/writer Q3 so that the user of the reader/writer Q3 selects the most unnecessary product information as the product information to be deleted, as in the third and fourth embodiments.

Thus, the memory Q8d is divided into the memory units as many as the processes, so that the security can be maintained within each process while recording product information of all processes to the IC tag Q2d.

In the second to fifth embodiments, each IC tag uses an UHF band of 860–915 MHz or a semi-microwave band of 2.4–2.5 GHz as a carrier frequency, and performs communication not by magnetic type using electromagnetic coupling but by radio type.

A representative frequency of the magnetic type is 0.125 kHz or 13.5 MHz, which is lower than the radio type.

In other words, the radio type is higher in frequency than the magnetic type. This enables the antenna size to be reduced, and as a result the size and cost of the tag can be reduced.

Also, the radio type has a communication distance of several meters, while the magnetic type has a communication distance of only several tens centimeters.

Further, the communication speed of the radio type is several tens kilobits per second, while the communication speed of the magnetic type is only several kilobits per second. This benefits high-speed communication.

Also, the magnetic type is based on electromagnetic coupling of coils or the like, so that if information recording media of the magnetic type are placed one on top of another, communication could be cut off. In other words, only about several IC cards can be multi-read according to magnetic type. On the other hand, several tens of IC cards can be multi-read according to microwave communication type, as its radio waves can pass through most materials such as corrugated cardboard, plastic, earthenware, and textile with almost no loss, except water and metal.

Accordingly, product information of products of the same type of different types can be read simultaneously, or the same product information can be simultaneously written to products of the same type. Hence users of reader/writers can perform writing/reading of product information to IC tags without difficulty.

For example, when an IC tag has a frequency of 915/868 MHz and a size of 5 mm×100 mm×0.5 mm, the read distance is around 3 m, the write distance is around 2 m, the read speed is around 10 msec/byte, and the write speed is around 20 msec/byte.

When the IC tag has a frequency of 2.45 GHz and a size of 5 mm×30 mm×0.5 mm, the read distance is around 1.5 m, the write distance is around 1 m, the read speed is around 10 msec/byte, and the write distance is around 20 msec/byte.

According to this invention, by attaching an IC tag to a product and recording historical information of the product to the IC tag, the following effects can be produced in each life cycle process.

In the manufacture process; the number of units manufactured can be controlled, which facilitates manufacturing adjustments. Also, by collecting a product or a component and analyzing its product information, feedback on development and design can be made. This enables the performance of the product or component to improve.

In the distribution process, stock control is facilitated and as a result inventories can be reduced. Also, even if various products are loaded mixedly, these various products can be managed simultaneously using a reader/writer, which contributes to effective transportation and prevents delivery errors.

In the sale process, effects such as anti-shoplifting, control of hot-selling products, and simplified stock control are expected.

In the use process, inspection service and repairs can be performed reliably.

In the collection process, the reusability of the product or component can be evaluated, which allows recycling to be performed effectively.

Also, retaining the history information of the product helps the manufacturer take effective measures to bring itself into conformance with the product liability (PL) law.

The present invention may be a method described in each of the above embodiments.

The invention may also be a computer program that realizes the method by computer, or digital signals which make up the computer program.

The invention may also be a computer-readable storage medium that stores the computer program or the digital signals. Examples of the computer-readable storage medium include a floppy disk, a hard disk, a CD-ROM, an MO, a DVD, a DVD-ROM, a DVD-RAM, and a semiconductor memory. The invention may also be the computer program or the digital signals stored in such a storage medium.

The invention may also be realized by transmitting the computer program or the digital signals via a network such as a telecommunication line, a cable or radio communication line, or the Internet.

Various combinations of the above embodiments and modifications are also possible.

INDUSTRIAL APPLICABILITY

The present invention can be used when attaching a contactless IC tag to an item such as a car, a foodstuff, a house, cloths, a miscellaneous article, or electronic equipment including a home electrical appliance, that passes through multiple stages such as a manufacture stage, and accessing the contactless IC tag to manage the item.

What is claimed is:

1. A contactless IC tag that has a nonvolatile memory and is read and written contactlessly using radio waves, the contactless IC tag being attached to an item which passes through multiple stages of a life cycle from manufacture to disposal, the contactless IC tag comprising:

storing means having stage storage areas as many as the stages of the life cycle;

identifier holding means for holding stage identifiers that each identify a different one of the stage storage areas;

secret receiving means for receiving an access identifier in secrecy from an external access device;

judging means for judging whether the received access identifier matches one of the stage identifiers in the identifier holding means;

access information receiving means for receiving access information from the access device, when the access identifier matches one of the stage identifiers; and accessing means for accessing a stage storage area that is identified by the access identifier, based on the received access information, wherein the secret receiving means includes:

authenticator outputting means for generating a first authenticator and outputting the first authenticator to the access device;

acquiring means for acquiring a second authenticator that is obtained by encrypting the first authenticator by an encryption algorithm using the access identifier as an encryption key, from the access device; and encrypting means for encrypting the first authenticator by the encryption algorithm using the stage identifiers each as an encryption key, to generate third authenticators, the judging means judges whether the acquired second authenticator matches one of the third authenticators, and if the second authenticator matches one of the third authenticators, judges that the access identifier matches one of the stage identifiers, and the accessing means accesses a stage storage area identified by a stage identifier which is used as an encryption key to generate the third authenticator that matches the second authenticator, as the stage storage area identified by the access identifier.

2. The contactless IC tag of claim 1, wherein the authenticator outputting means generates the first authenticator randomly.

3. The contactless IC tag of claim 2, wherein the secret receiving means further includes:

channel selecting means for selecting one of a plurality of communication channels obtained by time-division multiplexing; and identifier receiving means for receiving the access identifier in secrecy, through the selected communication channel.

4. The contactless IC tag of claim 3, wherein the channel selecting means selects the communication channel randomly.

5. The contactless IC tag of claim 1,
wherein the storing means has a common storage area identified by a common identifier,
the identifier holding means stores the common identifier,
the judging means judges whether the received access identifier matches the common identifier in the identifier holding means,
the access information receiving means receives the access information from the access device, when the access identifier matches the common identifier, and
the accessing means accesses the common storage area identified by the access identifier, based on the received access information.

6. The contactless IC tag of claim 1,
wherein the nonvolatile memory is a fuse memory.

7. The contactless IC tag of claim 1, being provided near a logotype that is positioned on a surface of the item.

8. The contactless IC tag of claim 1, further comprising time information storing means for storing, when data is stored into the storing means, time information into the storing means together with the data.

9. The contactless IC tag of claim 8, further comprising memory organizing means for deleting, when data cannot be stored into the storing means due to insufficient free space, data whose time information is oldest from the storing means, to increase the free space.

10. The contactless IC tag of claim 1,
wherein the storing means has a first memory unit which is non-rewritable and a second memory unit which is rewritable.

11. The contactless IC tag of claim 1,
wherein the storing means has an extension storage area for storing data which cannot be stored in the stage storage areas due to insufficient free space.

12. The contactless IC tag of claim 1, further comprising:
master identifier holding means for holding a master identifier;
master identifier judging means for judging whether the received access identifier matches the master identifier in the master identifier holding means; and
master access information receiving means for receiving master access information from the access device, when the access identifier matches the master identifier,
wherein the accessing means accesses one of the stage storage areas based on the received master access information.

13. An access device for sending/receiving information to/from a contactless IC tag that has a nonvolatile memory and is read and written contactlessly using radio waves, the contactless IC tag being attached to an item which passes through multiple stages of a life cycle from manufacture to disposal and having stage storage areas as many as the stages of the life cycle, each stage storage area being identified by a different secret identifier, the access device comprising:
identifier storing means for storing an access identifier;
secret sending means for sending the access identifier in secrecy to the contactless IC tag; and
access information sending means for sending access information to the contactless IC tag, when the contactless IC tag judges that the access identifier properly identifies one of the stage storage areas,
wherein the contactless IC tag stores stage identifiers that each identify a different one of the stage storage areas, the secret sending means includes:
authenticator receiving means for receiving a first authenticator from the contactless IC tag; and
authenticator outputting means for encrypting the received first authenticator by an encryption algorithm using the access identifier as an encryption key to generate a second authenticator, and sending the second authenticator to the contactless IC tag, and
the access information sending means sends the access information to the contactless IC tag, when the contactless IC tag (a) encrypts the first authenticator by the encryption algorithm using the stage identifiers each as an encryption key to generate third authenticators, (b) judges whether the second authenticator matches one of the third authenticators, and (c) if the second authenticator matches one of the third authenticators, judges that the access identifier properly identifies one of the stage storage areas.

14. An information recording medium attachable to an item which passes through multiple stages of a life cycle from manufacture to disposal, the information recording medium comprising:
stage storage areas, as many as the stages of the life cycle of the item, each of the stage storage areas including an information storage area readable by using a first encryption key common to all stage storage areas, and an information storage area readable by using a second encryption key unique to a corresponding stage storage area, each of the stage storage areas storing an encryption key unique to a corresponding stage storage area; and
stage identifiers, each stage identifier identifying a different one of the stage storage areas.

15. A contactless IC tag that is read and written contactlessly using radio waves, the contactless IC tag being attached to an item which passes through multiple stages of a life cycle from manufacture to disposal, the contactless IC tag comprising:
storing means having stage storage areas as many as the stages of the life cycle, each of the stage storage areas including an information storage area that is readable using a first encryption key common to all of the stages and an information storage area that is readable using a second encryption key unique to a corresponding stage;
identifier holding means for holding stage identifiers that each identify a different one of the stage storage areas;
secret receiving means for receiving an access identifier in secrecy from an external access device;
judging means for judging whether the received access identifier matches one of the stage identifiers in the identifier holding means;
access information receiving means for receiving access information from the access device, when the access identifier matches one of the stage identifiers; and
accessing means for accessing a stage storage area that is identified by the access identifier, based on the received access information.

16. The contactless IC tag of claim 15 having a nonvolatile memory.

17. The contactless IC tag of claim 15,
wherein the secret receiving means includes:
authenticator outputting means for generating a first authenticator and outputting the first authenticator to the access device;
acquiring means for acquiring a second authenticator that is obtained by encrypting the first authenticator by an encryption algorithm using the access identifier as an encryption key, from the access device; and encrypting means for encrypting the first authenticator by the encryption algorithm using the stage identifiers each as an encryption key, to generate third authenticators, the judging means judges whether the acquired second authenticator matches one of the third authenticators, and if the second authenticator matches one of the third authenticators, judges that the access identifier matches one of the stage identifiers, and the accessing means accesses a stage storage area identified by a stage identifier which is used as an encryption key to generate the third authenticator that matches the second authenticator, as the stage storage area identified by the access identifier.

18. A contactless IC tag that has a nonvolatile memory and is read and written contactlessly using radio waves, the contactless IC tag being attached to an inpatient who passes through multiple stages of a hospital cycle from admission to release, the contactless IC tag comprising:

storing means having stage storage areas as many as the stages of the hospital cycle, each of stage storage areas including an information storage area that is readable using a first encryption key common to all of the stages and an information storage area that is readable using a second encryption key unique to a corresponding stage;

identifier holding means for holding stage identifiers that each identify a different one of the stage storage areas;

secret receiving means for receiving an access identifier in secrecy from an external access device;

judging means for judging whether the received access identifier matches one of the stage identifiers in the identifier holding means;

access information receiving means for receiving access information from the access device, when the access identifier matches one of the stage identifiers; and accessing means for accessing a stage storage area that is identified by the access identifier, based on the received access information.

19. An access method for use in an access device for sending/receiving information to/from a contactless IC tag that is read and written contactlessly using radio waves, the access device including identifier storing means for storing an access identifier, the contactless IC tag being attached to an item which passes through multiple stages of a life cycle from manufacture to disposal and including storage means which has stage storage areas as many as the stages of the life cycle, each of stage storage areas being identified by a different secret stage identifier and including an information storage area that is readable using a first encryption key common to all of the stages and an information storage area that is readable using a second encryption key unique to a corresponding stage, the access method comprising:

a secret sending step for sending the access identifier in secrecy to the contactless IC tag; and an access information sending step for sending access information to the contactless IC tag, when the contactless IC tag judges that the access identifier properly identifies one of the stage storage areas.

* * * * *